US007249442B2

(12) United States Patent  (10) Patent No.: US 7,249,442 B2
Pellegrino et al.  (45) Date of Patent: Jul. 31, 2007

(54) STORAGE RACK VIBRATION ISOLATORS AND RELATED STORAGE RACK SYSTEMS

(75) Inventors: John B. Pellegrino, Erie, PA (US); James A. Courtwright, North East, PA (US); Robert Michael, Erie, PA (US)

(73) Assignee: Ridg-U-Rak, INc., North East, PA (US)

( * ) Notice: Subject to any disclaimer, the term of this patent is extended or adjusted under 35 U.S.C. 154(b) by 0 days.

(21) Appl. No.: 11/279,161

(22) Filed: Apr. 10, 2006

(65) Prior Publication Data

US 2006/0237378 A1  Oct. 26, 2006

Related U.S. Application Data

(60) Provisional application No. 60/785,028, filed on Mar. 23, 2006, provisional application No. 60/762,908, filed on Jan. 27, 2006, provisional application No. 60/670,474, filed on Apr. 11, 2005.

(51) Int. Cl.
  *E04B 1/98* (2006.01)
  *F16M 13/00* (2006.01)

(52) U.S. Cl. ..................... 52/167.8; 248/564

(58) Field of Classification Search .......... 211/26, 211/189, 191; 267/153, 294, 141.1; 52/167.1–167.9, 52/573.1; 248/559, 562, 564–566, 570, 635, 248/636, 638
  See application file for complete search history.

(56) References Cited

U.S. PATENT DOCUMENTS 1,572,574 A    2/1926  Stromborg 2,660,687 A  *  11/1953  Roy ........................... 248/574

(Continued)

FOREIGN PATENT DOCUMENTS

IT    0001327395    8/2002

(Continued)

OTHER PUBLICATIONS

English translation of Italian U.S. Appl. No. 0001327395.

(Continued)

*Primary Examiner*—Jennifer E. Novosad
(74) *Attorney, Agent, or Firm*—Edward W. Goebel, Jr.; Jon L. Woodard; Jonathan M. D'Silva

(57) ABSTRACT

A storage rack system to be installed on a floor has a plurality of columns, is more flexible in a down aisle dimension than it is in a cross aisle dimension, and has at least a first column and a second column adjacent one another in the cross aisle dimension. A storage rack vibration isolator for use with this storage rack system comprises at least one seismic vibration absorption and dissipation structure constructed to be located primarily between the first and second columns to reduce the storage rack system's natural frequency in at least the cross aisle dimension. The seismic vibration absorption and dissipation structure includes a first member connectable to the storage rack system and a second member connectable to the floor. At least one column support assembly is mountable to at least the first and second columns to enable them to move with respect to the floor. A structure limits the movement of the first and second columns to substantially the cross aisle dimension.

88 Claims, 34 Drawing Sheets

U.S. PATENT DOCUMENTS

| | | |
|---|---|---|
| 3,342,447 A | 9/1967 | Marsh |
| 3,554,855 A | 1/1971 | Oberst et al. |
| 3,806,975 A | 4/1974 | Fyfe |
| 3,921,240 A | 11/1975 | Fyfe |
| 4,117,637 A | 10/1978 | Robinson |
| 4,187,573 A | 2/1980 | Fyfe et al. |
| 4,226,677 A | 10/1980 | Saito et al. |
| 4,499,694 A | 2/1985 | Buckle et al. |
| 4,527,365 A | 7/1985 | Yoshizawa et al. |
| 4,593,501 A | 6/1986 | Delfosse |
| 4,633,628 A | 1/1987 | Mostaghel |
| 4,727,695 A | 3/1988 | Kemeny |
| 4,731,966 A | 3/1988 | Fujita et al. |
| 4,761,925 A | 8/1988 | Fukahori et al. |
| 4,766,706 A | 8/1988 | Caspe |
| 4,830,927 A | 5/1989 | Fukahori et al. |
| 4,899,323 A | 2/1990 | Fukahori et al. |
| 4,910,930 A * | 3/1990 | Way .................. 52/167.1 |
| 4,933,238 A | 6/1990 | Fukahori et al. |
| 4,942,703 A | 7/1990 | Nicolai |
| 4,950,528 A | 8/1990 | Iizuka et al. |
| 4,978,581 A | 12/1990 | Fukahori |
| 4,991,366 A * | 2/1991 | Teramura et al. .......... 52/167.8 |
| 5,014,474 A * | 5/1991 | Fyfe et al. .................. 52/167.8 |
| 5,054,251 A | 10/1991 | Kemeny |
| 5,195,716 A | 3/1993 | Tyler |
| 5,242,147 A | 9/1993 | Kemeny |
| 5,597,240 A | 1/1997 | Fyfe |
| 5,682,712 A | 11/1997 | Kemeny |
| 5,761,856 A | 6/1998 | Kishizono et al. |
| 5,797,228 A * | 8/1998 | Kemeny .................... 52/167.1 |
| 5,881,507 A | 3/1999 | Yoo et al. |
| 5,946,866 A | 9/1999 | Wegiewski et al. |
| 6,223,483 B1 | 5/2001 | Tsukagoshi |
| 6,931,800 B2 | 8/2005 | Sedrak |

FOREIGN PATENT DOCUMENTS

WO    WO 2005/049942 A1    6/2005

OTHER PUBLICATIONS

"Seismic Considerations for Steel Storage Racks Located in Areas Accessible to the Public," *FEMA 460—Sep. 2005*, Prepared by the Building Seismic Safety Council for FEMA, 172 pages. See cover letter for explanation.

* cited by examiner

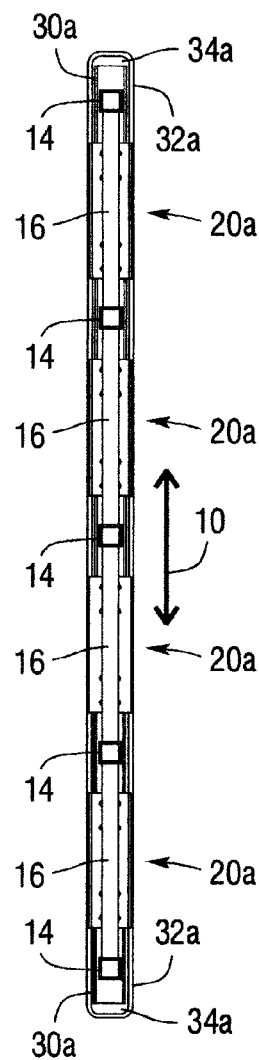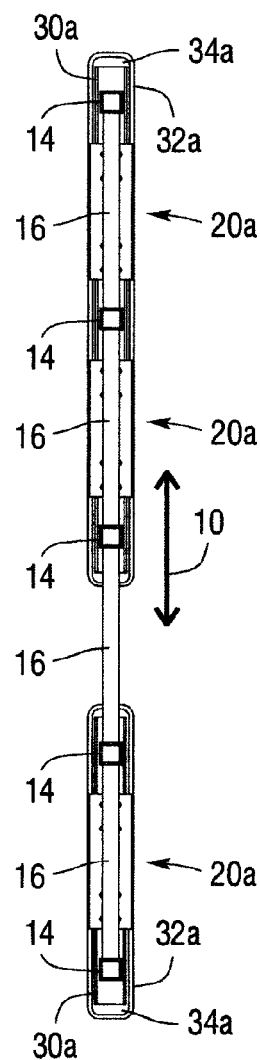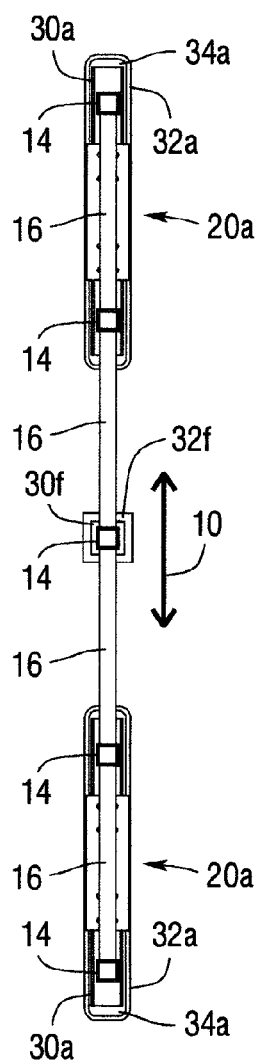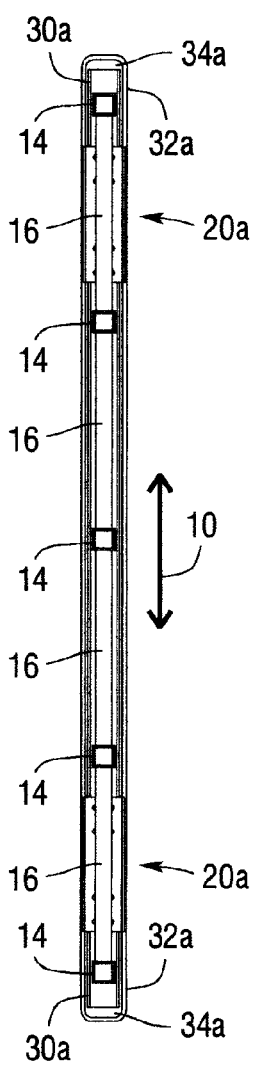
*Fig.6A*  *Fig.6B*  *Fig.6C*  *Fig.6D*

STORAGE RACK VIBRATION ISOLATORS AND RELATED STORAGE RACK SYSTEMS

This application takes priority from U.S. provisional applications 60/670,474 filed on Apr. 11, 2005, 60/762,908 filed on Jan. 27, 2006, and 60/785,028 filed on Mar. 23, 2006, which are incorporated herein by reference.

BACKGROUND

Commercial and industrial storage rack systems are designed to hold various quantities of items and materials of different sizes, shapes and weights. While they vary in structure, storage rack systems normally include a series of interconnected steel columns, each of which rests on a solid floor such as a large slab of concrete. Braces are normally installed across adjacent pairs of columns. Shelving or pallets installed across pairs of braces normally hold the items or materials being stored. The columns bear the weight of the stored items or materials and transfer that weight to a base at the bottom of each column and from the base to the floor on which the columns are installed.

Storage rack systems can be installed in outdoor areas, factories, warehouses and large box retail stores located in all geographic areas. In some of these areas, storage rack systems are subjected to potentially significant seismic forces resulting from earthquakes. While storage rack systems can withstand the vibrations caused by low and moderate levels of seismic forces, increased levels of seismic forces can cause damage to storage rack systems or can cause items or materials to fall off the shelves or pallets of the storage rack systems on which they are stored.

SUMMARY

Storage rack systems typically have a plurality of columns installed on a floor and arranged in frame-like structures with multiple storage levels. These storage rack systems are usually arranged to form aisles with individual rack units placed back-to-back. The design of most storage rack systems make the rack more flexible in a first horizontal dimension, usually corresponding to the down-aisle direction, i.e., along an aisle parallel to the length of the storage rack system, and less flexible in a second horizontal dimension, usually corresponding to a cross-aisle direction, i.e., perpendicular to the aisle formed by the storage rack system. During seismic events, storage rack systems are able to absorb some of the vibrations along the more flexible dimension but are less able to do so in the less flexible dimension. Therefore installing storage rack vibration isolators according to this invention will give the storage racks systems greater flexibility primarily in the less flexible dimension and will increase the storage rack systems' ability to survive seismic events undamaged.

The storage rack vibration isolator is comprised of at least one seismic vibration absorption and dissipation structure located primarily between a first pair of adjacent columns in the second horizontal dimension to reduce the natural frequency of the storage rack system in at least the second horizontal dimension. The seismic vibration absorption and dissipation structures include a first member connectable to the storage rack system and a second member connectable to the floor. At least one column support assembly is mountable to at least the first pair of columns to enable the columns to move with respect to the floor. A structure is provided to limit the movement of the columns during seismic events to substantially the second horizontal dimension.

The column support assembly could be any assembly that allows the columns to move on the floor. In one variation, a column support assembly is comprised of a sliding base pad that is attachable to the lower end of at least one of the first pair of columns and a fixed base pad attachable to the floor. The sliding base pad is positioned on the fixed base pad to slide over the fixed base pad when the columns move during seismic events. If necessary, at least one layer of low friction bearing material may be interposed between sliding base pad and fixed base pad. Different combinations of column support assembly components that comprise sliding base pads and fixed base pads are possible. This type of column support assembly may comprise a single sliding base pad attachable to the lower ends of the pair of columns with the fixed base pad extending under and between the two columns. In another variation, this type of column support assembly may comprise two sliding base pads each attachable to the lower end of a separate one column of the first pair of columns. In this case the fixed base pad may be long enough to extend under and between the two columns or each column could have a separate fixed base pad.

In embodiments of this type of column support assembly in which both the fixed base pad and the sliding base pad can fit under and between two columns, a seismic absorption and dissipation structure installed between these two columns would have its first member attachable to the top of the sliding base pad. At least one fastening member is attached to the second member and to the fixed base pad to connect the second member to the floor.

The structure that limits the movement of the first pair of columns to substantially the second horizontal direction during seismic events can be of any desired design. By way of example, it can have a structure that limits the movement of the seismic absorption and dissipation device, a structure that limits the movement of the column support assembly, or both. Some embodiments include a mechanical element to limit vertical movement of the storage rack vibration isolator. In some embodiments in which movement of the storage rack system is restricted vertically or in substantially one horizontal direction or both, the restriction structure could allow a limited amount of movement for isolation in the restricted directions. In some embodiments, the seismic absorption and dissipation structure is connectable to the storage rack system at cross braces connected across the at least two columns of the storage rack system in the second horizontal dimension.

Any seismic absorption and dissipation structure having a first member connectable to the storage rack system between the first pair of columns and a second member connectable to the floor can be used according to this invention to reduce the natural frequency of the storage rack system in at least the second horizontal direction. In one preferred embodiment, the first member comprises a first mounting plate connectable to the storage rack system and the second member comprises a second mounting plate connectable to the floor. At least one elastomeric member extends between the first and second mounting plates. The elastomeric member is operatively attached to the first and second mounting plates such that during seismic events the first and second mounting plates remain attached to the at least one elastomeric member as the elastomeric member is placed in shear while the first and second mounting plates are able to move in planes substantially parallel to each other. The at least one elastomeric member is made of material that is capable of absorbing and dissipating the energy of ground movement imparted to the storage rack system during seismic events to reduce the natural frequency of the storage rack system in at least the second horizontal dimension. In one variation of this device, there are at least two elastomeric members extending between the first and second mounting plates, and at least one intermediate plate is positioned between every two of the at least two elastomeric members.

The first member connectable to the storage rack system and the second member connectable to the floor do not have to be coupled to each other to make them acceptable seismic vibration absorption and dissipation structures, as shown, for example in embodiments that include friction pendulums. In such designs the seismic vibration absorption and dissipation structures also serve as part of the column support assembly. A first pair of columns in the less flexible second horizontal dimension are attachable to a column support assembly comprising at least one sliding base pad. The first member of the seismic vibration absorption and dissipation structure is at least one sliding element attached to the storage rack system. The second member of the seismic vibration absorption and dissipation structure is a fixed base pad having at least one concave surface on which the sliding elements and the sliding base pads are positioned. A structure further limits the movement of the columns during seismic events to the dimensions of the fixed base pad to substantially the second horizontal dimension.

Other seismic vibration absorption and dissipation structures that would be acceptable include systems incorporating springs as described herein. Seismic vibration absorption and dissipation structures could also incorporate linear bearings with secondary damping as described herein.

Any of the embodiments of storage rack vibration isolators can be installed on existing storage rack systems. Alternatively newly built storage rack systems can be designed with any of the embodiments of storage rack vibration isolators. In either case the maximum design load and the natural frequency of the storage rack system must be considered. The combination, configuration, and numbers of storage rack vibration isolators will be varied as needed based on these parameters as described herein. Existing storage rack systems must have each pair of columns between which a vibration isolator is to be installed disconnected from the floor before the columns can be mounted to a column support assembly to move with respect to the floor.

Those skilled in the art will realize that this invention is capable of embodiments that are different from those shown and that details of the structure of the enclosed storage rack vibration isolators can be changed in various manners without departing from the scope of this invention. Accordingly, the drawings and descriptions are to be regarded as including such equivalent storage rack vibration isolators as do not depart from the spirit and scope of this invention.

BRIEF DESCRIPTION OF THE DRAWINGS

For a more complete understanding and appreciation of this invention, and its many advantages, reference will be made to the following detailed description taken in conjunction with the accompanying drawings.

FIG. 6A is a simplified overhead cross-sectional view of a row of five columns of the less flexible second horizontal dimension of a storage rack system with storage rack vibration isolators located primarily between every two columns;

FIG. 6B is a simplified overhead cross-sectional view of a row of five columns of the less flexible second horizontal dimension of a storage rack system with storage rack vibration isolators attached to the storage rack system;

FIG. 6C is a simplified overhead cross-sectional view of a row of five columns of the less flexible second horizontal dimension of a storage rack system with storage rack vibration isolators located primarily between the first two columns and the last two columns;

FIG. 6D is a simplified overhead cross-sectional view of a row of five columns of the less flexible second horizontal dimension of a storage rack system with storage rack vibration isolators located primarily between the first two columns and the last two columns;

DETAILED DESCRIPTION

Figure 1:
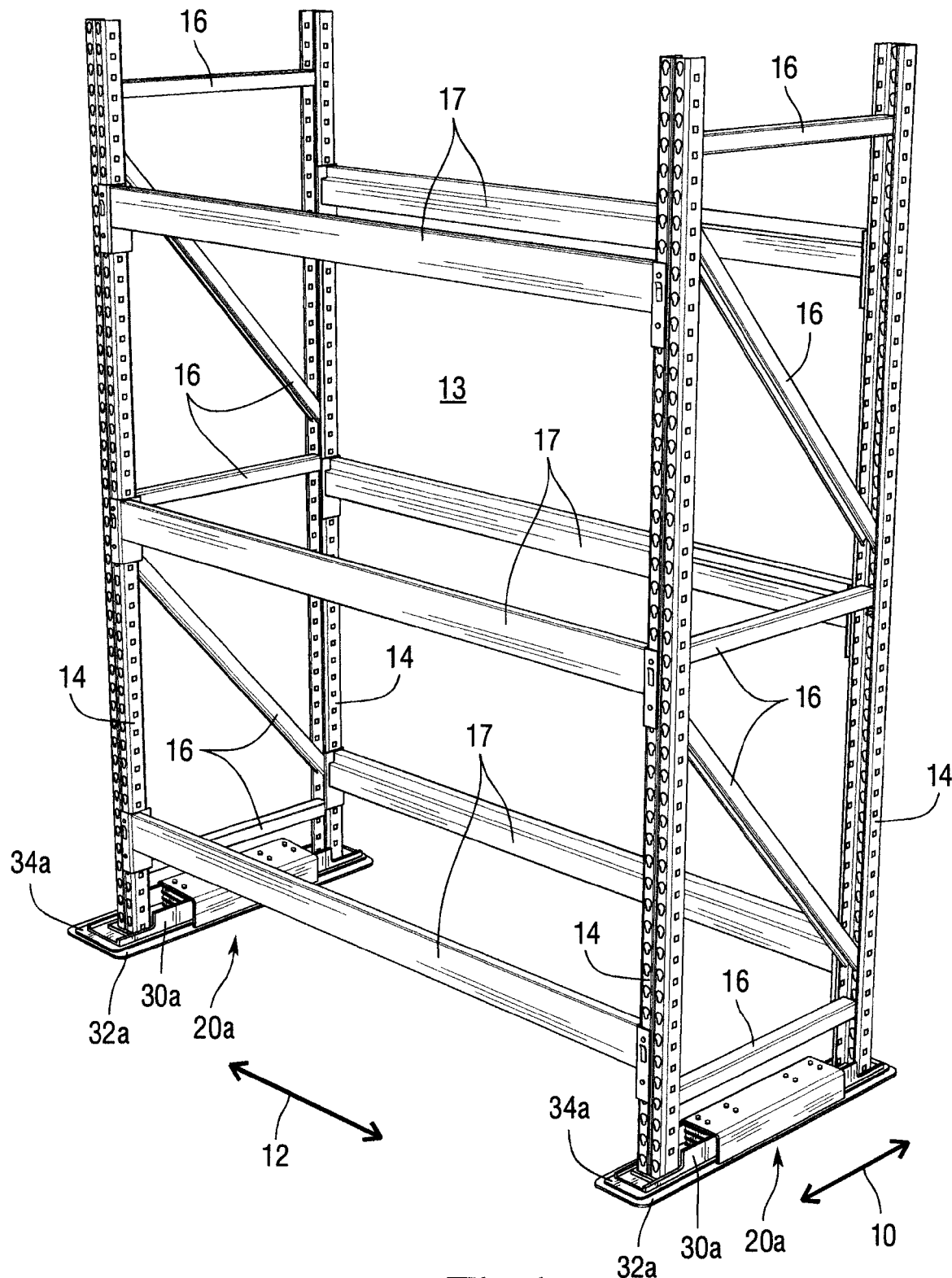
FIG. 1 is a perspective view of a four-column storage rack system with storage rack vibration isolators located primarily between columns in the less flexible second horizontal dimension.

Referring to the drawings, some of the reference numerals are used to designate the same or corresponding parts through several of the embodiments and figures shown and described. Corresponding parts are denoted in specific embodiments with the addition of lowercase letters. Variations in corresponding parts that are depicted in the figures are described. It will be understood that generally variations in the embodiments could be interchanged without deviating from the invention.

Storage rack systems typically have a plurality of columns installed on a floor and arranged in frame-like structures with multiple storage levels. FIG. 1 depicts a typical four-column upright frame storage rack system equipped with storage rack vibration isolators 20a that are discussed in more detail below. Typically a storage rack system will comprise many such racks arranged in aisles with individual rack units placed back-to-back with some space between them, but a storage rack system could comprise just one rack unit as depicted in FIG. 1. Every storage rack system has a natural frequency based on how the structure is designed and built, The natural frequency of the storage rack system is also related to its stiffness and indicates how the storage rack system will behave in seismic events. Typically an upright frame storage rack system not equipped with storage rack vibration isolators is not uniformly flexible in all directions. Upright frame storage rack systems are typically more flexible (i.e. they have a lower natural frequency) in a first horizontal dimension, usually corresponding to the down-aisle direction i.e., along an aisle parallel to the length of the storage rack system, depicted by directional arrow 12 and less flexible (i.e. they have a higher natural frequency) in a second horizontal dimension, usually corresponding to the cross-aisle direction, i.e., perpendicular to the aisle formed by the storage rack system, depicted by directional arrow 10. It has been determined that typical upright frame storage rack systems manufactured by Ridg-U-Rak, Inc., located in North East, Pennsylvania, have natural frequencies of about 0.9 Hz in the down-aisle direction and about 1.6 Hz in the cross-aisle direction. It is expected that most upright frame storage rack systems are similarly designed and are likewise more rigid in the cross-aisle direction and the down-aisle direction.

During seismic events, storage rack systems vibrate to counteract the stresses imparted on them from ground movement so that the storage rack systems will sway and try to move in response to an earthquake. The ground excitations caused by earthquakes may be three-dimensional. These vibrations can cause damage to storage rack systems and can cause products stored on the storage rack shelves to fall off the storage surfaces and become potential hazards to anyone nearby. The vibrations imparted on the storage rack system increase depending on the strength of the earthquake and the distance of the storage rack system from the epicenter of the earthquake. But the potential for storage rack systems to experience some damage or to have stored product fall from them increases when the frequency of vibrations imparted from seismic events is greater than 1.5 Hz. As typical upright frame storage rack systems already have a natural frequency of 1.6 Hz in the cross-aisle direction, it does not take a strong earthquake to damage them. The fact that earthquakes act on the storage rack systems in three dimensions means that compliance in all directions may be necessary to protect the storage rack system from these vibrations.

Lowering the natural frequency of the storage rack system will decrease the effect of seismic events. To do this, additional flexibility must be given to storage rack systems without sacrificing stability and strength. This can be accomplished by essentially leaving the structure of the storage rack system untouched while modifying how the storage rack system is connected to the floor. Storage rack vibration isolators having seismic vibration isolation and dissipating structures with a first member connected to the floor and a second member connected to the storage racks serve as an interface between the floor and the storage rack system such that the storage rack system is connected in one way or another to the storage racks vibration isolators and not directly attached to the floor.

The goal is to reduce the natural frequency of the storage rack system to the extent that damage to the storage rack system is reduced and product stored on the storage racks does not fall off. It is preferable to reduce the natural frequency of the storage rack system to less than about 0.9 Hz, or ideally to less than about 0.5 Hz. Storage rack vibration isolators could be selected that could achieve such frequencies depending on the target natural frequency to be achieved and the expected maximum load on the storage rack system. As has been described earlier, the natural frequency of the typical storage rack system in the down-aisle direction is normally around 0.9 Hz; therefore it is not necessary to significantly lower the natural frequency of the storage rack system in that direction. However some additional damping in the down aisle direction is often helpful. Nevertheless, the preferred storage rack vibration isolators will lower the natural frequency of a storage rack system in the cross-aisle direction while having a relatively minor effect on the stiffness of the storage rack system in the down-aisle direction.

One of the ways to reduce the natural frequency of the storage rack system is to allow the storage rack system to move a selected distance back and forth in a cross-aisle direction in response to the ground movement during seismic events. Such movement, or compliance, increases the overall flexibility of the storage rack system and serves to dissipate the energy imparted to the storage rack system from earthquakes. However, the acceleration experienced by the storage rack system during this movement is also transmitted to the product stored on the shelves, and if it is not tied down to the storage rack shelves, there is a risk that the product could fall off the racks. Therefore another consideration in the design of the storage rack vibration isolators across a range of seismic events is to control the acceleration of the storage rack system such that sufficient movement is achieved to reduce the natural frequency to a desired level, while at the same time not exceeding an acceleration threshold over which product will fall off the shelves.

Dissipation of the energy imparted to the storage rack system from ground movement during an earthquake is achieved through energy absorption as a result of hysteresis losses and/or secondary friction as the vibration isolators move a sufficient distance back and forth to reduce the natural frequency of the storage rack system in the less flexible cross-aisle direction when the storage rack system moves in response to the earthquake. In a storage rack system without storage rack vibration isolators, the energy imparted on the storage rack system during an earthquake is transmitted directly to the storage rack system. Because this energy has nowhere to go, the storage rack system without storage rack vibration isolators suffers significant damage. However, in a storage rack system equipped with storage rack vibration isolators, a significant portion of this energy is used to make the storage rack system move. Therefore the ability of the storage rack systems to move serves as a significant energy dissipation factor during seismic events.

To achieve this movement during seismic events, the storage rack system cannot be fixed to the floor and must be allowed to move in response to seismic vibrations. This movement must be controlled and directed so as to most effectively reduce the natural frequency of the storage rack system and dampen vibrations from the ground, while not permitting the acceleration to be so high as to force product off the rack shelves. Storage rack vibration isolators that can provide these requirements are varied and can involve many different technologies and methods. But preferably storage rack vibration isolators are located primarily between the columns of the storage rack system along the storage rack system's less flexible second horizontal dimension. Installing the storage rack vibration isolators primarily between the columns rather than under the columns means that many types of storage rack vibration isolators do not have to be designed to bear the load on the storage rack systems. This reduces the wear on the storage rack vibration isolators. It also makes them easier to access and maintain since individual seismic vibration isolation and dissipating structures of the storage rack isolator units can be removed or replaced without needing to raise the storage rack systems off the floor. Additionally storage rack vibration isolators installed primarily between columns, rather than in the aisle between parallel storage racks, avoid exposing persons or equipment using the aisles to tripping or impact hazards, respectively.

FIGS. 1 through 6 depict examples of how the principles of the invention can be applied to a variety of types and designs of storage rack systems. The particular embodiment of storage rack vibration isolator shown in FIGS. 1 through 6 is illustrative of the application of the principles of the invention. It will be understood that any of the embodiments disclosed herein and their equivalents would work similarly, if not identically.

FIG. 1 depicts a typical upright-frame storage rack system 13 comprising four columns 14 in two upright frames. In this embodiment each upright frame comprises a pair of columns 14 connected to each other by a number of horizontal and diagonal structural cross braces 16. The upright frames are connected together in the down-aisle direction with weight bearing cross beams 17. Two of the upright frames together form a storage bay between them. The storage bay includes a number of storage levels on which shelves or other storage platforms could be installed. For simplicity, these platforms are not shown but it will be understood that the invention is applicable to various designs of storage rack systems incorporating a variety of storage platform options. In practice, storage rack systems usually have multiple storage bays. The design of the storage rack system 13 makes the storage rack inherently more flexible in the down-aisle direction 12 and less flexible in the cross-aisle direction 10.

Each column 14 is coupled to a column support assembly that enables the column to move on the floor. In the embodiment depicted in FIG. 1, the column support assembly is comprised of sliding base pad 30a that is coupled to the lower end of each column 14. The sliding base pad 30a sits on a fixed base pad 32a that is coupled to the floor. The sliding base pads 30a are moveable on the fixed base pads 32a. To allow for the movement of the storage rack columns 14 the force of friction must be taken into account. It takes a certain amount of force to get an object resting on a surface to slide across the surface. If an object is pushed and it doesn't move, it is static friction, $f_s$, that balances the force exerted against the object. The object will only move after certain amount of force is applied, defined as maximum force of static friction, $f_{s,max}$. In other words, there is a horizontal force that must be overcome to make an object slide across a surface. This force, $f_{s,max}$, is defined as:

$$f_{s,max} = \mu_s F_n$$

where $\mu_s$ is the coefficient of static friction and $F_n$ is the normal force exerted by the object against the surface or, as applicable to storage rack systems, the weight of the storage rack system, including its load, on the floor.

The coefficient of static friction, $\mu_s$, is dependent on the nature of the surfaces against which two objects are in contact, or as applicable to storage rack systems, the nature of the surfaces where the storage rack system and the floor meet. The lower the coefficient of static friction, $\mu_s$, the lower the force, $f_{s,max}$, required to get an object to slide across a surface. For example, a steel block on a steel tabletop would have a lower coefficient of static friction than a rubber block on a dry concrete floor.

To enable a storage rack system to move freely during seismic events, the force required to overcome the static friction, $f_{s,max}$, between the storage rack system and the floor should not be too high, otherwise there is a chance that the storage rack system will be damaged before the storage rack vibration isolators perform their function. The force $f_{s,max}$ can be diminished by lowering the coefficient of friction between sliding components, such as the sliding base pads 30a and the fixed base pads 32a, in the column support assembly by constructing them out of materials with low coefficients of friction. Low friction bearing material can also be used between the sliding components to help lower the coefficient of friction, but any material selected should also have high compressive strength to support the loads borne by storage rack systems.

Adding a lubricant, like oil or grease, between the sliding surfaces can also lower the coefficient of friction. One disadvantage with this is that over time the lubricant could migrate away from the surfaces and periodic lubrication would be required. In addition, some oils are known to react with elastomeric components that may be incorporated in the storage rack vibration isolators, thus reducing their life. However, silicone gel has been found to be an effective lubricant that appears to have no noticeable effect on elastomers.

The column support assembly is a critical component to any storage rack vibration isolator. The energy absorbed in moving the columns represents energy imparted to the storage rack system from the seismic event that is directed away from damaging the storage rack and instead converted into the kinetic energy of the motion of the storage rack system. If too much force, $f_{s,max}$, is required to make the columns move, the storage rack system is likely to incur damage before any movement occurs. If the columns move too easily there is a risk that the storage racks may become unstable. Furthermore, excessive deflection of the storage rack system could cause more protrusion of the rack into the aisle next to it and cause an obstruction in the aisle.

The coefficient of static friction, $\mu_s$, at the interface between the storage rack system and the floor should be less than about 0.3, or ideally between about 0.05 to about 0.1. NYCAST solid lubricant filled cast nylon has been determined to meet these general requirements for use as a bearing material. Supplementing this material with silicone lubricant has also been found to be effective. However, it will be appreciated that other materials that generally meet these requirements may also be suitable and are contemplated to be within the scope of the invention.

FIG. 1 depicts a low friction bearing material 34a interposed between the sliding base pad 30a and the fixed base pad 32a. But as has been discussed, this bearing material 34a may be eliminated if the materials selected for the sliding base pad 30a and the fixed base pad 32a have a low enough coefficient of friction that the storage rack system is able to move relatively easily during seismic events.

Figure 2:
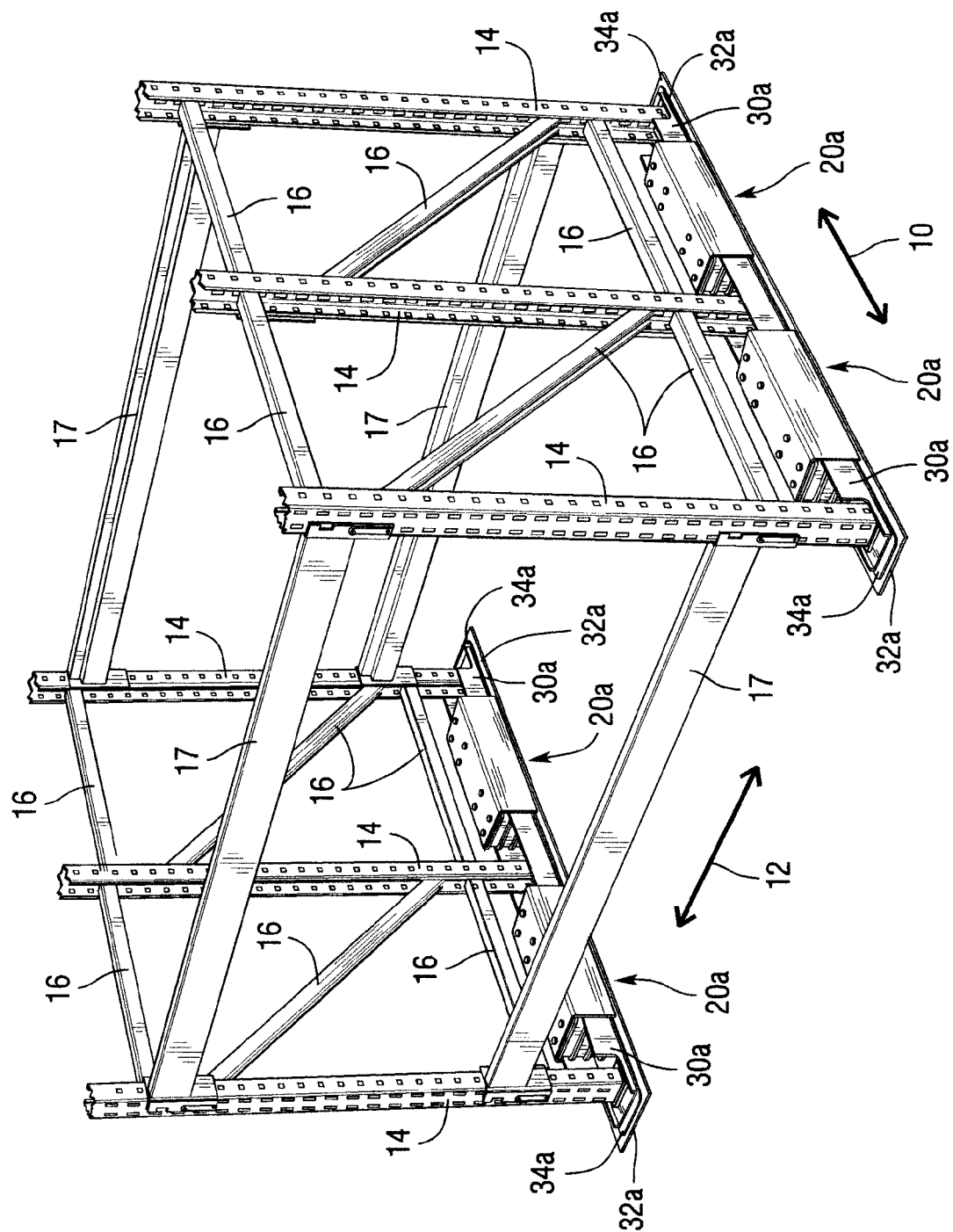
FIG. 2 is a perspective view of a six-column storage rack system with storage rack vibration isolators located primarily between columns in the less flexible second horizontal dimension.

While the storage rack system is allowed to move during seismic events, it is fixed to the floor indirectly by being attached, one way or another, to storage rack vibration isolators 20a that are attached to the floor. During seismic events, the earth moves and imparts vibrations and energy to the storage rack system. The inherent flexibility of the storage rack system in the down-aisle direction 12 causes the rack to naturally sway in that dimension, which dissipates some of the energy of the earthquake. Because the storage rack system is less flexible in the cross-aisle direction 10 it cannot easily sway in that dimension. If the storage rack system was fixed to the floor, the energy imparted to the storage rack system in the less flexible second horizontal dimension 10 would be absorbed by the storage rack system and potentially cause considerable damage and possible structural collapse of the storage rack system. However in storage rack systems equipped with storage rack vibration isolators, as shown for example in FIG. 1, the columns are not fixed to the floor and a significant portion of the energy imparted to storage rack system is directed into making the storage rack system move. The storage rack vibration isolators 20a are designed to allow the storage rack system to move along the less flexible cross-aisle direction 10 a sufficient distance back and forth to reduce the natural frequency of the storage rack system in the less flexible cross-aisle direction and are biased to return the storage rack system to about its starting point. As has been discussed, the particular embodiment of storage rack vibration isolator 20a shown in FIGS. 1 through 6 is for purposes of illustration. Any other embodiment described herein or equivalents would also work. FIG. 2 depicts an upright frame storage rack system having six columns 14 on two three-column upright frames to form a single storage bay. In this embodiment, storage rack vibration isolators 20a are installed between every two columns 14 in the less-flexible cross-aisle direction 10 of the storage rack system.

Figure 3A:
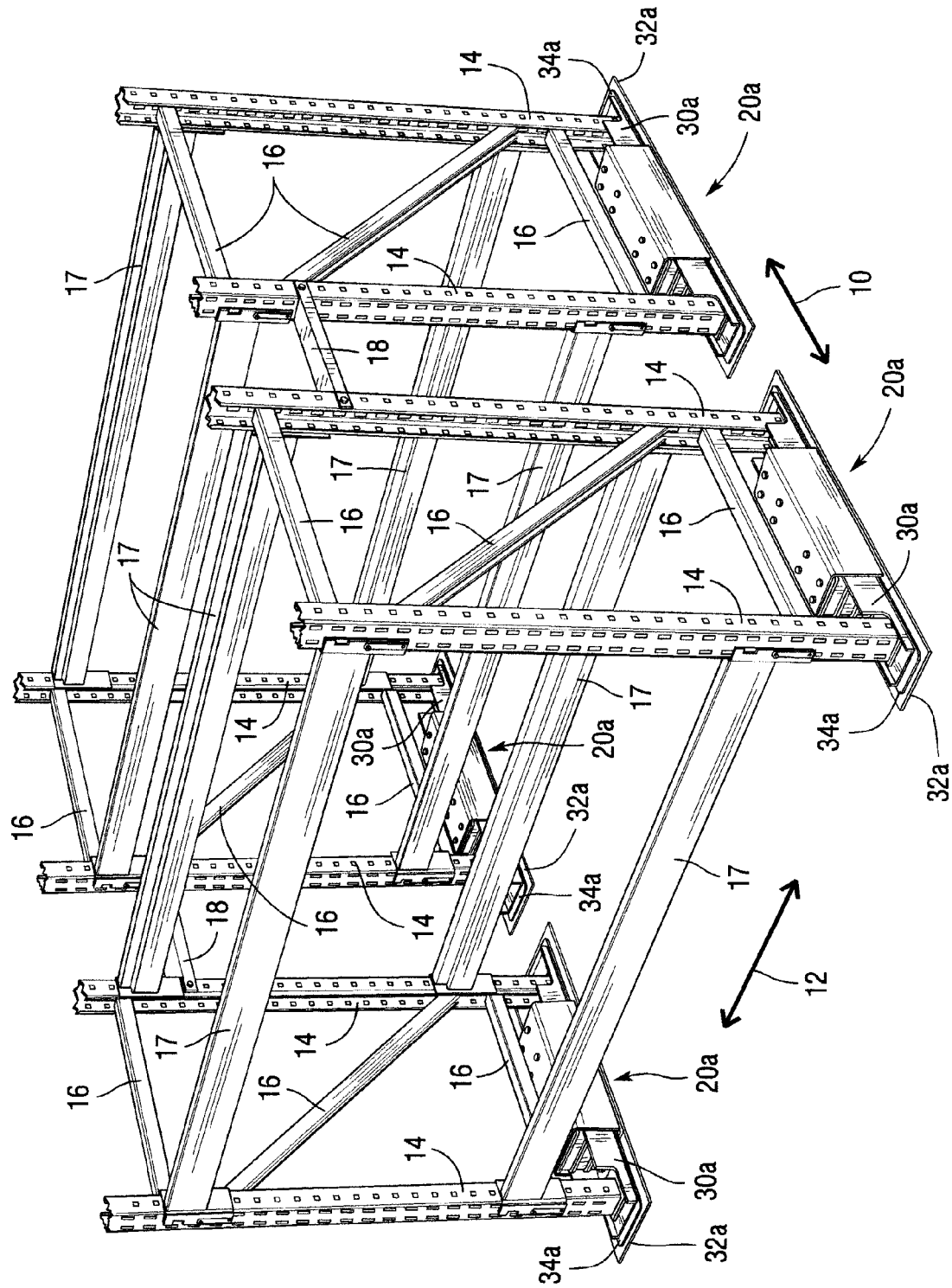
FIG. 3A is a perspective view of an eight-column storage rack system with storage rack vibration isolators located primarily between columns in the less flexible second horizontal dimension.

FIG. 3A depicts a storage rack system having two four-column storage rack units formed from two pairs of two-column upright frames of the type depicted in FIG. 1 arranged back-to-back and connected by spacers 18 to form a storage rack system of eight columns 14. The two pairs of upright frames form two storage bays. The space between the two storage bays defined by the spacer 18 is referred to as the flue. Storage rack vibration isolators 20a are installed between the two adjacent columns 14 in the less-flexible, cross-aisle direction 10 on each side of each storage bay of the storage rack system.

Figure 3B:
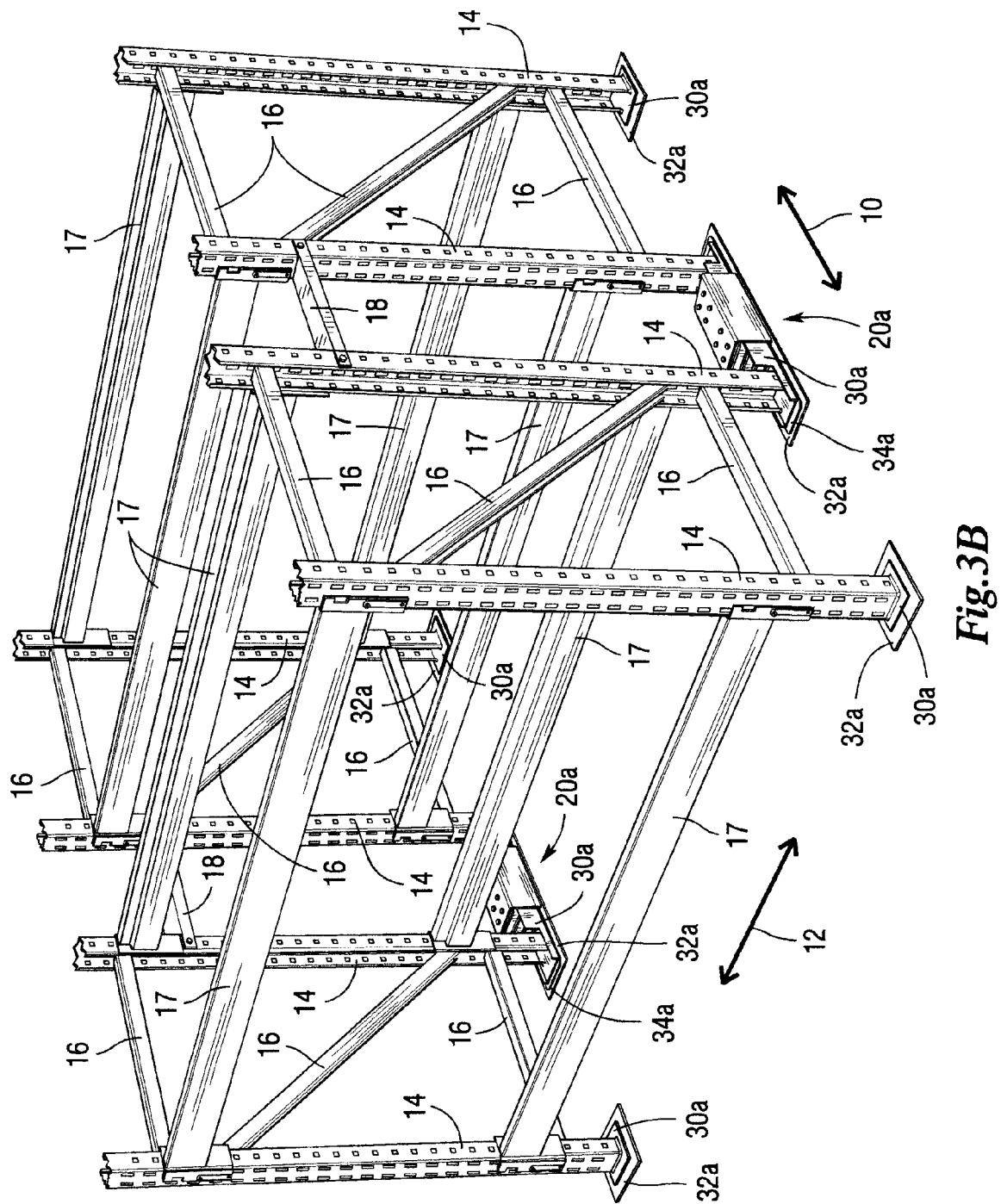
FIG. 3B is a perspective view of an eight-column storage rack system with storage rack vibration isolators located primarily between columns in the flue space in the less flexible second horizontal dimension.

The fact that two of the adjacent columns are on different individual rack units does not prevent placement of storage rack vibration isolators in the flue region so long as the particular type of storage rack vibration isolator is modifiable to fit in the flue space or if there is enough flue space to fit the storage rack vibration isolator. FIG. 3B shows storage rack vibration isolators 20a installed in the flue space between adjacent columns 14 in the less-flexible, cross-aisle direction 10 of the storage rack system. The storage rack vibration isolators 20a in the flue space in FIG. 3B are modified versions of the storage rack vibration isolators 20a shown in FIG. 3A.

Figure 4:
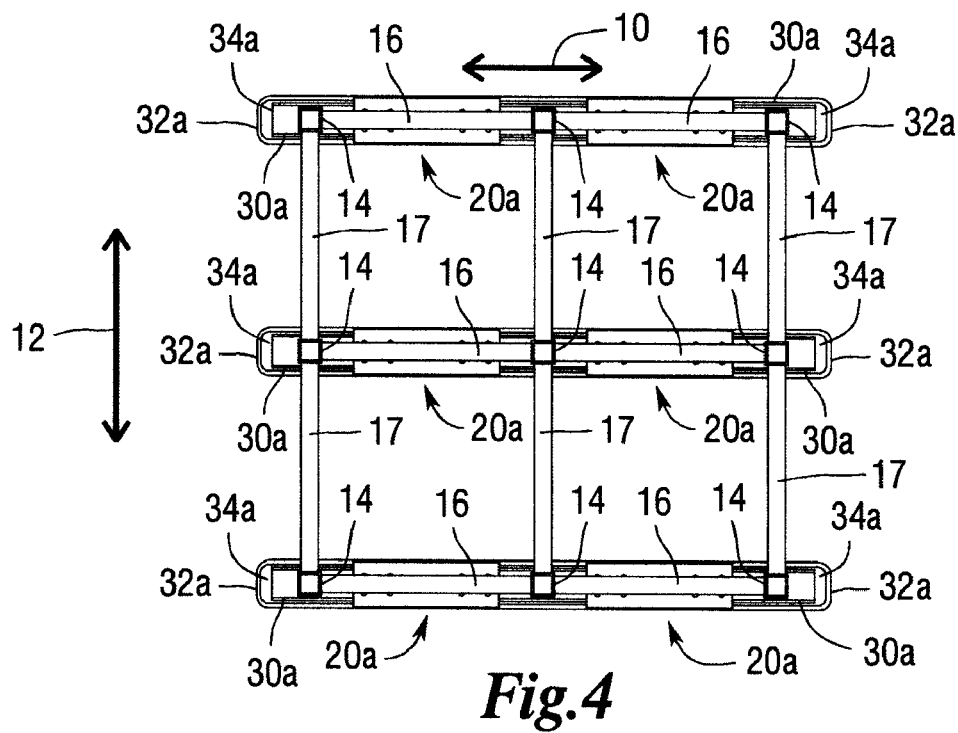
FIG. 4 is a simplified overhead cross-sectional view of a nine-column storage rack system with storage rack vibration isolators located primarily between columns in the less flexible second horizontal dimension.
Figure 5:
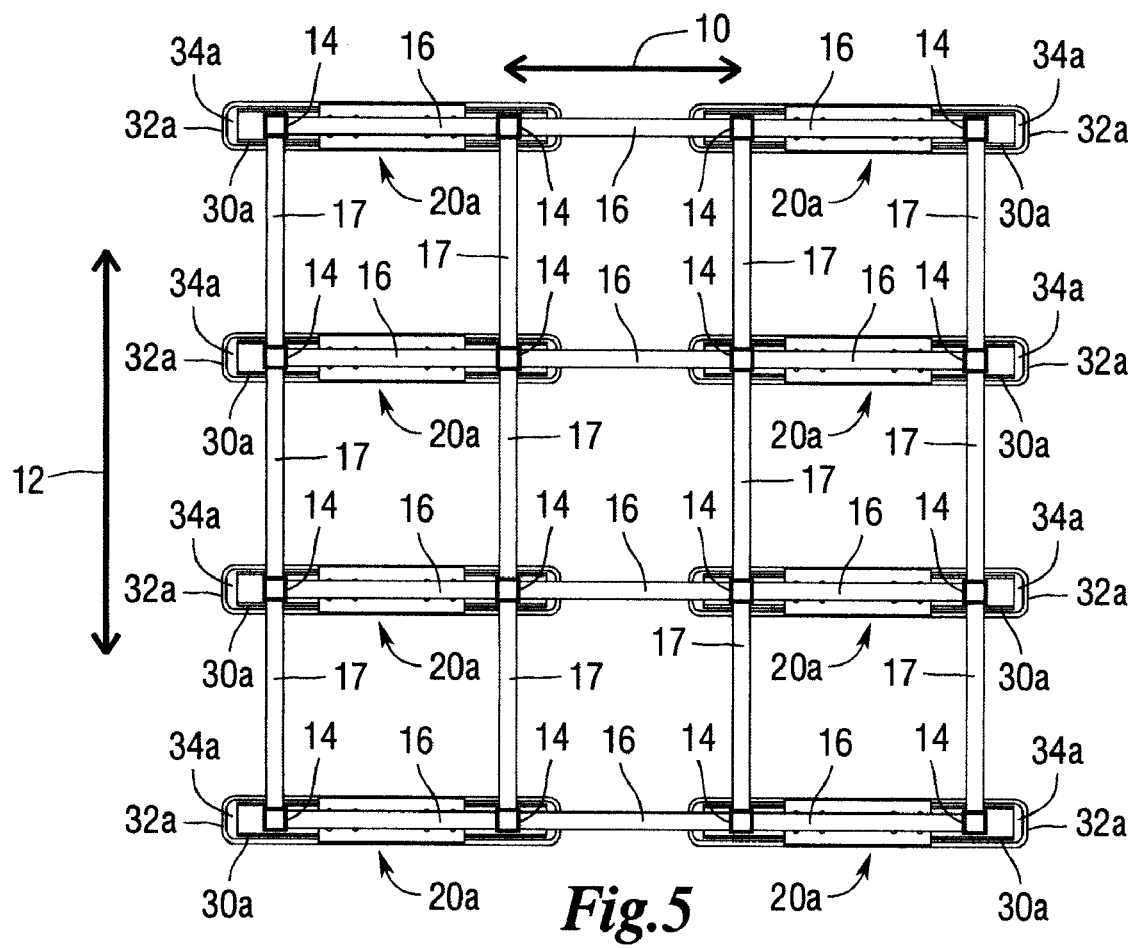
FIG. 5 is a simplified overhead cross-sectional view of a sixteen-column storage rack system with storage rack vibration isolators located primarily between columns in the less flexible second horizontal dimension.

The storage rack system need not be limited to two parallel rows of columns forming a single storage bay as has been shown in FIGS. 1 through 3B. FIG. 4 shows a simplified cross-sectional top view of a storage rack system having three rows of three columns forming two storage bays. Each row of columns 14 has a storage rack vibration isolator 20a installed between the adjacent columns 14 in the less flexible cross-aisle direction 10. FIG. 5 shows a cross-sectional top view of a sixteen column storage rack system having four rows of four columns forming three storage bays. Each row of columns 14 has a storage rack vibration isolator 20a installed between the first two columns 14 and the last two columns 14 in the less flexible cross-aisle direction 10.

FIGS. 6A through 6D depict simplified cross-sectional top views of rows of five columns 14 extending in the less-flexible, cross-aisle direction of a storage rack system. FIG. 6A shows a storage rack vibration isolator installed between each pair of adjacent columns 14. Depending on the features of a particular storage rack system, a storage rack vibration isolator 20a is not required between every two columns in the less flexible, cross-aisle direction. If sufficient seismic damping is achievable with fewer storage rack vibration isolators 20a, within the parameters discussed herein, then fewer storage rack vibration isolator units 20a may be used, so long as all the columns are moveable on the floor. For example, while FIG. 6A depicts the five-column row with storage rack vibration isolators 20a installed between every two columns, FIG. 6B depicts a similar row with only three sets of storage rack vibration isolators 20a. FIGS. 6C and 6D depict a similar five column row with only two storage rack vibration isolators 20a, one of which is located between each end column 14 and the columns 14 adjacent it. In FIGS. 6A-6D the columns 14 are coupled to column support assemblies that allow them to move in one horizontal direction. FIG. 6C shows that the sliding base pad 30a and the fixed base pad 32a need not extend across and under every column 14 of the row. The third column is mounted on a variation of column support assembly comprising a sliding base pad 30f positioned on a fixed base pad 32f that is limited in size to the expected area that the column will move over during seismic events.

The design characteristics of the particular storage rack system on which storage rack vibration isolators are to be installed should be studied to determine the acceptable types, numbers, and combinations of storage rack vibration isolators that should be used. While certain parameters must merely be minimized, like the natural frequency of the storage rack system, different embodiments of storage rack vibration isolators have features that provide advantages and disadvantages that should be taken into consideration.

Figure 7:
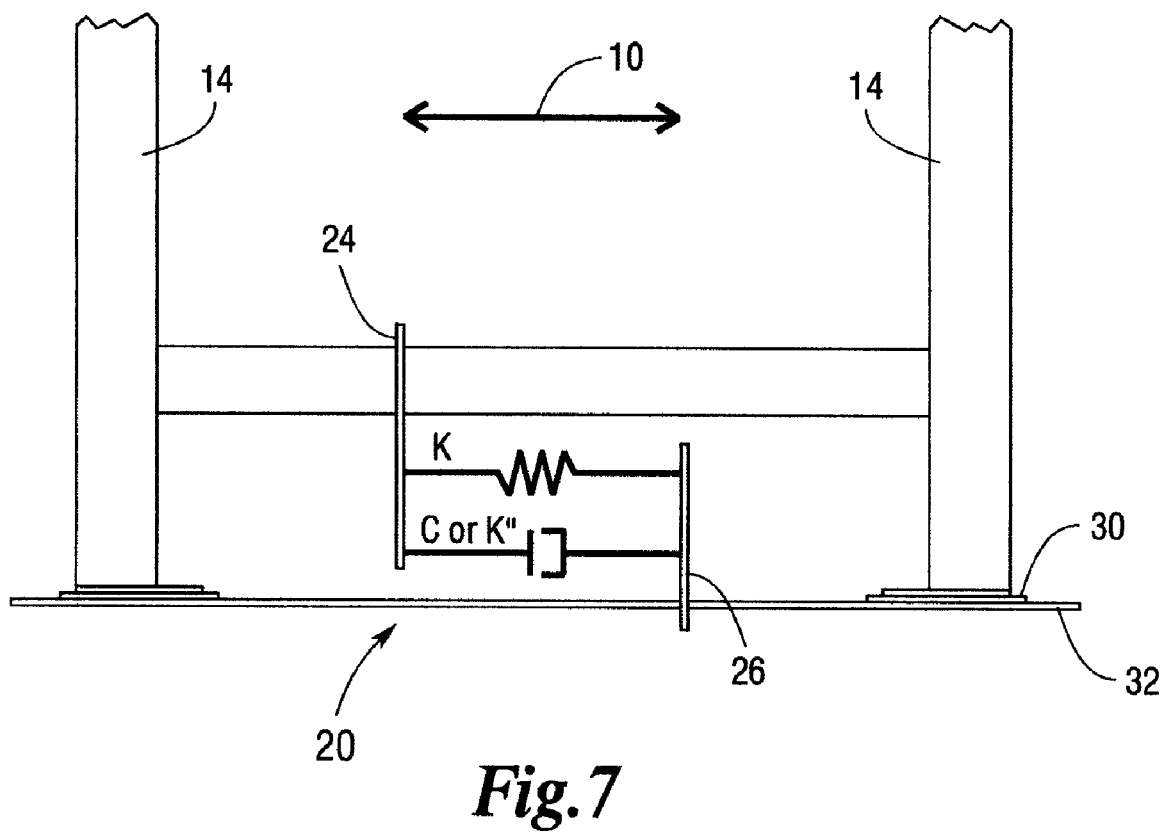
FIG. 7 is a schematic drawing of the general requirements of a storage rack vibration isolator located primarily between columns of a storage rack system in the less flexible second horizontal dimension.

The schematic drawing of FIG. 7 illustrates the general requirements of a storage rack vibration isolator 20 for use with a storage rack system installed on a floor. As has already been discussed, typical storage rack systems have a plurality of columns 14 and are more flexible in a first horizontal dimension (not shown) and less flexible in a second horizontal dimension 10. Each storage rack vibration isolator 20 is located primarily between adjacent columns 14 in the storage rack system's less flexible second horizontal dimension 10. The storage rack vibration isolators 20 comprise at least one seismic vibration absorption and dissipation structure that includes a first member 24 connectable in some manner to the storage rack system and a second member 26 connectable in some manner to the floor. The columns 14 are mounted to at least one column support assembly that enables the columns 14 to move with respect to the floor a sufficient distance back and forth to reduce the natural frequency of the storage rack system in the less flexible cross-aisle direction. In FIG. 7 the column support assembly comprises a sliding base pad 30 attached to the bottom of each column. The sliding base pads 30 rest on a fixed base pad 32 mounted on the floor, however other configurations and types of column support assemblies are possible, some of which are discussed herein. Movement of the columns is restricted mechanically to substantially along the less flexible second horizontal dimension 10 by structures either inherent in the design of the storage rack vibration isolator 20 or incorporated in mechanical elements (not shown).

Storage rack vibration isolators 20 function on the principle of energy dissipation through energy absorption due to movement of the vibration isolators 20 and through hysteresis losses or viscous damping and secondary friction damping. In other words, some of the energy transmitted to the storage rack system during seismic events is not absorbed by the storage rack system but is lost through the proper functioning of the seismic vibration absorption and dissipation structures of storage rack vibration isolators 20. Such damping losses are caused by the physical properties of the seismic vibration absorption and dissipation structures including viscous damping, C, or hysteresis damping with damping stiffness, K", and with spring stiffness, K. Viscous damping, C, refers to the dissipation of vibratory energy over time or distance. Spring stiffness, K, is a general term that may be applied to structures or materials that refers to the resistance of a body to deflection or displacement. The stiffer the material or body, the greater the amount of force required for deflecting or displacing it. The energy required to overcome the force of friction by the column support assembly to move the storage rack system during seismic events also contributes to the calculation of viscous damping and spring stiffness. Additionally, the length of movement of the particular seismic vibration absorption and dissipation structure, back and forth from their resting positions, must be sufficient to lower the natural frequency of the rack in the less flexible direction to the desired frequency. The combination of these properties in various designs of storage rack vibration isolators 20 allows a range of possible designs to meet the needs for seismic isolation.

Figure 8:
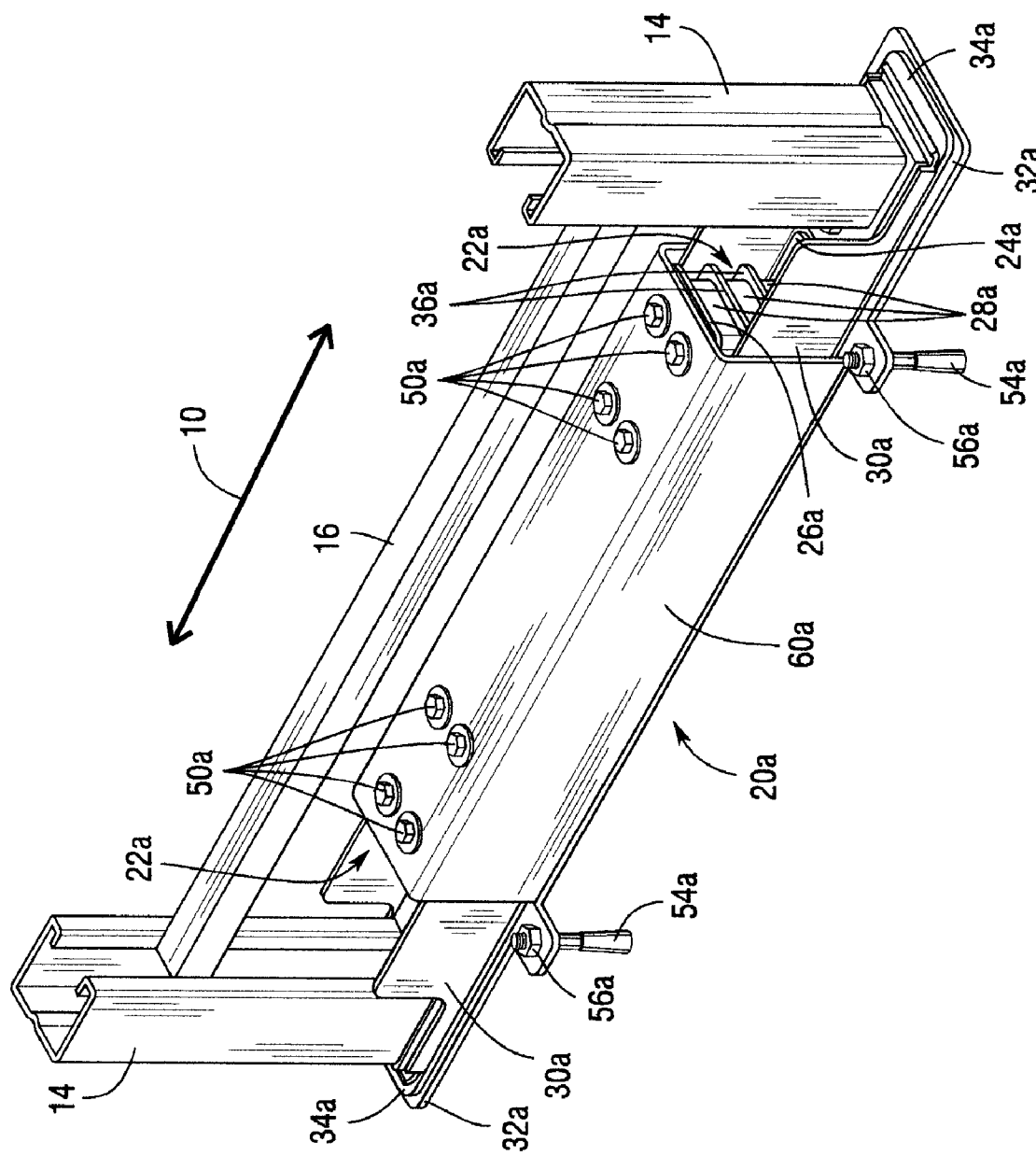
FIG. 8 is a perspective view of one embodiment of a storage rack vibration isolator located primarily between columns of a storage rack system in the less flexible second horizontal dimension.

FIG. 8 depicts a seismic vibration isolator 20a coupled to a pair of adjacent columns 14 in the less flexible second horizontal dimension 10 of a storage rack system. The seismic vibration isolator 20 is a unitized seismic isolation mechanism that is easily adaptable to existing storage rack systems without requiring significant modifications of the storage rack systems.

Figure 9:
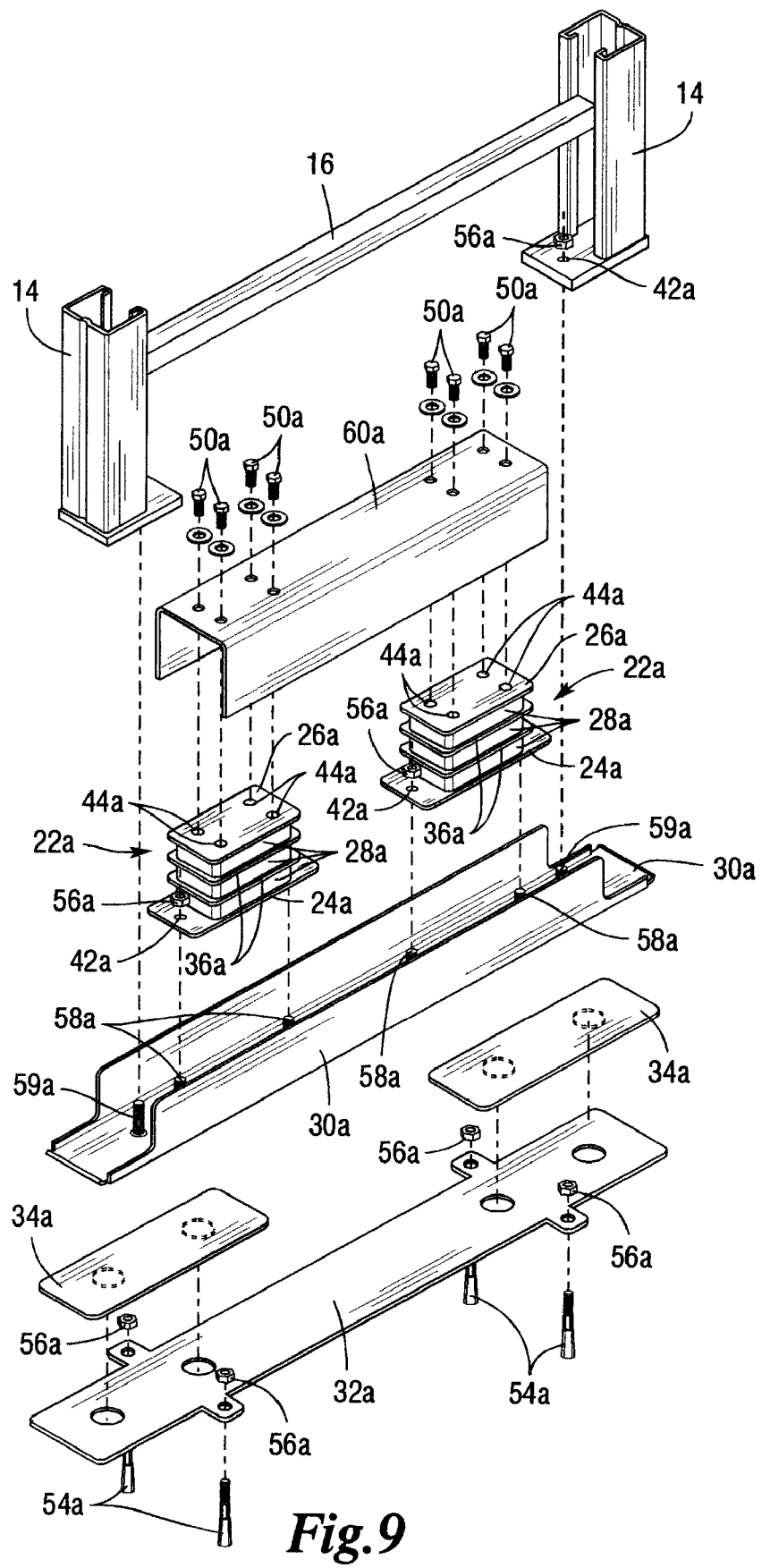
FIG. 9 is an exploded view of the storage rack vibration isolator of FIG. 8.

As can be best understood by comparing FIG. 8 with FIG. 9, each storage rack vibration isolator 20a comprises a number of vibration absorption and dissipation structures that include first members connectable to the storage rack system and second members connectable to the floor. In this case the vibration absorption and dissipation structures are elastomeric components 22a, the first members connected to the storage rack system are first mounting plates 24a, and the second members connected to the floor are second mounting plates 26a. Each elastomeric component 22a is operatively attached to the first and second mounting plates 24a and 26a such that during seismic events the first and second plates 24a and 26a remain attached to the elastomeric component 22a while the first and second plates 24a and 26a are able to move in planes substantially parallel to each other.

In this embodiment, each elastomeric component 22a is made up of three laminated elastomeric members 28a with intermediate plates 36a positioned between the elastomeric layers 28a. The intermediate plates 36a may be rigid or nonrigid. The elastomeric members 28a are secured in place to the first and second plates 24a and 26a and to the intermediate plates 36a with an adhesive material (not shown). The adhesive material forms a substantial bond that is sufficient to prevent the first and second mounting plates 24a and 26a and the intermediate plates 36a from losing contact with the elastomeric members 28a, even when the storage rack vibration isolator 20a is subjected to substantial external forces. Appropriate adhesives include Chemlok® 8560F, Chemlok® 8210/8560S, and Chemlok® 236A, all manufactured by Lord Corporation, or other adhesive substances that are suited to providing such substantial bonds between elastomers and rigid materials. It is contemplated that the adhesive between the elastomeric layers 28a and the first and second mounting plates 24a and 26a and the intermediate plates 36a would be alone sufficient for adequate bonding, though washers, such as the rectangular washers, with extended bolts or other additional clamping mechanisms could also be added. Because storage rack systems in practice are likely to be carrying a range of loads at different times, the elastomeric members 28a are selected to be able to operate effectively over a range of loading conditions and applications. While each elastomeric member 28a could be of the same material, it is possible to select layers of materials with different characteristics to select for properties sought for particular applications.

The elastomeric members are made of material that is capable of absorbing and dissipating the energy of ground movement during seismic events. For example, the elastomeric member 28a can be constructed from polyisoprene, a polyisoprene blend, butyl rubber, acryl rubber, polyurethane, flurorubber, polysulfide rubber, ethylene-propylene rubber (EPR and EPDM), Hypalon, chlorinated polyethylene, ethylene-vinyl acetate rubber, epichlorohydrin rubber, chloroprene rubber, silicone, or other heavily damped elastomer such as those manufactured by Corry Rubber Corporation of Corry, Pa. The elastomeric member 28a can also be constructed out of any elastomeric material that will withstand the loading requirements and has the desired stiffness characteristics set forth herein.

The storage rack vibration isolator 20a includes a column support assembly, which comprises a sliding base pad 30a and a fixed base pad 32a that are long enough to extend between and under both columns 14. The sliding base pad 30a includes multiple studs 58a that extend upward from the top surface of the sliding base pad 30a. The studs 58a can be compression fit and/or welded or otherwise attached to the sliding base pad 30a. Each stud 58a is aligned to engage the stud holes 42a of the first mounting plates 24a when the first mounting plates 24a are positioned on the sliding base pad 30a, with each stud penetrating and extending above the top surface of the first mounting plates 24a when the storage rack vibration isolator 20a is assembled. The first mounting plates are secured to the sliding base pad 30a with base nuts 56a. The studs 58a preserve the relative alignment of the elastomeric components 22a with the sliding base plate 30a when the storage rack vibration isolator 20a is assembled.

A restriction element 60a is welded to a fixed base pad 32a, creating a box fabrication into which the sliding base pad 30a with the assembled elastomeric components 22a is slid into. If used, at least one layer of low friction bearing material 34a is interposed between the fixed base pad 32a and the sliding base pad 30a. It has been determined that the layer of low friction bearing material 34a need not extend over the length of the sliding base pad 30a, and that the shorter pieces depicted in FIG. 9 are sufficient to enable the columns 14 to slide during seismic events. While it may be possible to secure the low friction bearing material 34a to either the sliding base pad 30a or the fixed base pad 32a, the embodiment depicted in FIG. 9 shows the low friction bearing material 34a secured to the fixed base pad 32a. While the low friction bearing material 34a may be secured simply with adhesives, the embodiment depicted in FIG. 9 shows the low friction bearing material 34a with shear tabs molded or machined to fit into corresponding holes in the fixed base pad 32a. This helps secure the low friction bearing material 34a in place and reduces the amount of adhesive required between the low friction bearing material 34a and the fixed base pad 32a.

The second mounting plates 26a have screw holes 44a that are aligned to the corresponding holes in the box fabrication restriction element 60a. The box fabrication restriction element 60a acts as a fastening member to connect the second mounting plates 26a to the floors. The second mounting plates 26a are secured to the restriction element 60a with sets of screws and washers 50a. The completed structure, prior to attachment of the columns 14, represents a unitized storage rack vibration isolation system that can be adapted to existing and newly built storage rack systems. Additional studs 59a incorporated into the sliding base pad 30a are used to secure the columns 14 to the sliding base pad 30a. In this particular embodiment, the sliding base pad 30a is cut to allow access to the lower ends of the columns. The storage rack vibration isolator 20a is mounted to the floor and secured in place with base nuts 56a through anchor bolts 54a that are embedded in the floor.

During seismic events, the structure of the box fabrication restriction element 60a serves to restrict the horizontal movement of the seismic vibration absorption and dissipation structures 22a to essentially make the damping effect unidirectional and parallel to the fixed base pad 32a. The sliding base pad 30a projects over the end of the fixed base pad 32a to about the extent of the movement of storage rack system during each vibration cycle. The restraining element 60a also restricts vertical movement of the storage rack vibration isolator 20a. During seismic events, while the restriction element 60a remains fixed because it is attached to the fixed base pad 32a, the sliding base pad 30a, attached to the elastomeric components 22a, slides through the tunnel created by the restriction element 60a and the fixed base pad 32a. At the end of the seismic event, the potential energy stored in the elastomeric components 22a bias them to return the storage rack system to about its original position. While FIGS. 8 and 9 show the fixed base pad 32a and sliding base pad 30a extending beyond the columns 14, in this particular embodiment of storage rack vibration isolators, the fixed base pad 32a and sliding base pad 30a may be configured to end much closer to the columns 14.

If the elastomeric components 22a were to fail, the restriction element 60a would help secure the storage rack system in all directions through the metal-on-metal contact between the sliding base pad 30a and the restriction element 60a. Even though the restriction element 60a restricts vertical movement and movement in the more flexible horizontal dimension of the storage rack system, the space between the restriction element 60a and the sliding base pad 30a allows room for deflection of the elastomeric components 22a in those directions. This provides additional vibration damping and isolation in those directions and improves the performance of the storage rack vibration isolators 20a. The restriction element 60a also serves to protect the storage rack vibration isolator from impacts.

When seismic events such as earthquakes occur, the earth moves and sets up vibrations in a lateral direction. The bottoms of anchor bolts 54a are held firmly within the concrete floor in which they are embedded, and the base nuts 56a on the anchor bolts 54a hold the fixed base pad 32a against the floor. The mechanical restriction element 60a is welded to the fixed base 32a and has the second mounting plates 26a of elastomeric components 22a attached to it and allows them to vibrate with the floor during the earthquake. These vibrations are transmitted through the elastomeric components 22a to the first mounting plates 24a and the sliding base pad 30a to which it is attached. The columns 14 are not fixed to the floor and are free to slide with the slide base pad 30a to which they are attached over the low friction bearing material 34a and the fixed base pad 32a and the elastomeric component 22a stretches in response to the movement. This stretching movement dissipates some of the energy of the earthquake that is transmitted to the storage rack system. The elastomeric components 22a absorb some of the lateral vibrations and helps isolate the storage rack system from some of the lateral vibrations caused by the earthquakes. Some energy imparted to the storage rack system is also dissipated in overcoming the frictional forces at the column support assembly to allow the columns to move. As a result, the storage rack vibration isolator 20a reduces the natural frequency of the storage rack system and reduces the effects of an earthquake on the storage rack system and on the items or materials stored on its storage platforms. The potential energy stored in the elastomeric component 22a biases it to return the storage rack system to about its original position at the end of a seismic event.

The sliding base pad 30a and the fixed base pad 32a extend just beyond the outside end of the columns 14. As a result, the sliding base pad 30a projects over the end of the fixed base pad 32a to the extent of the movement of the storage rack system during each vibration cycle while supporting the columns 14 mounted on it. This minimizes the protrusion of the sliding base pad 30a into an aisle adjacent the storage rack system prior to the occurrence of a seismic event, thus minimizing or eliminating any risk of someone tripping over the sliding base pad 30a or hitting it with the wheels of equipment. Where practical the sliding base pad 30a and the fixed base pad 32a can extend to the outside end of the columns 14 to further eliminate the protrusion of the sliding base pad 30a into an adjacent aisle.

Selecting appropriate elastomers that can be used in the elastomeric component 22a of storage rack vibration isolators of the type described in FIGS. 8 through 17 has to take into consideration a number of factors, including the design load on the storage rack system and the target natural frequency to be reached. While any reduction in the natural frequency of the storage rack system will provide some protection against seismic events, the goal is to reduce the natural frequency of the storage rack system such that damage to the storage rack system is reduced significantly and product stored on the storage racks does not fall off. It is preferable to reduce the natural frequency of the storage rack system to less than about 0.9 Hz, or ideally to less than about 0.5 Hz. Storage rack vibration isolators can be selected to achieve such frequencies, taking into account the target natural frequency to be achieved and the expected maximum load on the storage rack system. Both these parameters can be accounted for by selecting the elastomeric material used in the elastomeric component based on its static and dynamic modulus, or stiffness.

The static stiffness of an elastomeric material can be measured by several factors, including the compression stiffness, $K_{compression}$, and the shear stiffness, $K_{shear}$. The compression stiffness, $K_{compression}$, is a measure of the force required to deflect an elastomer, such as a block of rubber, a vertical distance, measured in pounds per inch. The shear stiffness, $K_{shear}$, is a measure of the amount of force required to deflect a block of rubber a particular lateral distance, measured in pounds per inch.

Among the dynamic characteristics that make elastomeric materials useful for absorbing energy during seismic events is their elastic and inelastic components that cause force and displacement to be out of phase, allowing energy dissipation or "damping" to occur. The dynamic characteristics of an elastomeric mount include damping stiffness, K", representing inelastic stiffness as reflected in the "lag time" between a displacement and a subsequent force exerted by the material, and elastic stiffness, K', representing the stiffness that is in phase with a displacement of the material. Damping stiffness, K", and elastic stiffness, K' are the specific application to elastomeric materials of, respectively, viscous damping, C, and spring stiffness, K, that were introduced in FIG. 7. Damping stiffness, K", and elastic stiffness, K', are both measured in pounds per inch. The damping loss factor, $L_{dlf}$, of a particular rubber is the ratio of its damping stiffness divided by its elastic stiffness, $$L_{dlf} = \frac{K''}{K'}$$

A dynamic test machine is used to dynamically load an elastomeric material and measure the extent to which the spring response of the material is dampened by the material's physical characteristics. Rubber or another elastomeric material should have a damping loss factor greater than about 0.1, i.e.

$$\frac{K''}{K'} > 0.1$$

The stiffness parameters discussed above are also related to the hardness of the elastomer, measured in durometer. The higher the durometer value of a particular elastomer the harder it is.

The energy dissipated by an elastomeric material per cycle of vibration is equal to:

$$\pi K''x^2$$

where K" is the damping stiffness and x is the peak-to-peak distance of movement of the ends of the elastomeric material during a vibration, that is, the total distance of a vibration in both directions. Thus, the energy dissipated per cycle of vibration increases with the square of the increase of the peak-to-peak distance of the movement between the ends of the vibrating elastomeric material. Additionally, the material frequency of the rack system decreases as the increased distance of movement between the ends of the elastomeric material increases the distance the lower ends of the rack columns move per cycle of vibration. It was determined that the lower ends of rack columns should be allowed to move at least about two inches and preferably more than about four inches, in each direction from their resting position during each cycle of seismic vibration.

As has been discussed, because the storage rack system is less flexible in the cross-aisle direction than in the down-aisle direction, the elastomers must be selected to at least lower the natural frequency of the whole storage rack system in at least the cross-aisle direction. It has been calculated that for storage rack systems with a design maximum load capacity of about 40,000 lbs and having three rows of two columns each in the less flexible cross-aisle direction, a storage rack vibration isolator system that has a total shear stiffness of about 1,600 lbs/in for the entire storage rack system and allows the columns to move about five inches in both directions from their resting positions would reduce the natural frequency of the storage rack system to about 0.6 Hz in the cross-aisle direction.

Seismic testing has been successfully conducted on this type of storage rack system having a 40,000 lb. load distributed on two bays three and four levels high typical of a warehouse retail store configuration. The storage rack system comprised three rows of columns having two columns each in the less flexible, cross-aisle direction. Two storage rack vibration isolators were installed between each row of two columns in the less flexible cross-aisle direction in the configuration shown in FIGS. 10 and 16. The tests were conducted in accordance with the AC-156 Accepted Criteria For Seismic Qualification by Shake-Table Testing of Nonstructural Components and Systems of ICC Evaluation Services to achieve performance levels as outlined in the Federal Emergency Management Agency's FEMA 460 Seismic Considerations for Steel Storage Racks Located in Areas Accessible to the Public. The storage rack systems mounted on the shake tables were subjected to amplitudes corresponding to up to 200% of the AC-156 qualification levels. Each of the six storage rack vibration isolators had a static shear stiffness of about 270 lbs/in. for a total of 1,600 lbs/in and the ends of the elastomers moved under shear sufficiently to allow the columns to move about five inches in each direction from their resting positions for a total of about ten inches of peak-to-peak distance. This storage rack systems did not suffer any significant damage and the loads did not fall off the racks. The number of columns of the storage rack system does not limit the number of storage rack vibration isolator units that can be used. Additional storage rack vibration isolator units could be installed between the columns to achieve appropriate results if there is room for them.

It has been determined that elastomeric components made of butyl rubber (ASTM D2000 4AA 415 A13 Z1) with a stiffness of about 40 durometer and a loss factor of about 0.3 are suitable for use in storage rack systems with design maximum loads of up to about 10,000 lbs per upright frame. Elastomeric components made of butyl rubber with a stiffness of about 40 durometer could be used for storage rack systems with maximum design loads of up to about 20,000 lbs per upright frame. Additional damping could be provided to limit the larger travel requirements of the softer elastomers. It has been determined that elastomeric components made of butyl rubber (ASTM D2000 4AA 615 A13 Z1) with a stiffness of about 60 durometer and a loss factor of about 0.45 are suitable for use in storage rack systems with maximum design loads of between about 10,000 lbs and about 20,000 lbs per upright frame. Additional testing should be conducted to determine optimal characteristics for the elastomeric components for various designs of storage racks with various design load ranges. If softer materials are used for applications across the range of maximum design loads of storage rack systems, additional damping may be incorporated into the elastomeric component. This could be achieved by including deformable lead cores, polymeric yielding devices, metallic yielding devices, or other devices into the elastomeric components. Other secondary damping elements, such as hydraulic shock absorbers, could be added in parallel with the isolation damper.

Polyisoprene, polyisoprene blend, butyl rubber, acryl rubber, polyurethane, flurorubber, polysulfide rubber, ethylene-propylene rubber (EPR and EPDM), Hypalon, chlorinated polyethylene, ethylene-vinyl acetate rubber, epichlorohydrin rubber, chloroprene rubber, and silicone elastomers are among the materials that have been determined to meet the general requirements for being a suitable elastomeric member. However, it will be appreciated that other materials that generally meet these requirements may also be suitable and are contemplated to be within the scope of this embodiment of the invention.

Figure 10:
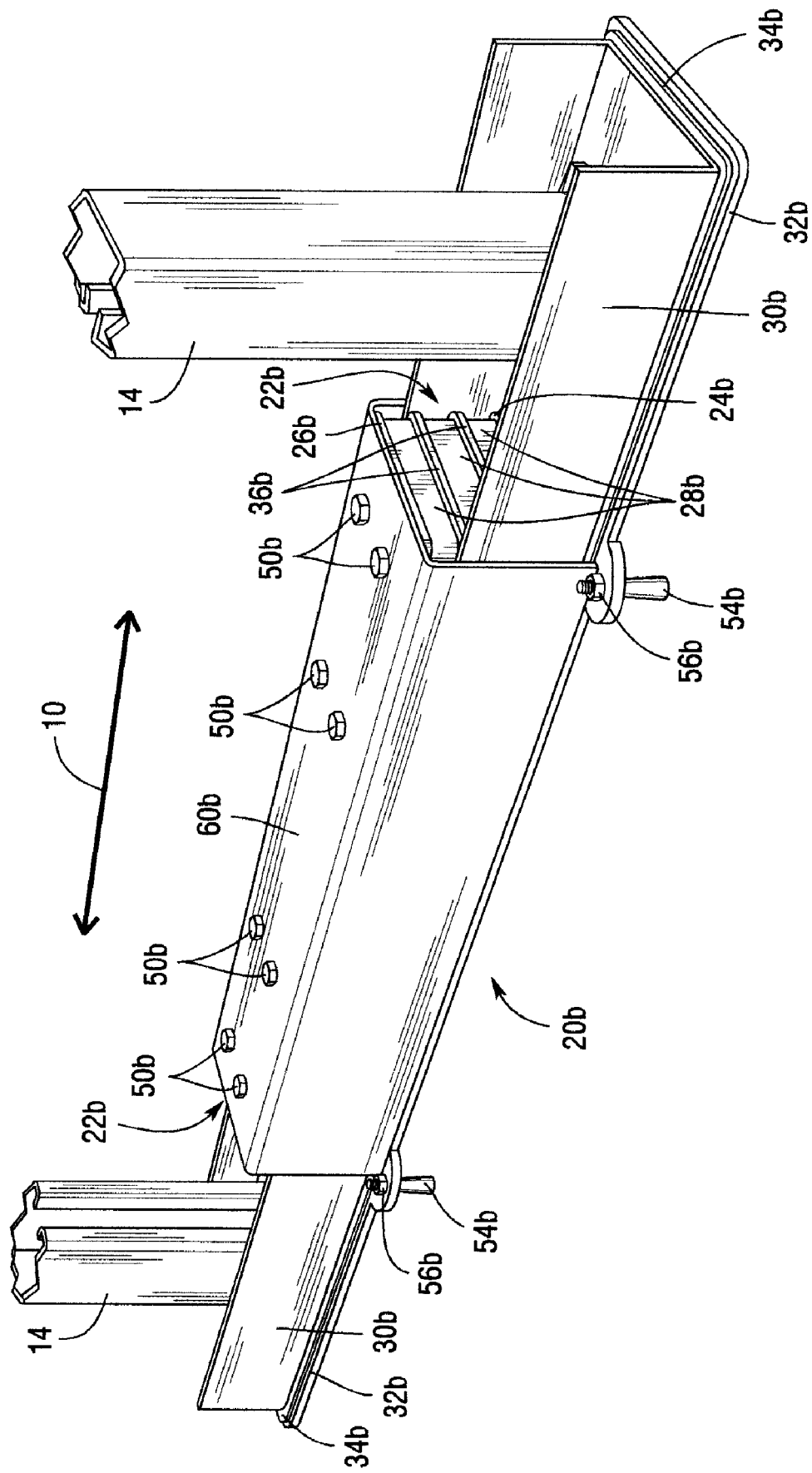
FIG. 10 is a perspective view of one embodiment of a storage rack vibration isolator located primarily between columns of a storage rack system in the less flexible second horizontal dimension that is a variation of the storage rack vibration isolator of FIG. 8.

Variations in the design of storage rack vibration isolators that are suitable for this embodiment of the invention are also contemplated. In FIG. 10 a storage rack vibration isolator 20b has the sliding base pad 30b that protects the lower ends of the columns 14. While access to the lower ends of the columns 14 is restricted in this configuration, this embodiment provides additional protection to the columns from side impacts.

The storage rack vibration isolators of the type shown in FIGS. 8 through 10 have been shown attached to two columns in storage rack system. However, these storage rack vibration isolators need only be attached to a single column in the storage rack system so long as all the columns in the storage rack system are mounted on column support assemblies that would allow the columns to move.

Figure 11:
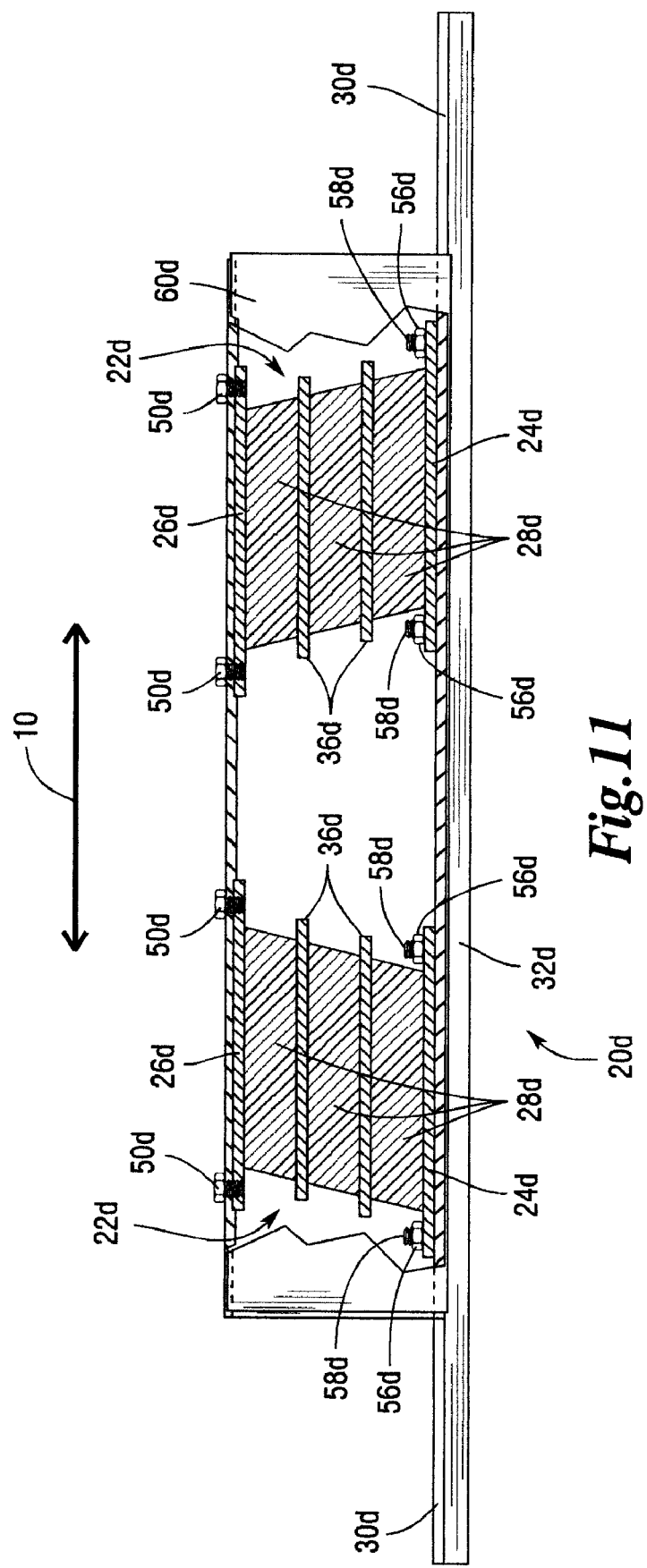
FIG. 11 is close-up cut out view of an alternative assembly of the elastomeric components shown in FIGS. 8-10.

FIG. 11 is a cross-sectional view of an alternative assembly of storage rack vibration isolator 20d in which the elastomeric components 22d are installed with the two second mounting plates 26d slightly off-set horizontally toward one another in the restriction element 60d. This pre-loads the elastomeric components 22d to increase the bias of the elastomeric components 22d to return the storage rack system to its original position. Alternatively the two first plates 24d could be similarly horizontally off-set to achieve a similar effect. The elastomeric components 22d could also be preloaded vertically to impart a vertical tension in the elastomeric layers 28d. This would reduce the friction between the sliding base pad 30d and the fixed base pad 32d and allow for easier movement of the storage rack system during seismic events. Such pre-loading is readily adaptable to any variation of storage rack vibration isolators described herein that incorporate elastomeric components.

Figure 12:
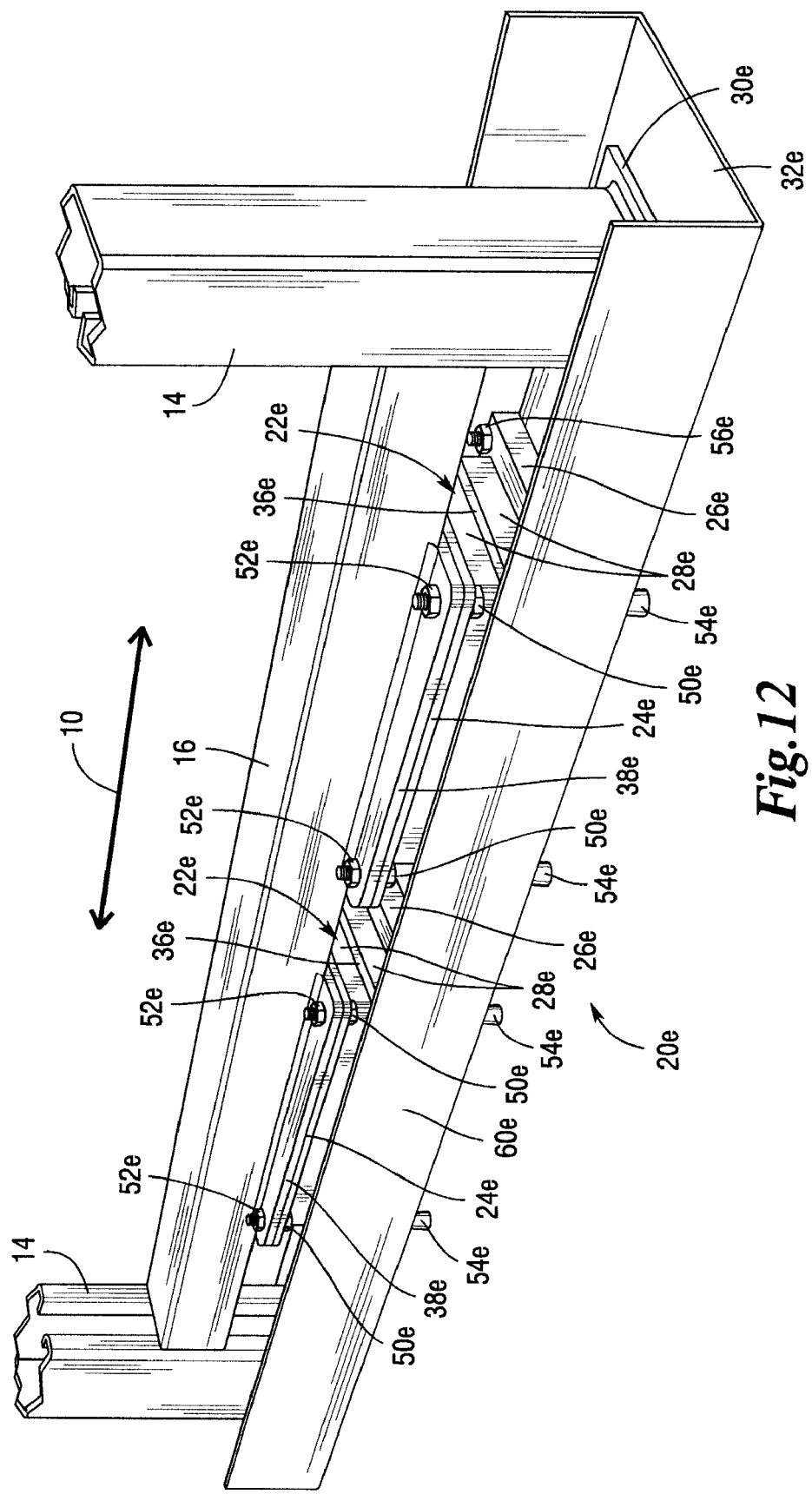
FIG. 12 is a perspective view of one embodiment of a storage rack vibration isolator located primarily between columns of a storage rack system in the less flexible second horizontal dimension.

In FIG. 12 a storage rack vibration isolator 20e is attached to a cross brace 16 of the storage rack system in the less flexible cross-aisle direction 10. In this embodiment the storage rack vibration isolator 20e comprises a pair vibration absorption and dissipation structures that serve as the interface between the storage rack system and the floor.

Figure 13:
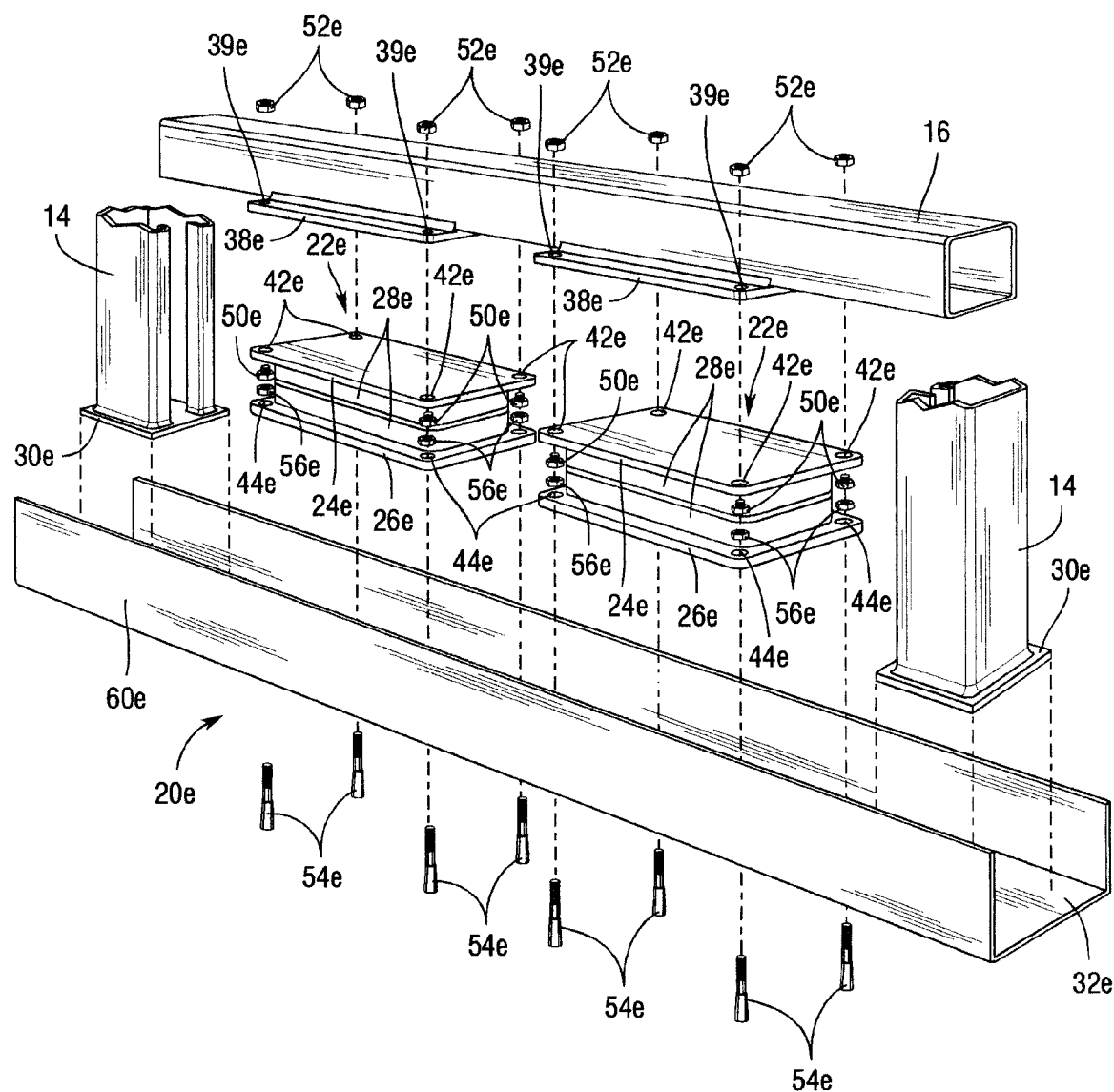
FIG. 13 is an exploded view of the storage rack vibration isolator of FIG. 12.

As may be best understood by comparing FIGS. 12 and 13, each vibration absorption and dissipation structure comprises elastomeric components 22e having a first mounting plate 24e, a second mounting plate 26e and elastomeric members 28e. The elastomeric members 28e are operatively attached to the first and second mounting plates 24e and 26e such that during seismic events the first and second mounting plates 24e and 26e remain attached to the elastomeric component 22e while the first and second mounting plates 24e and 26e are able to move in planes substantially parallel to each other. In this case each elastomeric component 22e is made up of two laminated elastomeric members 28e with an intermediate plate 36e positioned between them. As with the previously described embodiment, the elastomeric members 28e are secured to the intermediate plate 36e with adhesives.

The cross brace 16 includes attachment members 38e welded to it at locations that correspond to the locations where the elastomeric components 22e are to be installed along the cross brace 16. The attachment members 38e include holes 39e that are aligned with holes 42e on the first mounting plate 24e when the storage rack vibration isolator 20e is assembled. The holes 39e on the attachment member 38e and first mounting plate holes 42e are sized to accommodate screws 50e which provide attachment between the attachment member 38e and first mounting plate 24e and which can be tightened into position with plate nuts 52e. The screws 50e and plate nuts 52e allow the attachment member 38e to be detached from the first mounting plate 24e without requiring cutting or damage to the elastomeric components 22e. While FIG. 12 depicts a storage rack vibration isolator system with two vibration absorption and dissipation structures attached to the cross brace 16, it will be appreciated that the actual number of vibration absorption and dissipation structures attached to a cross brace may be varied as needed.

The vibration absorption and dissipation structures are coupled to a fixed base pad 32e that extends under and across the columns 14. The second mounting plate 26e includes holes 44e at the four corners that are aligned with holes in the fixed base pad. The threaded ends of anchor bolts 54e are placed through the holes 44e in the second mounting plate 26e and the fixed base pad 32e. The base nuts 56e are tightened against the second mounting plate 26e so as to hold the second mounting plate 26e tightly against the fixed base pad 32e and the floor in which the bottoms of anchor bolts 54e have been embedded.

The lower ends the columns 14 of the storage rack system are mounted on a column support assembly. In this embodiment, the column support assembly comprises a sliding base pad 30e welded to the bottom of each column 14 that rests on the fixed base pad 32e, As described with previous embodiments, a layer of low friction bearing material could be interposed between the sliding base plate 30e and the fixed base pad 32e. The fixed base pads 32e are sized to cover the area that the storage rack system may move in a seismic event. It will also be appreciated that the sliding base pads 30e could be replaced by or supplemented with equivalent structures that would allow or assist the columns 14 to move in relation to the storage rack vibration isolator system in the event of seismic activity such as ball bearings, wheels, casters, etc. The potential energy stored in the elastomeric component 22e biases it to return the storage rack system to about its original position at the end of a seismic event.

The structure of the fixed base pad 32e has been modified into a U-shaped mechanical restriction 60e in which the seismic vibration absorption and dissipation structures are housed. The mechanical restriction 60e protects the seismic vibration absorption and dissipation structures from side impacts. It also restricts the movement of the storage rack vibration isolator 20e to substantially one horizontal direction in the storage rack system's less flexible cross-aisle direction depicted by the directional arrow 10. While the mechanical restriction 60e substantially restricts movement perpendicular to the directional arrow 10, there is room for some movement perpendicular to that direction which imparts some additional damping in the down aisle direction.

Figure 14:
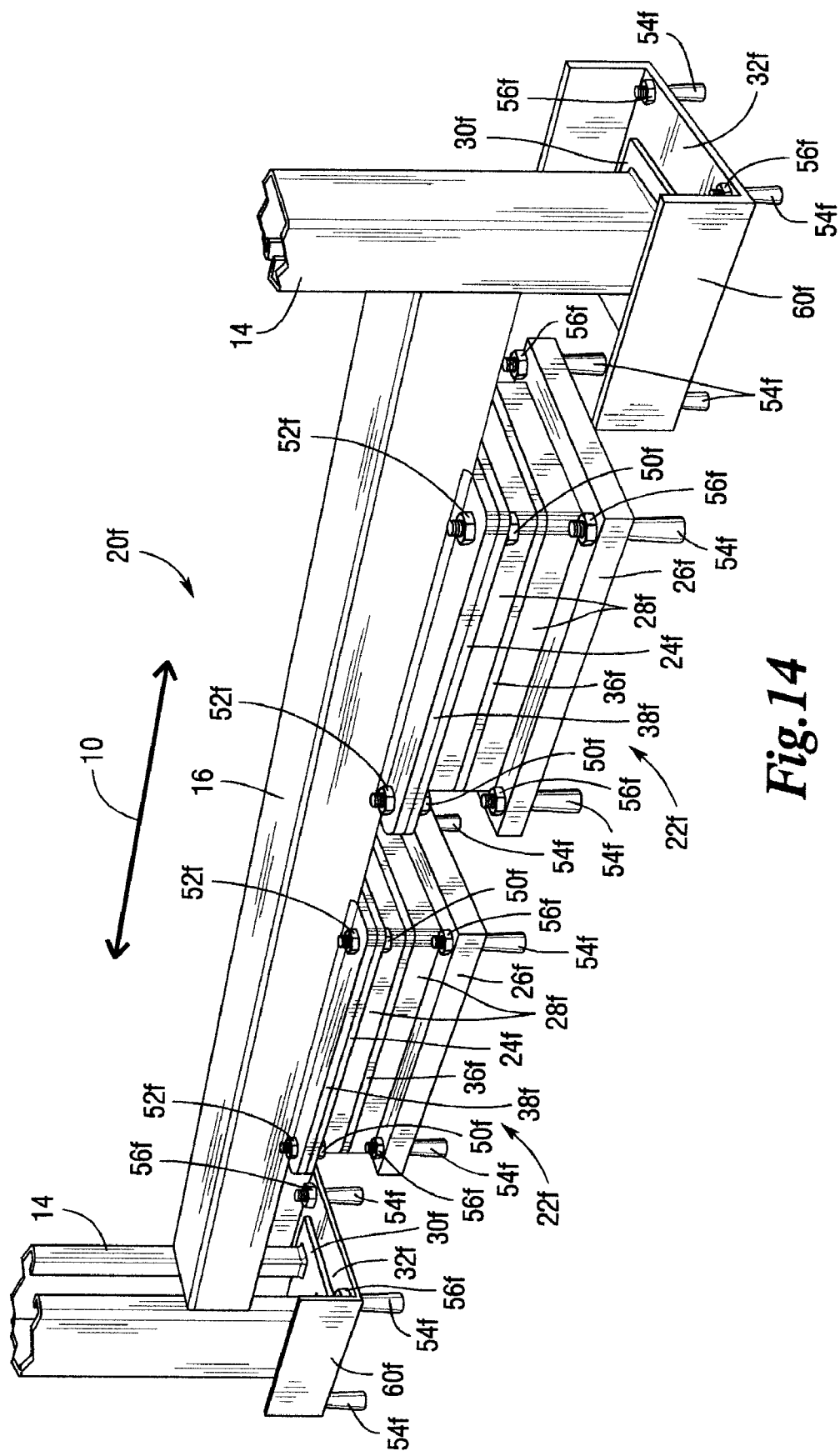
FIG. 14 is a perspective view of one embodiment of a storage rack vibration isolator located primarily between columns of a storage rack system in the less flexible second horizontal dimension.

To restrict the movement of the storage rack system to substantially the less flexible second horizontal dimension, only the movement of the columns need be restricted. FIG. 14 shows an embodiment of a storage rack vibration isolator 20f similar to that shown in FIGS. 12 and 13 in which the column support assembly for each column 14 is comprised of a sliding base pad 30f to which each column 14 is coupled and a fixed base pad 32f on which each sliding base pad 30f is positioned. Each fixed base pad 32f is sized to extend only over the expected range of movement of the columns. As with the embodiments of FIGS. 12 and 13, the structure of the fixed base pads 32f have been modified into U-shaped mechanical restrictions 60f, but in this case the restriction is limited to just the columns.

Figure 15:
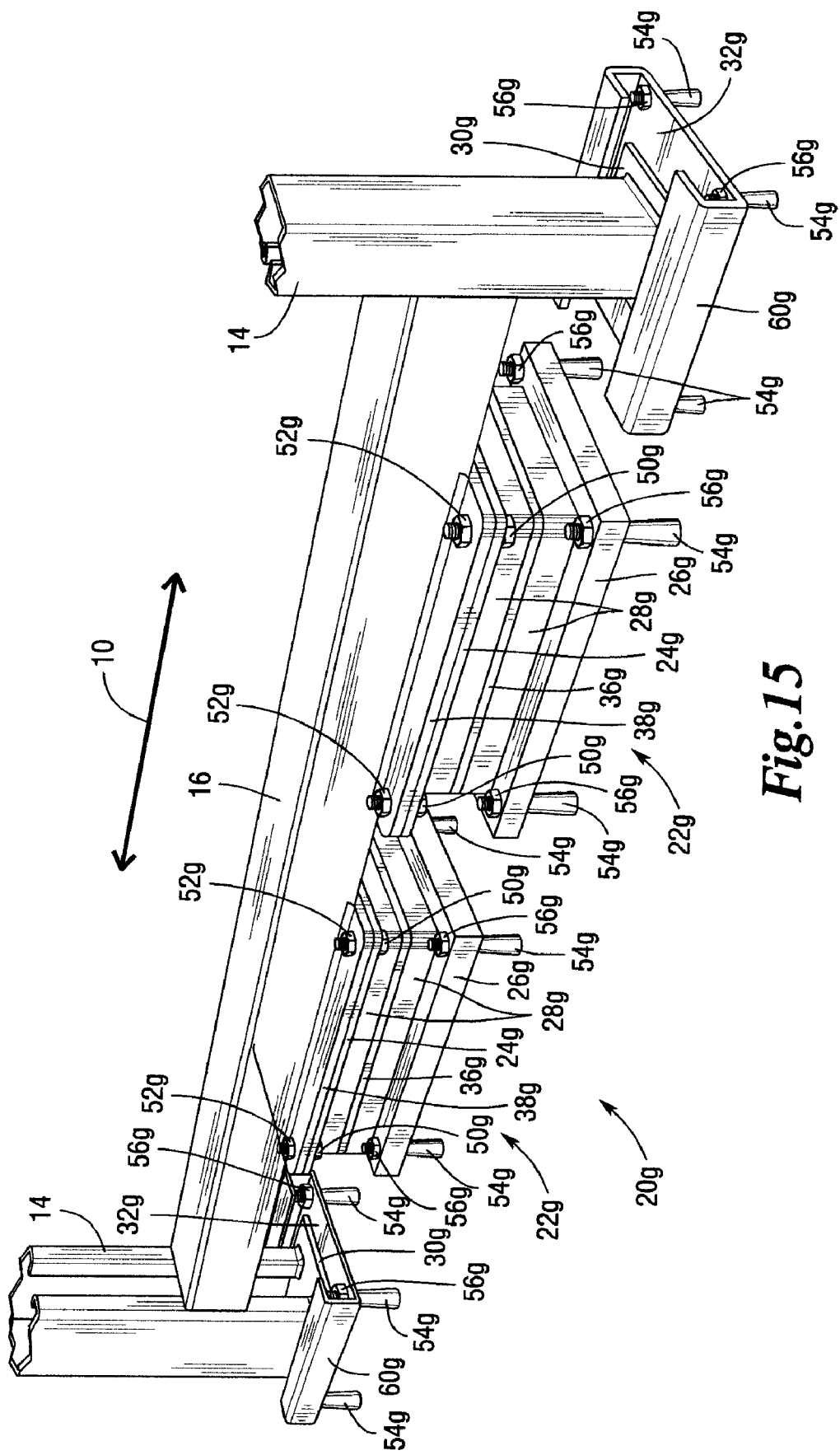
FIG. 15 is a perspective view of one embodiment of a storage rack vibration isolator located primarily between columns of a storage rack system in the less flexible second horizontal dimension.

FIG. 15 depicts another variation in which the mechanical restriction 60g of the storage rack vibration isolator 20g is folded over the sliding base pad 30f to create slots in which the columns 14 can slide. This modification restricts the vertical movement of the columns 14 to reduce the likelihood that the storage rack system will tip over during an earthquake. The slots in the mechanical restriction 60g, which provide vibration isolation in the vertical direction, could be configured to allow for some vertical travel by the columns 14.

Figure 16:
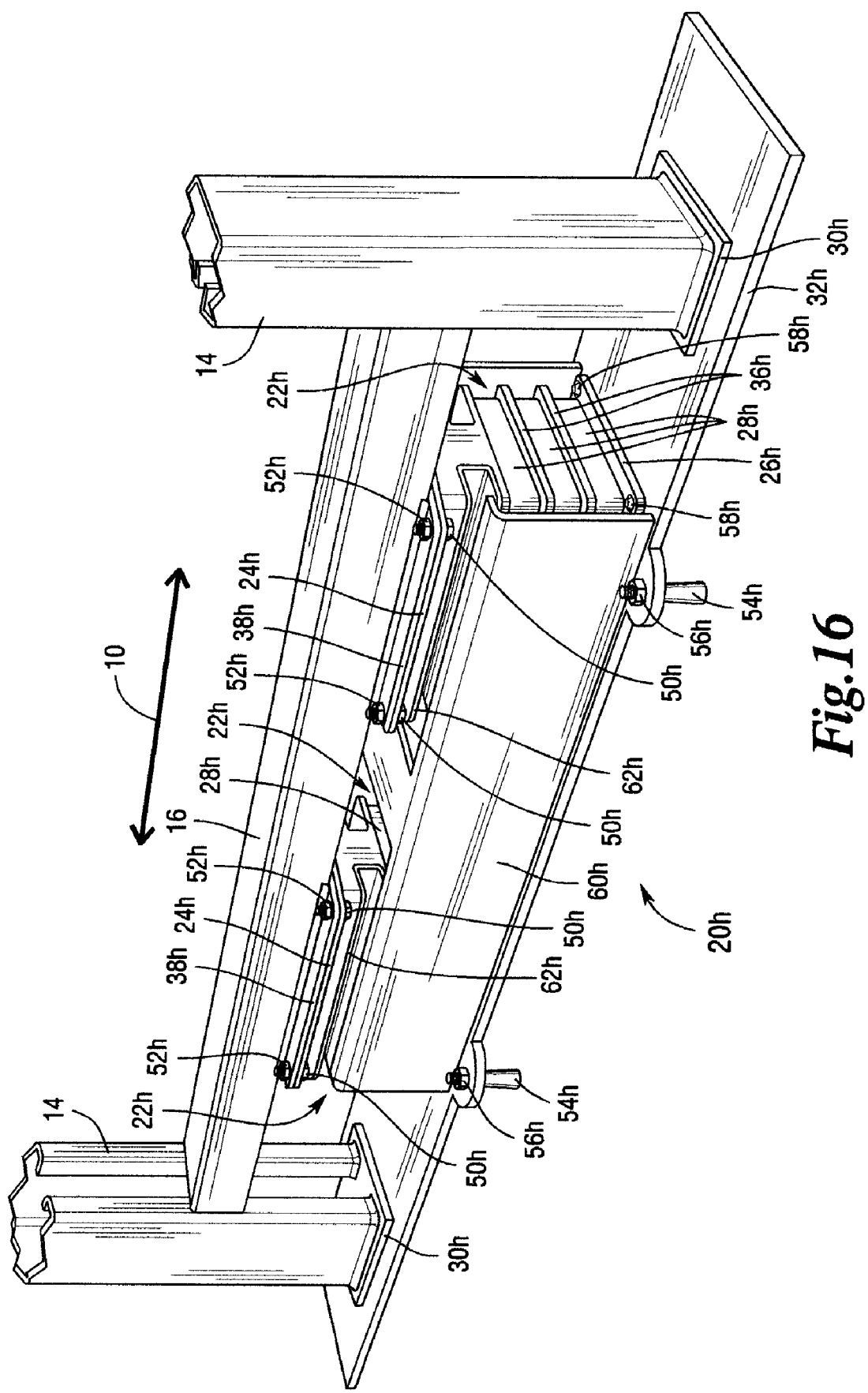
FIG. 16 is a perspective view of one embodiment of a storage rack vibration isolator located primarily between columns of a storage rack system in the less flexible second horizontal dimension.

Converse to the embodiments depicted in FIGS. 14 and 15, FIG. 16 depicts another embodiment with a storage rack vibration isolator 20h, in which only the movement of vibration adsorption and dissipation structures are restricted to restrict the movement of the storage rack system to the less flexible second horizontal dimension 10. In this embodiment, the vibration adsorption and dissipation structures are attached to a cross brace 16 of the storage rack system in the less flexible cross-aisle direction 10. The seismic vibration absorption and dissipation structures comprise a pair of elastomeric components 22h that serve as the interface between the storage rack system and the floor. In this embodiment, the fixed base pad 32h extends under and between the columns 14 of the storage rack system. The two elastomeric components 22h are attached to the cross brace 16 at the attachment members 38h that are welded to correspond to where the elastomeric components 22h will be installed along the cross brace 16. However, in this embodiment, the first mounting plate 24h incorporates a flange that has a slot into which a portion of the restriction element 60h can fit. The first mounting plates 24h have an elastomer coating 62h to help absorb the vertical impact of the first mounting plates 24h against the restriction element 60h during seismic events. The elastomer coating 62h could be any shock absorbing material such as rubber, etc.

The restriction element 60h serves to protect the storage rack vibration isolator from side impacts. During seismic events, the restriction element 60h serves to restrict the movement of the storage rack vibration isolator 20h to substantially one horizontal direction depicted by the directional arrow 10 corresponding to the less flexible cross aisle direction of the storage rack system. The restriction element 60h also substantially restricts vertical movement of the storage rack vibration isolator 20h. While the restriction element substantially restricts horizontal movement perpendicular to the directional arrow 10, there is room for some movement in that direction which imparts some additional damping in the down aisle direction. Similarly even though the storage rack system is restricted from upward movement, there is also some room for movement of the storage rack vibration isolator in the vertical direction, which imparts some damping in the vertical direction.

Figure 17:
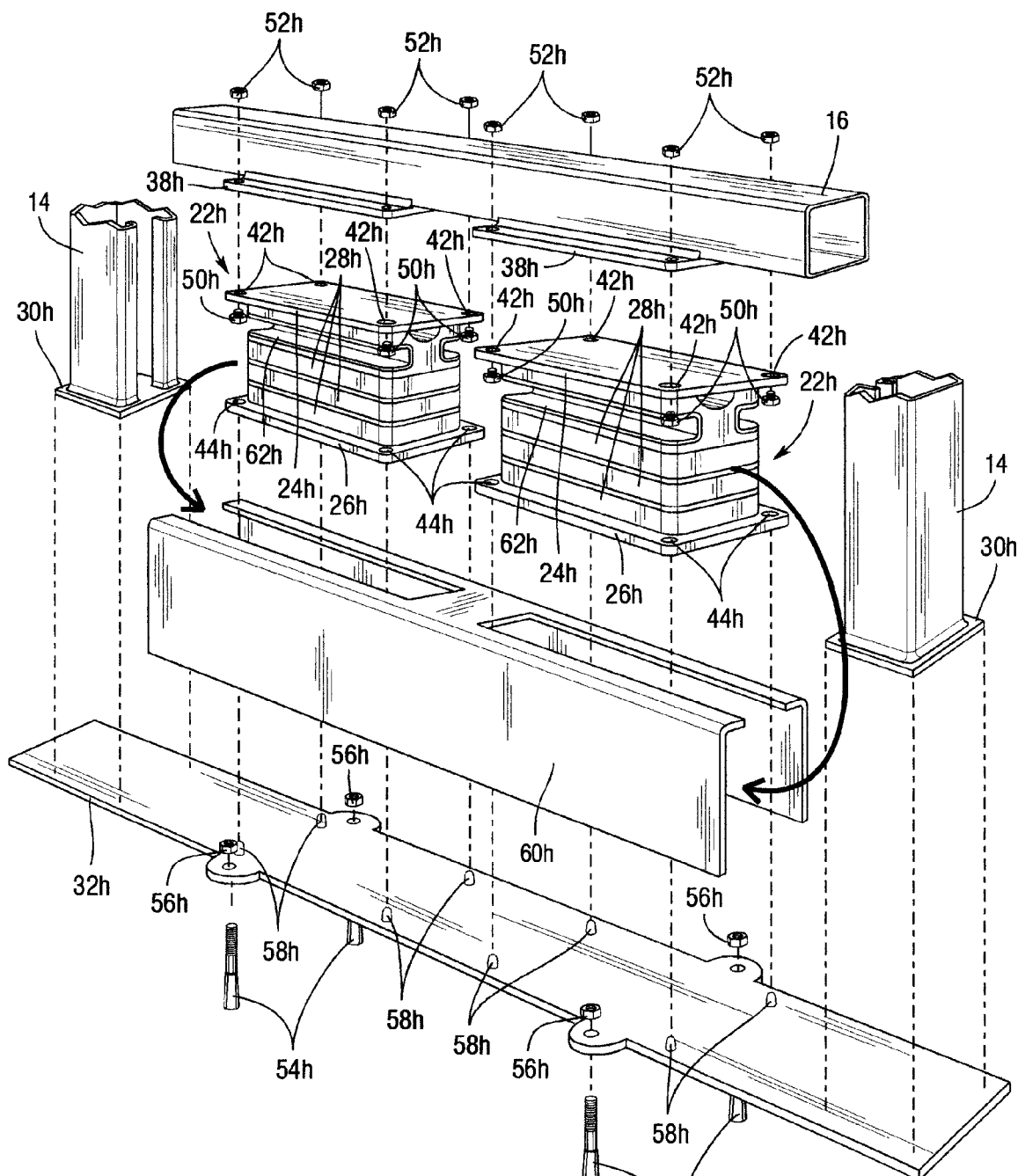
FIG. 17 is an exploded view of the storage rack vibration isolator of FIG. 16.

As may be best understood by comparing FIGS. 16 and 17, the restriction element 60h is welded to the fixed base pad 32h to create a housing into which the seismic vibration absorption and dissipation structures can be located. The fixed base pad 32h includes multiple studs 58h that extend upward from the top surface of the fixed base pad 32h. The studs 58h can be compression fit, welded or otherwise attached to the fixed base pad 32h. Each stud 58h is aligned to engage the stud holes 44h of the second mounting plate 26h when the second mounting plate 26h is positioned on the fixed base pad 32h, with each stud 58h penetrating and extending above the top surface of the second mounting plate 26*h* when the storage rack vibration isolator 20*h* is assembled, as depicted in FIG. 16. The studs 58*h* preserve the relative alignment of the elastomeric component 22*h* with the fixed base plate 32*h* when the storage rack vibration isolator 20*h* is assembled. The elastomeric components 22*h* could be further secured to the studs 58*h* with bolts or other fasteners (not shown).

Figure 18:
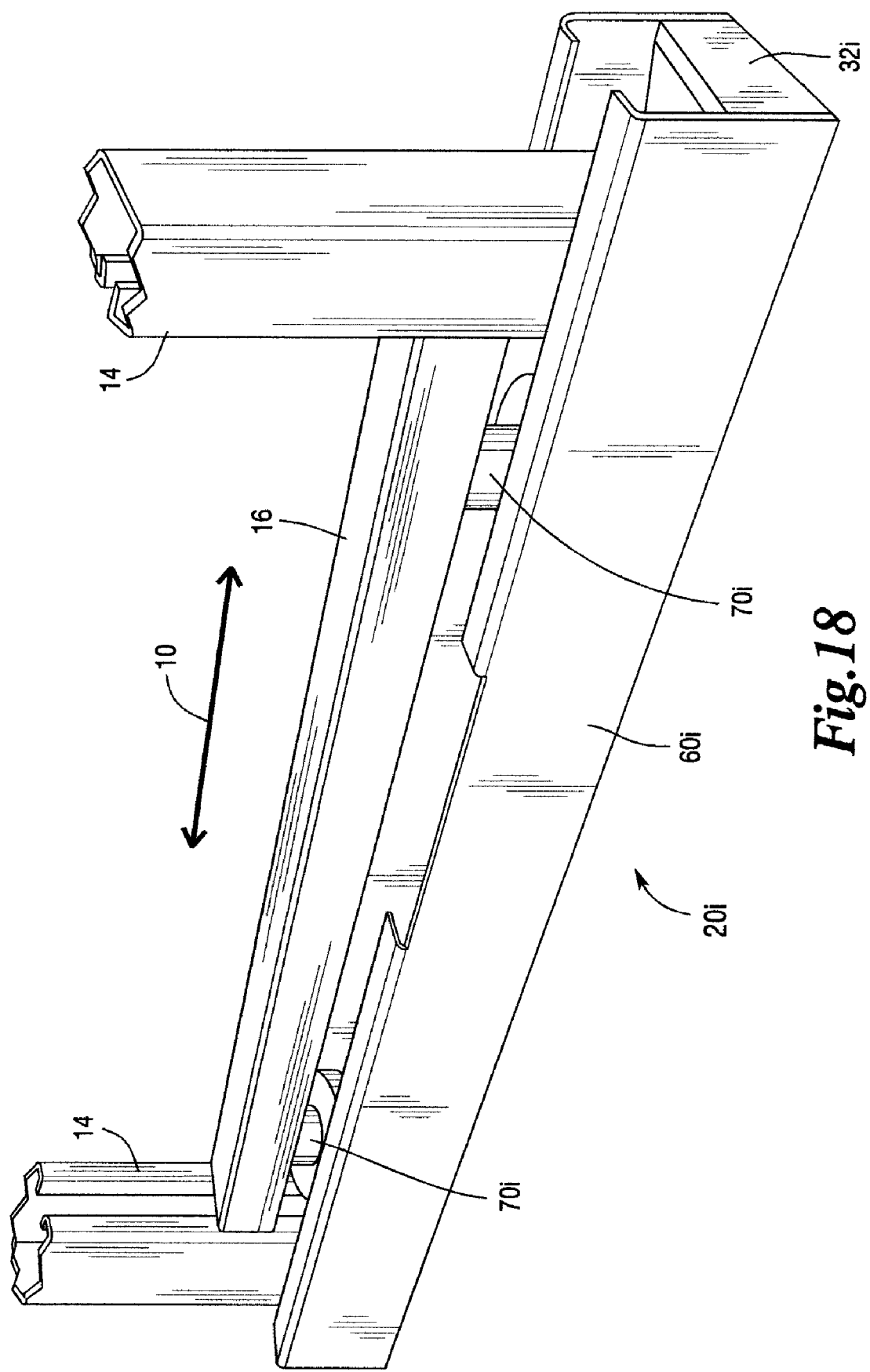
FIG. 18 is a perspective view of one embodiment of a storage rack vibration isolator located primarily between columns of a storage rack system in the less flexible second horizontal dimension.

While storage rack vibration isolators with elastomeric components are the preferred method of achieving seismic isolation, there are other mechanisms that are adaptable to storage rack systems that could provide some benefit during seismic events. FIG. 18 depicts a friction pendulum system adapted to the storage rack system. The goal remains to reduce the natural frequency of the storage rack system, while restricting movement of the storage rack system to substantially the less flexible cross-aisle direction. In such friction pendulum systems, part of the vibration absorption and dissipation structure also doubles as a column support assembly.

Figure 19:
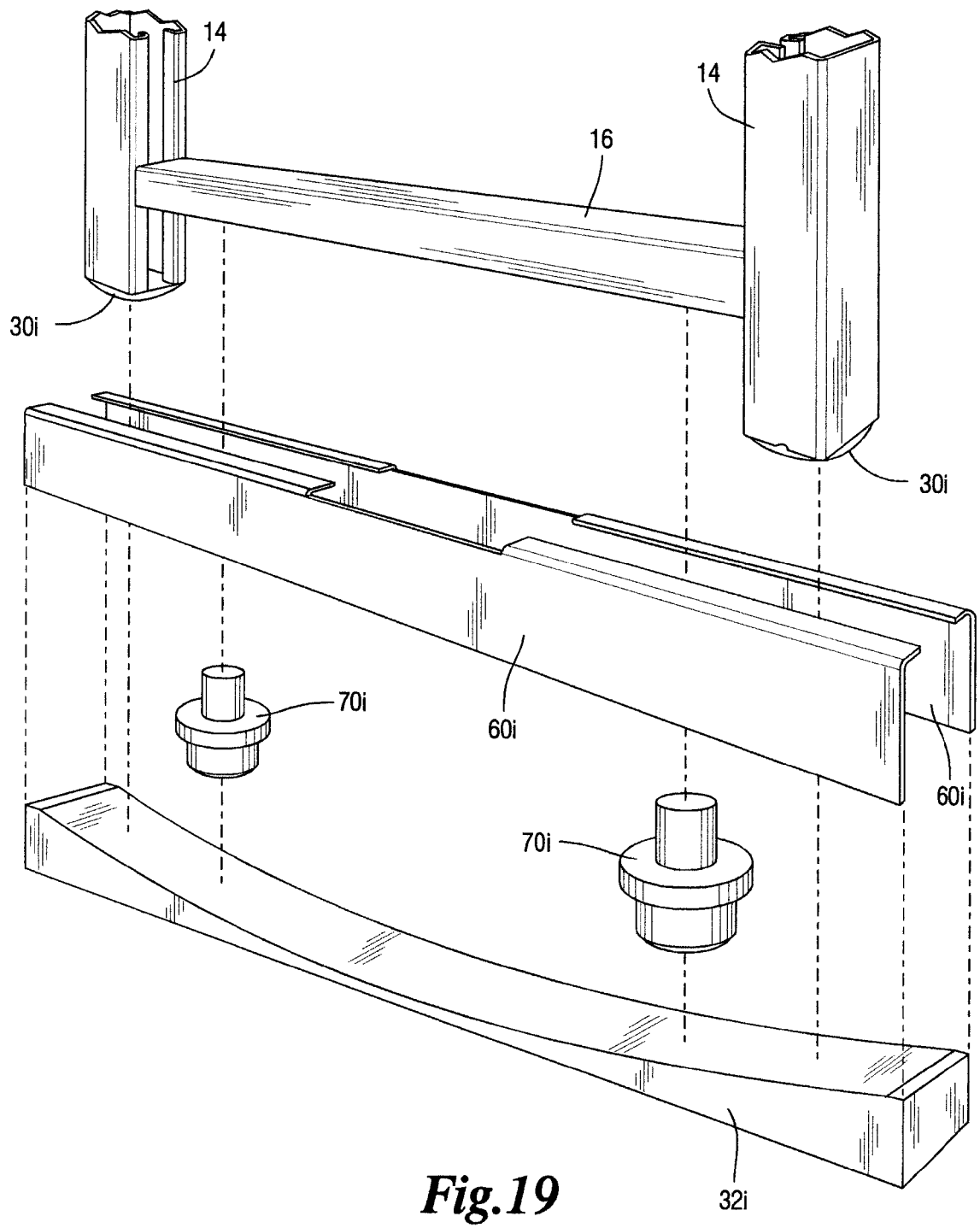
FIG. 19 is an exploded view of the storage rack vibration isolator of FIG. 18.

As can be best understood by comparing FIG. 18 with FIG. 19, in this embodiment a cross-brace 16 is mounted to two columns 14 in the less flexible cross-aisle direction of the storage rack system. Two sliding elements 70*i* are attached to the cross brace 16. The lower ends of each column 14 are mounted on a sliding base pad 30*i*. The columns 14 and the sliding elements 70*i* are placed on a fixed base pad 32*i* that has an upper surface that is formed into a concave ramp. Restriction elements 60*i* are welded to the fixed base pad 32*i*.

The restriction elements 60*i* serve to protect the sliding elements 70*i* from side impacts. During seismic events, the restriction elements 60*i* serve to substantially restrict the horizontal movement of the sliding elements 70*i* to one horizontal direction along the concave path of the fixed base pad 32*i* in the direction depicted by the directional arrow 10, corresponding to the less flexible cross aisle direction of the storage rack system. The restriction elements 60*i* also substantially restrict vertical movement of the storage rack vibration isolator 20*i*. In addition, the restriction elements 60*i* also limit the distance that the sliding elements 70*i* can travel along the direction depicted by directional arrow 10, which ensures that the columns 14 will not fall off the fixed base pad 32*i*.

Energy imparted to the storage rack systems during seismic events is dissipated as the columns move along the concave upper surface of the fixed base pad 32*i*. This movement is equivalent to the spring stiffness, K, presented in FIG. 7, and can be measured as a loss of potential energy as the storage rack system moves along the fixed base pad 32*i*. This stiffness equivalent, $K_{eq}$, can be expressed in equation form as:

$$K_{eq} = \frac{h(x) m g}{x^2}$$

where, x is the horizontal distance over which the storage rack travels, h(x) is the vertical distance over which the storage rack travels, m is the mass of the storage rack system, and g is the force of gravity. Viscous damping, C, presented in FIG. 7, is also observed in the loss of the energy required to overcome the force of friction at the interface of the sliding elements 70*i* and the sliding base pads 30*i* with the fixed base pad 32*i*.

While the structure of the restriction elements 60*i* substantially restrict movement perpendicular to the directional arrow 10, there is room for some movement in that direction which imparts some additional damping in the down aisle direction. Similarly, even though the storage rack system is restricted from upward movement, there is also some room for movement of the storage rack system in the vertical direction, which imparts some damping in the vertical direction.

Figure 20:
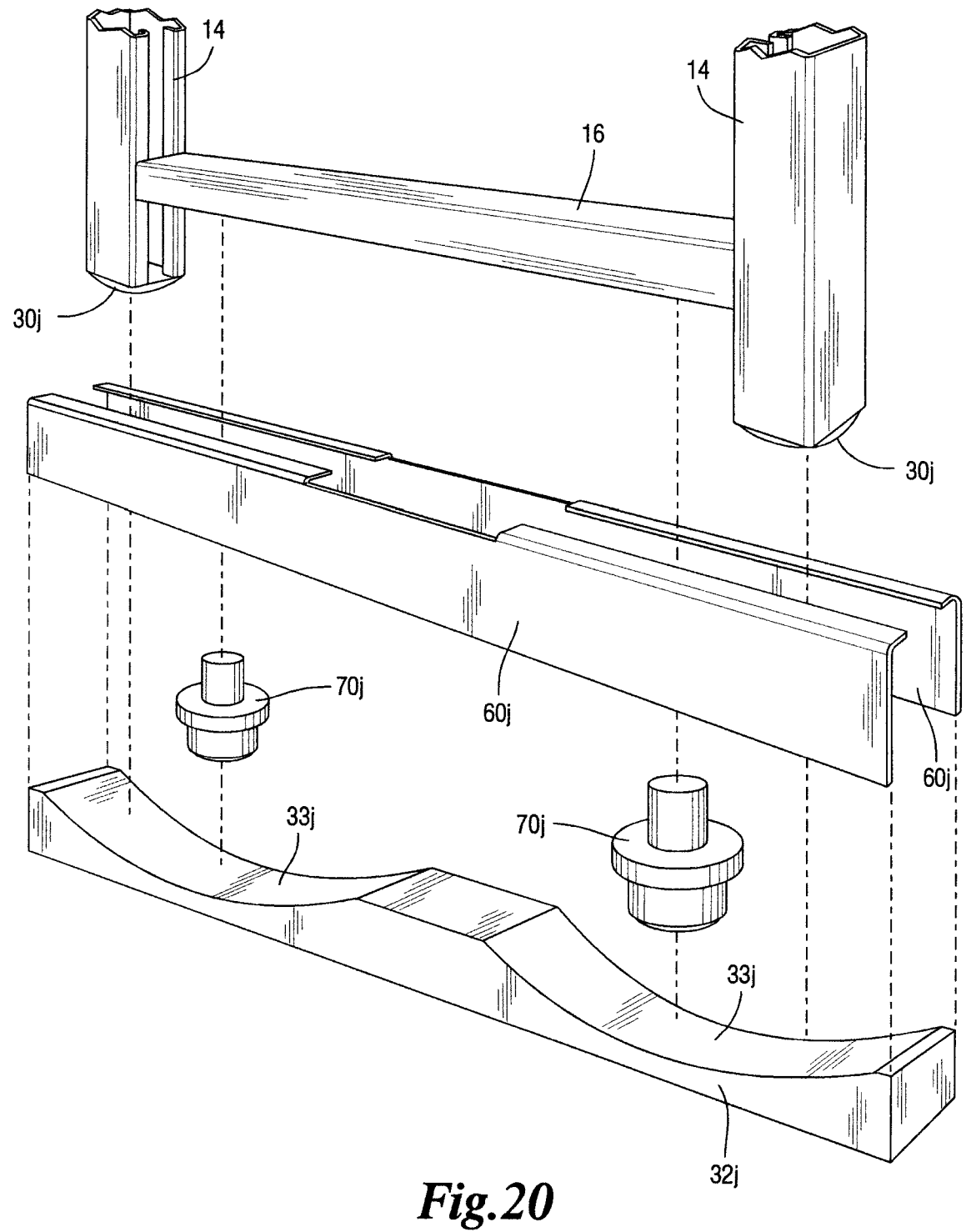
FIG. 20 is an exploded view of an alternative embodiment of the storage rack vibration isolator of FIG. 18.

A variation of the fixed base pad 32*j* is shown in FIG. 20 in which the concave upper surface of the fixed base pad 32*j* is modified into separate bowl-shaped areas 33*j* for each sliding element 70*j*. In this configuration, when the storage rack system moves during seismic events, the path transcribed by the individual bowl-shaped areas 33*j* will allow the columns 14 to travel while minimizing the tipping of the storage rack.

Figure 21:
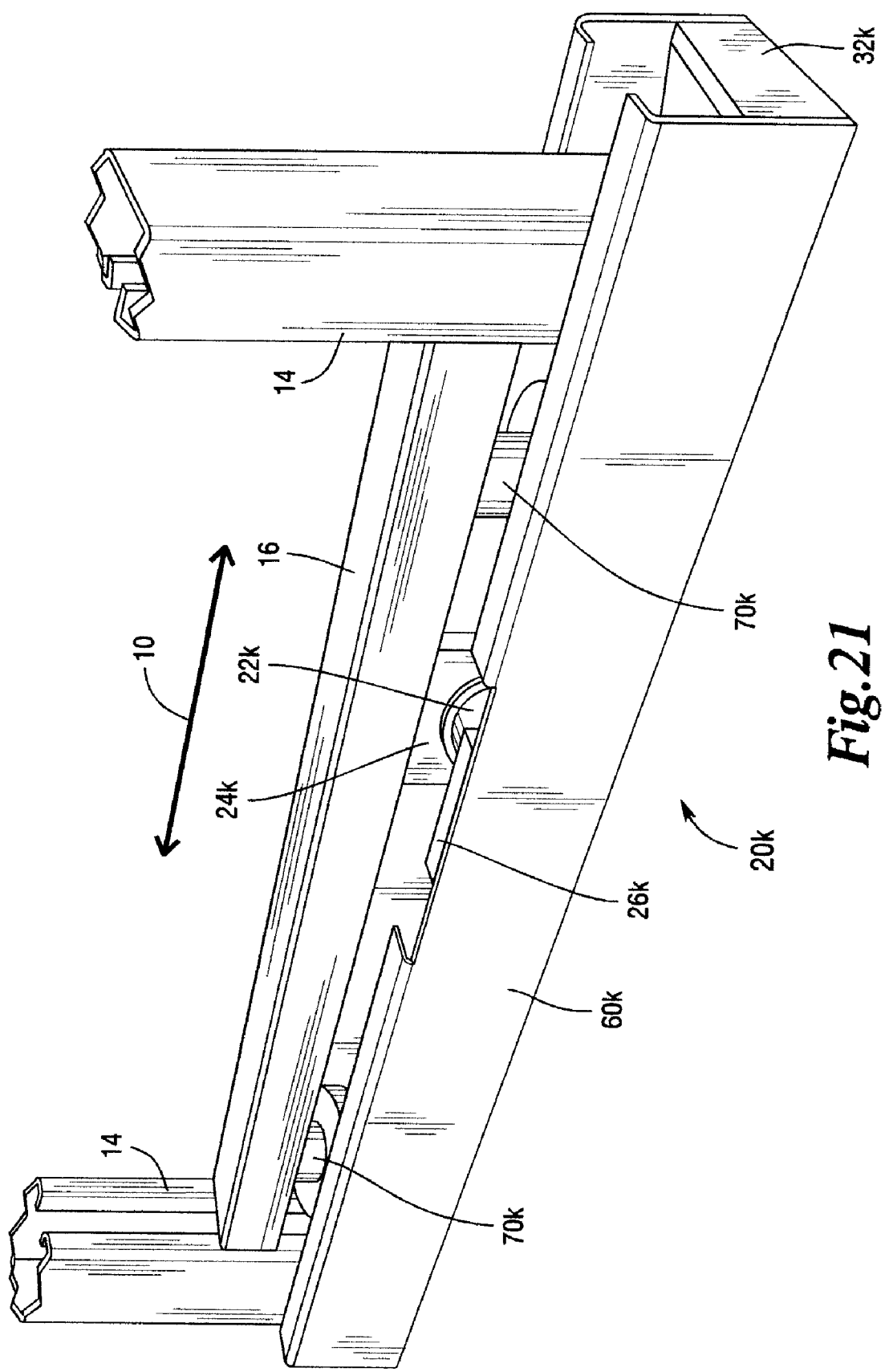
FIG. 21 is a perspective view of one embodiment of a storage rack vibration isolator located primarily between columns of a storage rack system in the less flexible second horizontal dimension.
Figure 22:
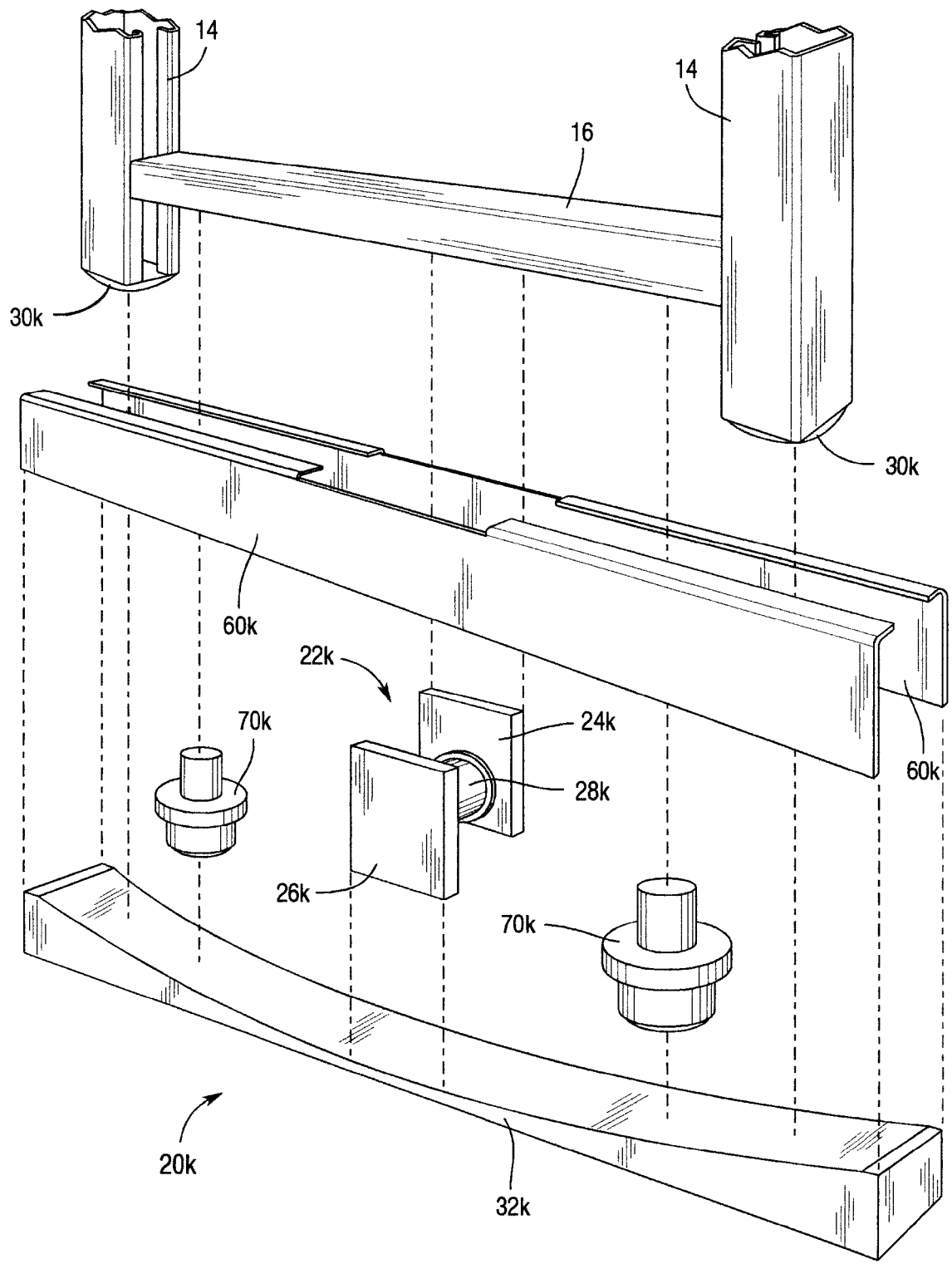
FIG. 22 is an exploded view of the storage rack vibration isolator of FIG. 21.

FIGS. 21 and 22 depict a variation of the friction pendulum in which an elastomeric component 22*k* is incorporated to provide additional vibration damping and to assist in returning the storage rack system to about its original position at the end of a seismic event. In this embodiment, a first mounting plate 24*k* is mounted to the cross brace 16, a second mounting plate 26*k* is mounted to the fixed base pad 32*k*, and an elastomeric component 22*k* is operatively attached to the first and second mounting plates 24*k* and 26*k* such that during seismic events the first and second mounting plates 24*k* and 26*k* remain attached to the elastomeric component 22*k*, while the first mounting plate 24*k* is able to move in a plane substantially parallel to the second mounting plate 26*k*. In this case the elastomeric component 22*k* comprises a single elastomeric layer 28*k* that is attached to the first and second mounting plates 24*k* and 26*k* as described above, although any of the embodiments of elastomeric components described above would work just as well.

Figure 23:
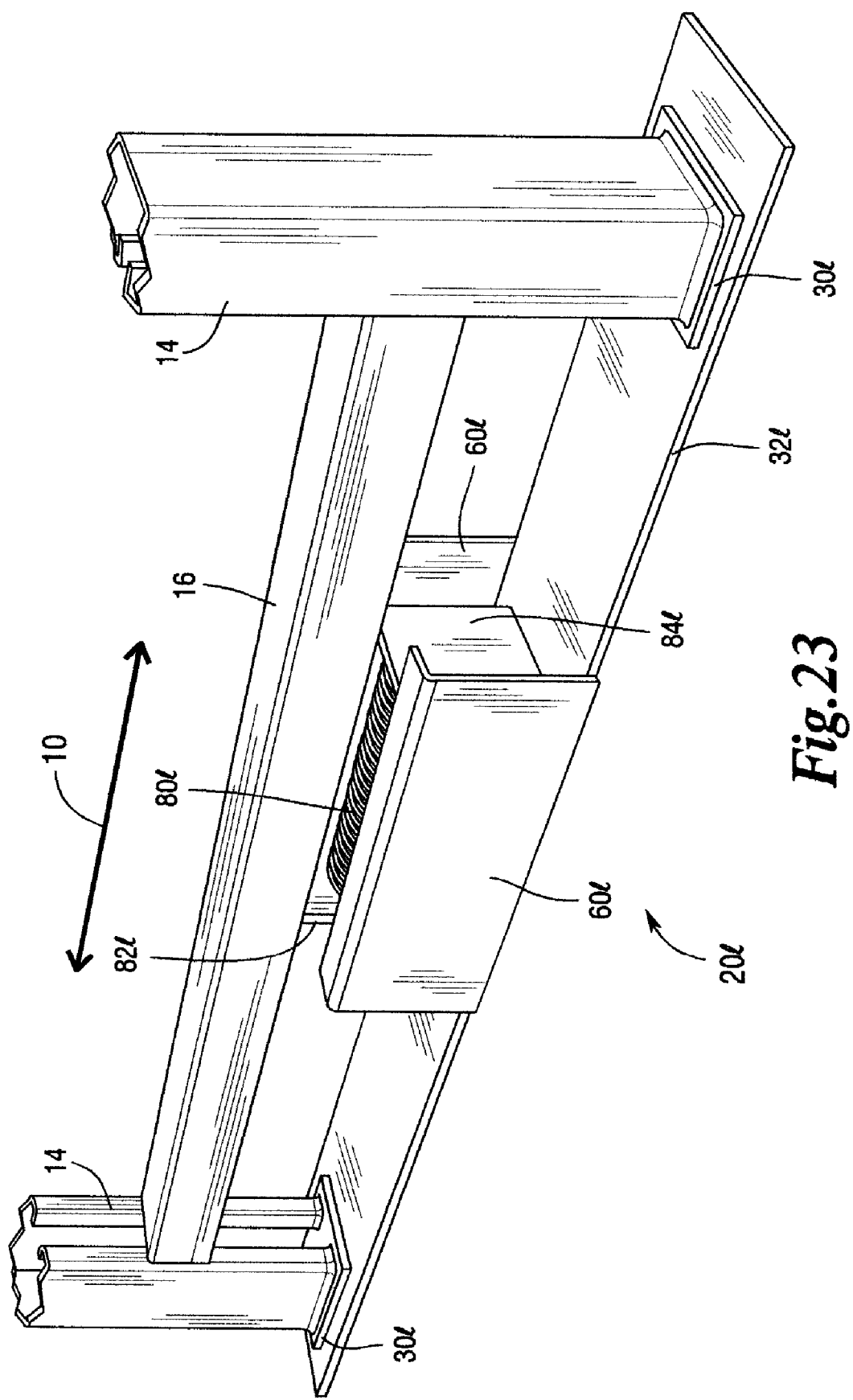
FIG. 23 is a perspective view of one embodiment of a storage rack vibration isolator located primarily between columns of a storage rack system in the less flexible second horizontal dimension.
Figure 24:
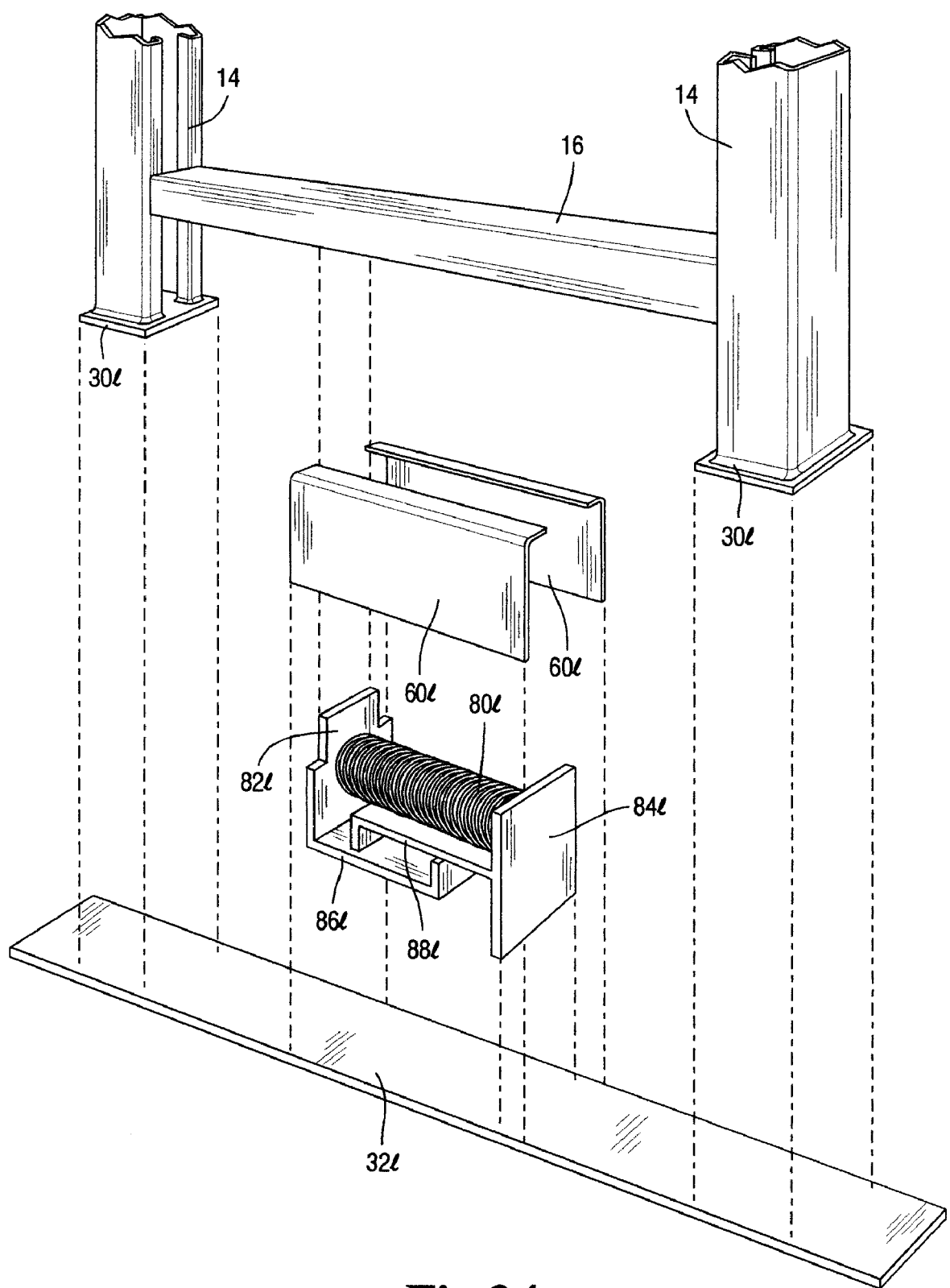
FIG. 24 is an exploded view of the storage rack vibration isolator of FIG. 23.

Another mechanism that would function as a seismic vibration absorption and dissipation structure is a spring mechanism. FIG. 23 depicts a storage rack vibration isolator 20*l* in which the seismic vibration absorption and dissipation structure comprises a spring 80*l* attached to the storage rack system. As can be best understood by comparing FIG. 23 with FIG. 24, in this embodiment a cross brace 16 is attached to two columns 14 in the less flexible cross-aisle direction 10 of the storage rack system. The spring 80*l* is mounted between a first plate 82*l* that is attached to the cross brace 16 and a second plate 84*l* that is attached to the fixed base plate 32*l*. A restriction element 60*l* is welded to the fixed base pad 32*l*.

During seismic events, the restriction element 60*l* serves to restrict the horizontal movement of the storage rack vibration isolator 20*l* to essentially make the damping effect unidirectional and parallel to the fixed base pad 32*l*, as well as to restrict vertical movement of the storage rack vibration isolator 20*l*. The spring 80*l* stretches and compresses in response to the movement of the storage rack system. The elements 86*l* and 88*l* that are attached to the first and second plates 82*l* and 84*l*, respectively, serve to limit the extent of the stretching and compression experienced by the spring 80*l*. Additional damping may be achieved by incorporating an elastomeric component as described in FIGS. 21 and 22.

Energy imparted to the storage rack system during seismic events is dissipated as the spring 80*l* stretches and compresses. The spring stiffness, K, as presented in FIG. 7, is a physical property of the spring and appropriate springs could be selected depending on the particular application. The geometry of the spring can be selected to provide proper spring stiffness, K, of the spring. Viscous damping, C, as presented in FIG. 7, is also observed in such spring systems in the friction that must be overcome to make the storage rack system move. Some of the energy imparted to the storage rack system during seismic events is required to move the columns 14 of the storage rack system to overcome the force of friction at the interface of the sliding base pads 30*l* with the fixed base pad 32*l*. The spring 80*e* could be an extension or compression helical spring.

Figure 25:
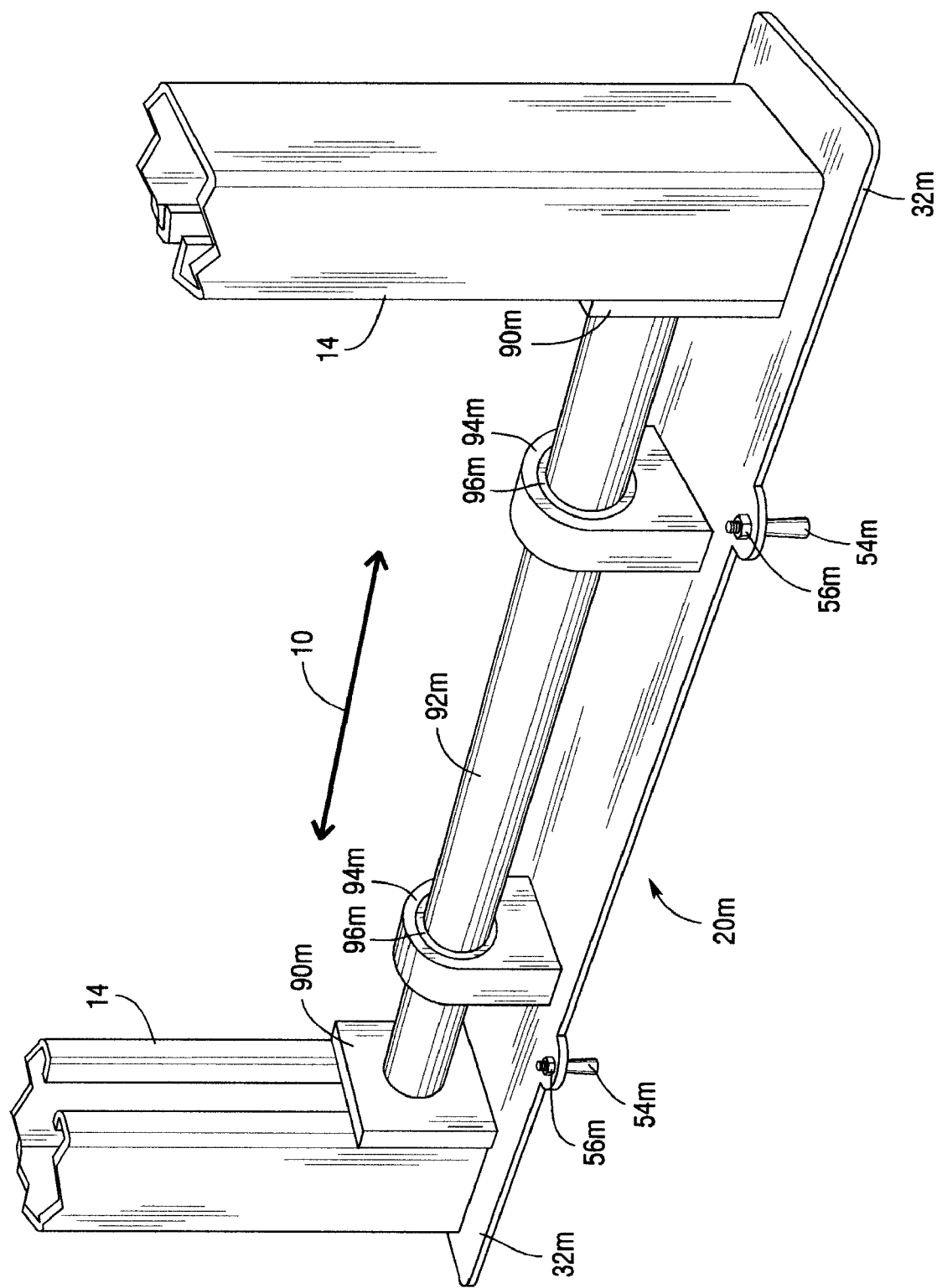
FIG. 25 is a perspective view of one embodiment of a storage rack vibration isolator located primarily between columns of a storage rack system in the less flexible second horizontal dimension.

Linear bearings could also be used in storage rack vibration isolators as vibration absorption and dissipation structures as shown in FIG. 25. In this embodiment the storage rack columns 14 are welded to plates 90*m* to which a rail 92*m* that spans the two columns is attached. The rail 92*m* passes through a set of housings 94*m* that include linear bearings 96*m*. The housings 94*m* are attached to the fixed base plate 32*m*. In this embodiment the vibration absorption and dissipation structure also doubles as the column support assembly. The housings 94 and the linear bearings 96 support the full weight of the storage rack frame and the columns 14 are suspended off the floor. The linear bearings 96 and housings 94 could be from any manufacturer such as GGB Bearings Technology. The linear bearings 96 could be made from a composite polymer or could include a rubber or elastomeric component to provide additional compliance and damping. During seismic events, the linear bearings 96*m* allow the storage rack system to move in the less flexible cross-aisle direction 10. By adjusting the fit of the linear bearings 96*m*, the amount of force required to move to storage rack system can be varied.

Figure 26:
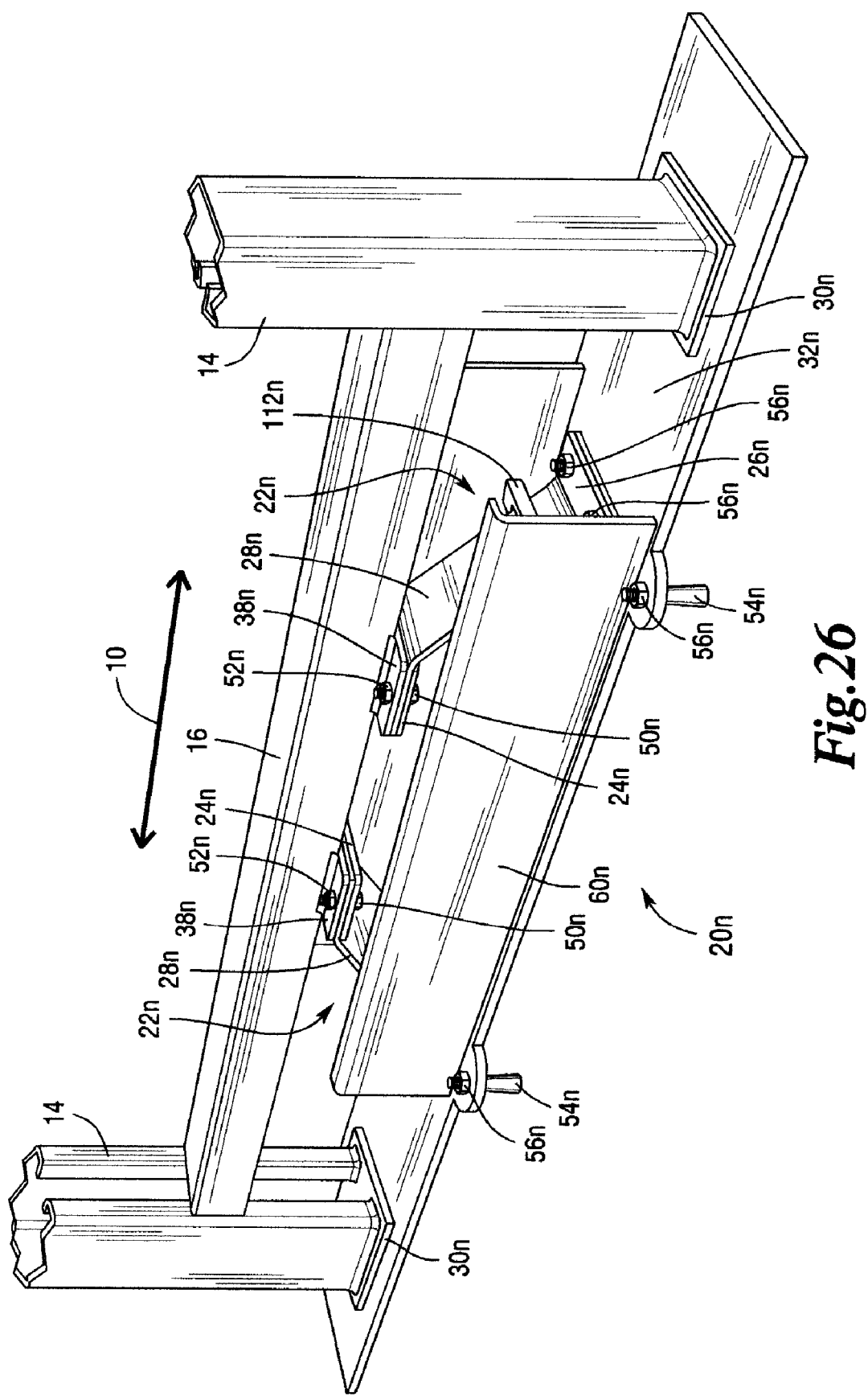
FIG. 26 is a perspective view of one embodiment of a storage rack vibration isolator located primarily between columns of a storage rack system in the less flexible second horizontal dimension.

The performance achieved by vibration absorption and dissipation structures that are spring mechanisms as shown for example in FIG. 23, can be mimicked with elastomers. FIG. 26 shows a storage rack vibration isolator 20*n* in which the vibration absorption and dissipation structures are elastomeric components 22*n* in tension. The elastomeric components 22*n* comprise an elastomeric member 28*n* that extends between the storage rack system and the floor. Each elastomeric component 22*n* is operatively coupled to first and second mounting plates 24*n* and 26*n*. The two storage rack vibration isolators 20*n* are mounted in opposition to each other such that at least one elastomeric component is always in tension when the storage rack moves during a seismic event. The elastomeric members 28*n* are straps that function similarly to rubber bands in tension.

Figure 27:
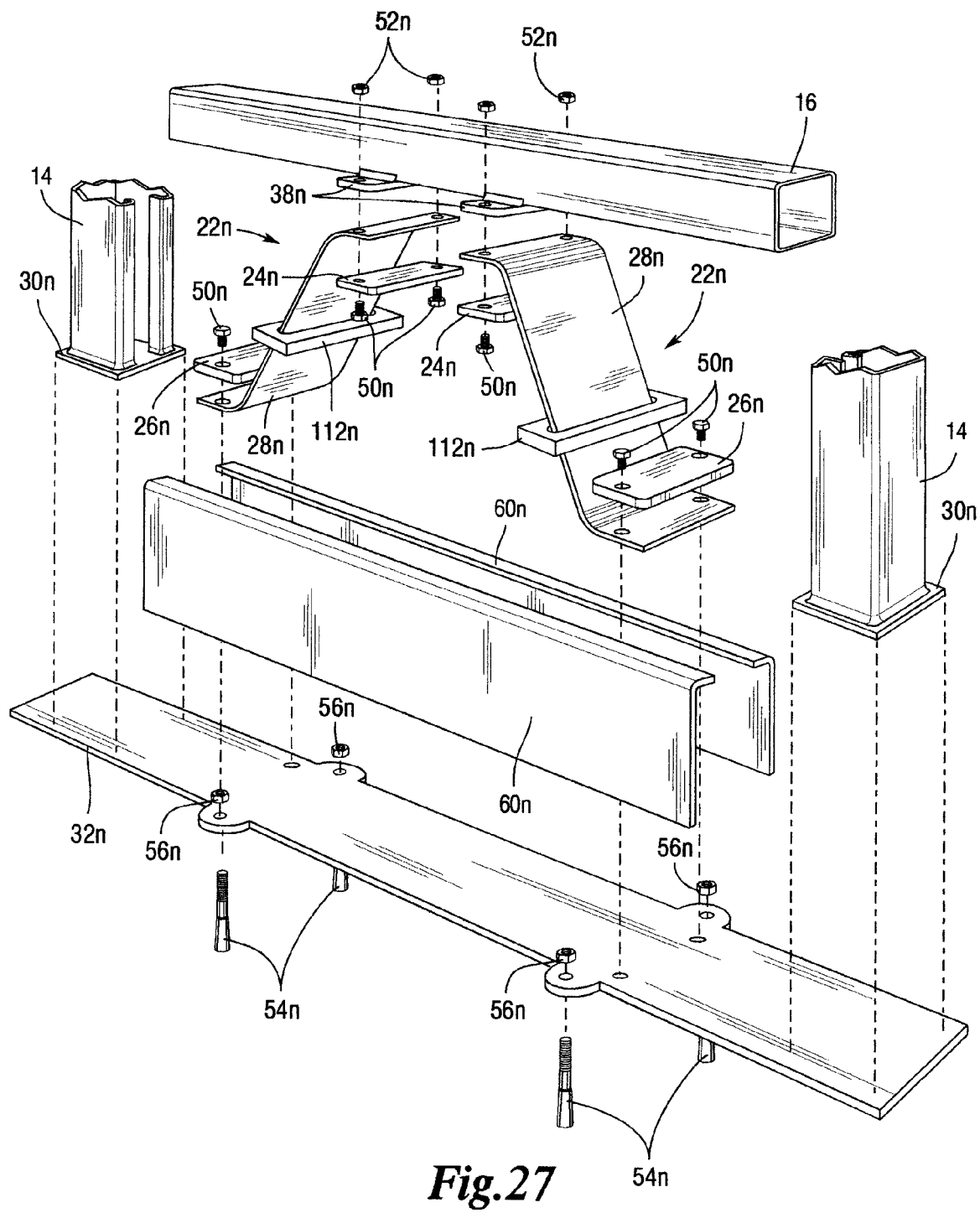
FIG. 27 is an exploded view of the storage rack vibration isolator of FIG. 26.

As can be best understood by comparing FIGS. 26 and 27, the vibration adsorption and dissipation structures are attached to a cross brace 16 of the storage rack system in the less flexible cross-aisle direction 10. The first mounting plates 24*n* are secured to attachment members 38*n* with screws 50*n* and secured with bolts 52*n* through holes 38*n*. The attachment members 38*n* are welded to the cross brace 16 to correspond to where the storage rack vibration isolators 20*n* are to be attached to the storage rack system. The second mounting plates 26*n* are secured to the floor with screws 50*n* that extend through the fixed base pad 32*n*.

A restriction element 60*n* houses the storage rack vibration isolators 20*n* are mounted. The restriction element 60*n* serves to protect the storage rack vibration isolator from side impacts. During seismic events, the restriction element 60*n* serves to restrict the movement of the storage rack vibration isolator 20*h* to substantially one horizontal direction depicted by the directional arrow 10 corresponding to the less flexible cross aisle direction of the storage rack system. The storage rack vibration isolators 20*n* incorporate a collar 112*n* that contacts the top of the restriction element 60*n* during seismic events to substantially restrict vertical movement of the storage rack vibration isolator 20*h*. While the restriction element substantially restricts horizontal movement perpendicular to the directional arrow 10, the elastomeric member 28*n* in tension can bend in that direction which imparts some additional damping in the down aisle direction. Similarly even though the storage rack system is restricted from upward movement, the elastomeric member 28*n* can stretch in the vertical direction, which imparts some damping in the vertical direction.

Energy imparted to the storage rack system during seismic events is dissipated as each opposing storage rack vibration isolator 20*n* stretches in response to the movement of the storage rack system. The spring stiffness, K, as presented in FIG. 7, is a physical property of the elastomeric members 28*n* and elastomers of appropriate stiffness could be selected depending on the particular application. Viscous damping, C, as presented in FIG. 7, is also observed in such systems in the friction that must be overcome to make the storage rack system move. Some of the energy imparted to the storage rack system during seismic events is required to move the columns 14 of the storage rack system to overcome the force of friction at the interface of the sliding base pads 30*n* with the fixed base pad 32*n*.

Figure 28:
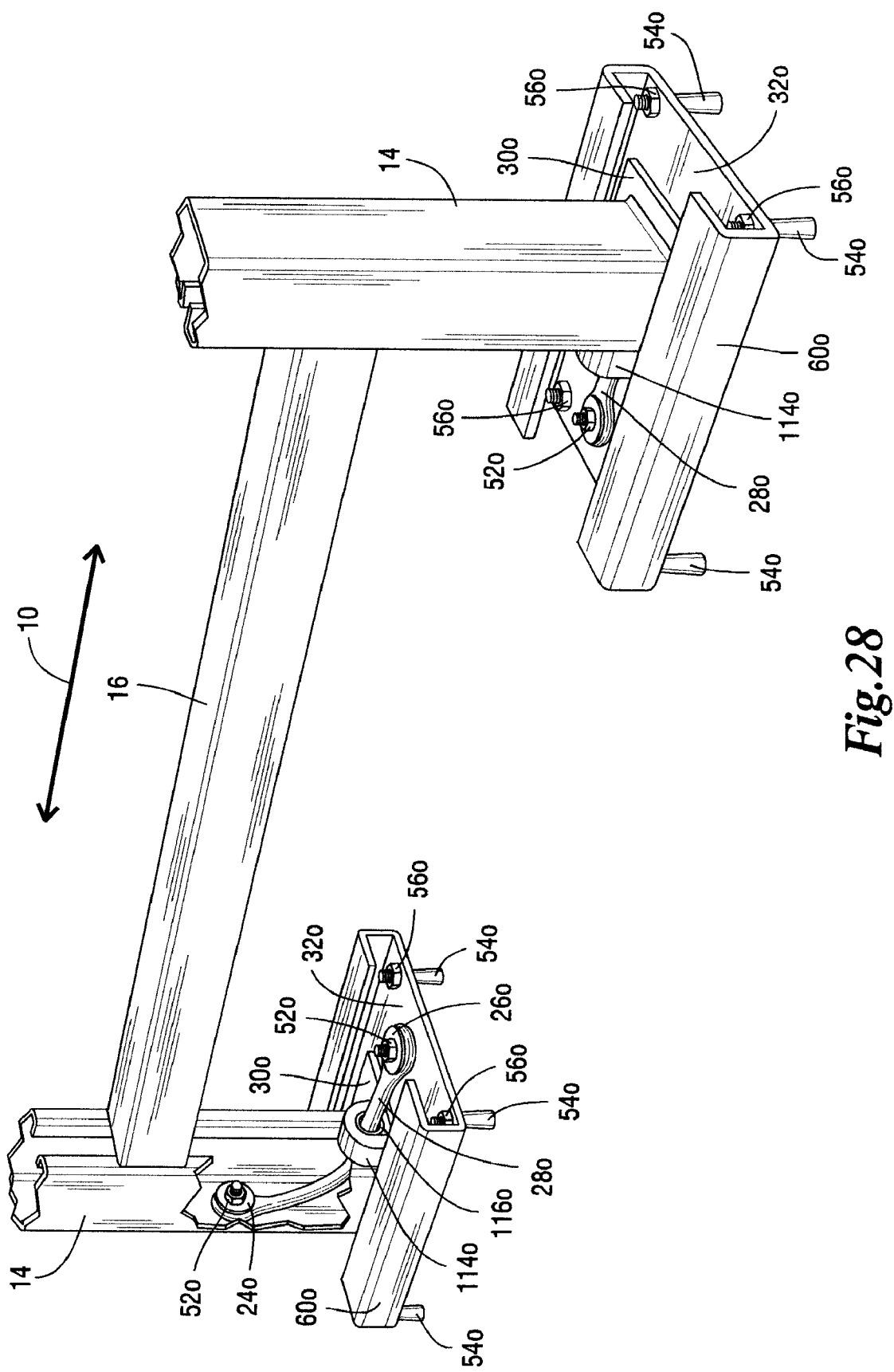
FIG. 28 is a perspective view of one embodiment of a storage rack vibration isolator located primarily between columns of a storage rack system in the less flexible second horizontal dimension.

FIG. 28 depicts a variation of the storage rack vibration isolators shown in FIG. 26. In this embodiment, the elastomeric components 22*m* of the storage rack vibration isolators 20*m* are elastomeric cables 28*m* and the first and second mounting plates are washers 24*m* and 26*m*, which incorporate bolt holes for mounting the elastomeric cable to the storage rack system and the floor, respectively. In this embodiment, each column is mounted on a sliding base pad 30*m* that is set on a fixed base pad 32*m*. One end of the elastomeric cable 28*m* is run through the open space in the column 14 and secured to the column 14 with bolt 52*m* through the bolt hole in the washer 24*m* (as shown in the cut-out portion of the left hand column). The elastomeric cable 28*m* is run through the U-shaped collar 114*m* that is mounted on the sliding base pad 30*m*. The elastomeric cable 28*m* is secured to the fixed base pad with a bolt 56*m* through its other washer 26*m*.

Figure 29:
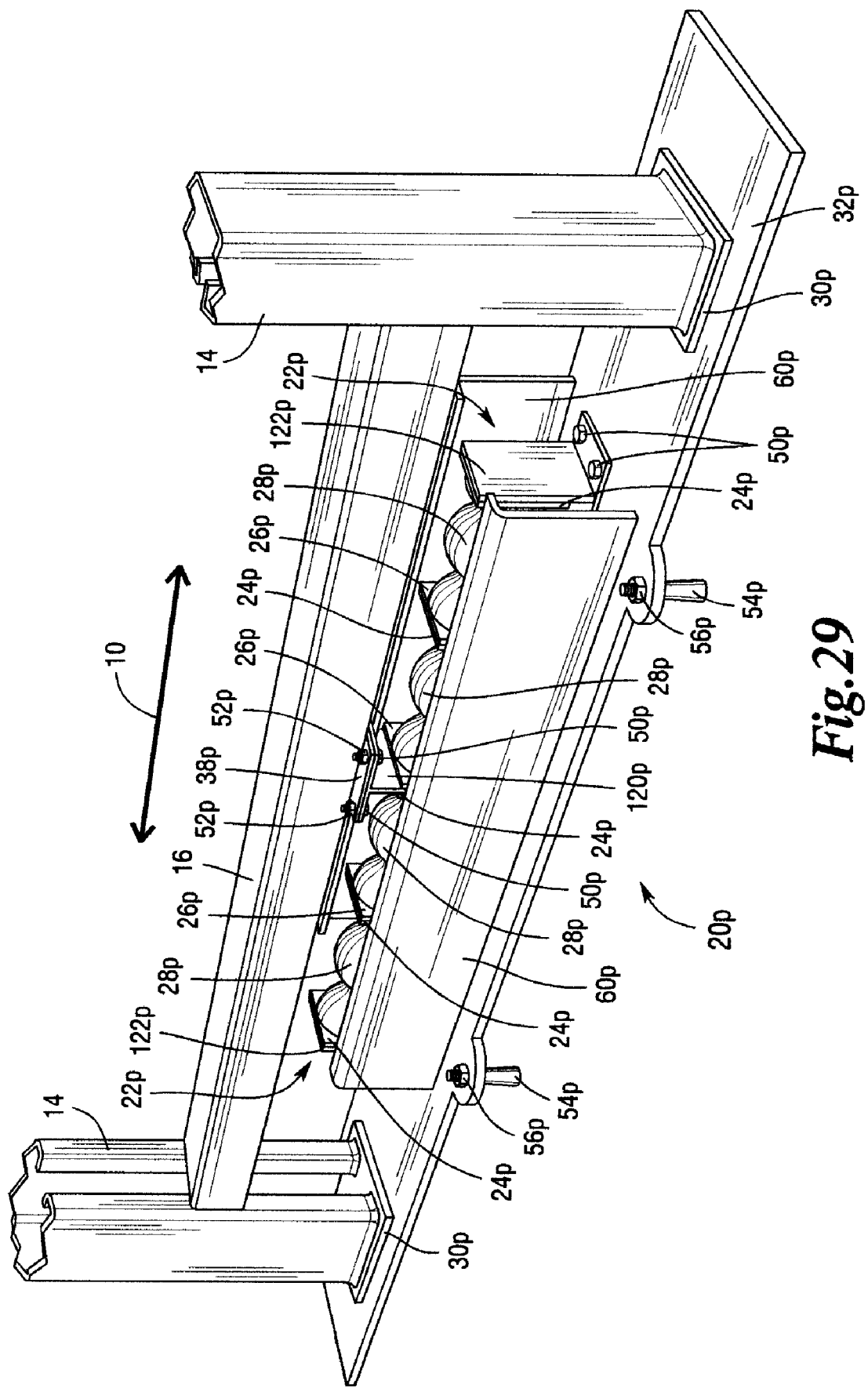
FIG. 29 is a perspective view of one embodiment of a storage rack vibration isolator located primarily between columns of a storage rack system in the less flexible second horizontal dimension.
Figure 30:
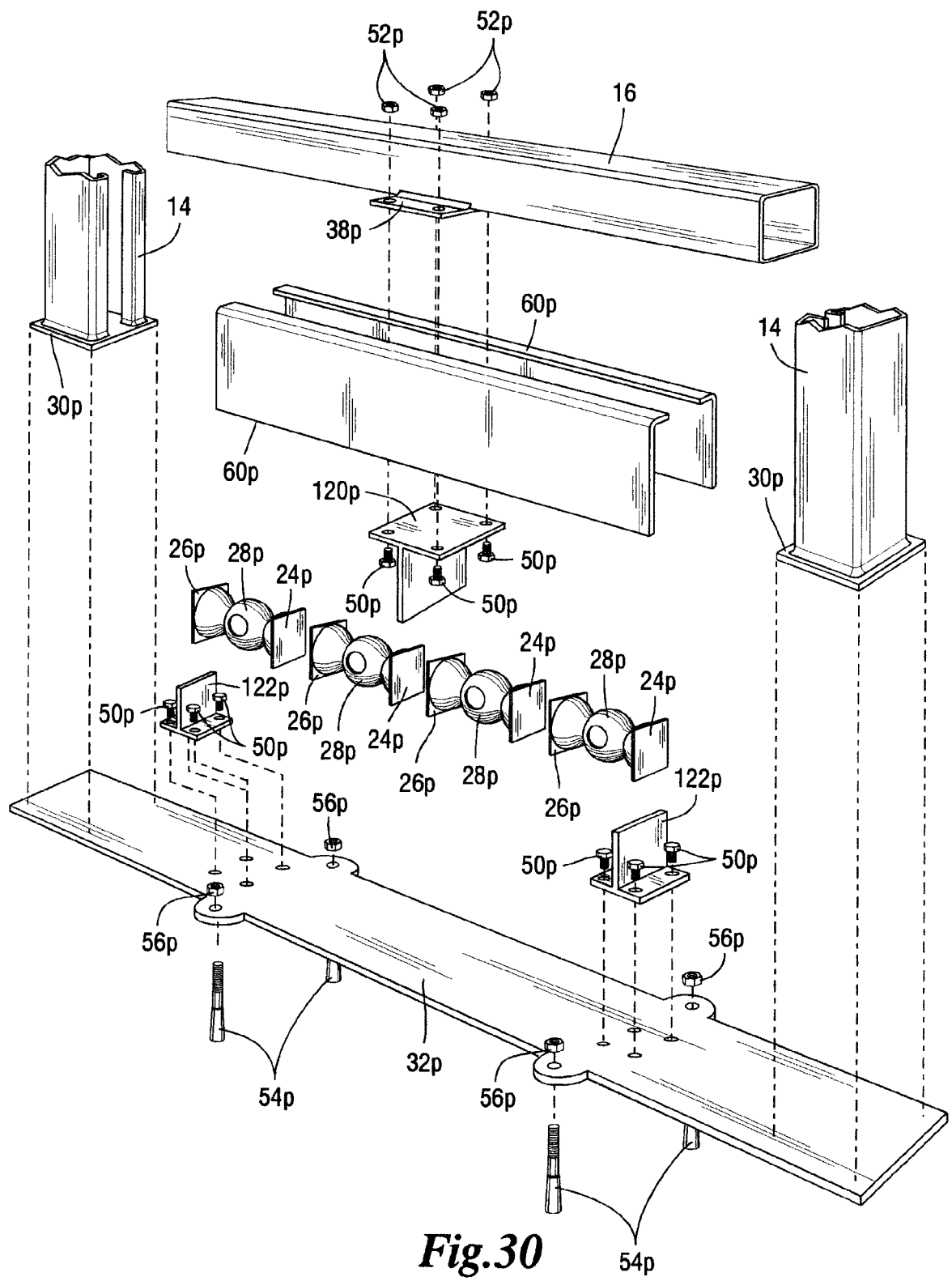
FIG. 30 is an exploded view of the storage rack vibration isolator of FIG. 29.

FIGS. 29 and 30 show variations in which the vibration adsorption and dissipation structures of the storage rack vibration isolators comprise elastomeric components that function in both tension and compression during seismic events. As can be best understood by comparing FIGS. 29 and 30, the storage rack vibration isolator 20*p* comprises a number of elastomeric components 22*p* coupled to the storage rack system by being mounted on both sides of a storage rack positioning member 120*p*. The storage rack positioning member 120*p* is mounted to the center of a cross member 16 between two columns 14 in the less flexible horizontal dimension of the storage rack system depicted by directional arrow 10. The elastomeric components 22*p* on either side of the storage rack positioning member 120*p* are mounted to and biased against floor positioning members 122*p*, which serves to connect the elastomeric components 22*p* to the floor.

Each elastomeric component 22*p* comprises a first mounting plate 24*p* mountable to the storage rack system, a second mounting plate 26*p* mountable to the floor, and an elastomeric member 28*p* operatively coupled to the first and second mounting plates 24*p* and 26*p*. Each elastomeric member 28*p* comprises a layer of elastomeric material having a geometry with a central core removed forming two arms which lends itself to buckling. When the storage rack system moves during seismic events the first and second mounting plates 24*p* and 26*p* on one side of the storage rack positioning member 120*p* are pushed together to move in planes substantially perpendicular to each other and compress the elastomeric member 28p. The two arms bend outwards thus decreasing the distance between the first and second mounting plates 24p and 26p significantly more than would be achieved by compression of a solid block of elastomer. The elastomeric components 20p on the other side of the storage rack positioning member 120p are pulled apart imparting tension on the elastomeric components 20p. Alternatively, the elastomeric components 20p need not be fixed to the to the storage rack positioning member 120p therefore when the storage rack positioning member 120p moves away from the elastomeric components 20p there is no tension loading against the storage rack positioning member 120p. Multiple elastomeric component 22p are attached in series to provide sufficient displacement to effectively lower the natural frequency of the storage rack system during seismic events.

Energy imparted to the storage rack system during seismic events is dissipated as each opposing storage rack vibration isolator 20p stretches and/or compresses in response to the movement of the storage rack system. The spring stiffness, K, as presented in FIG. 7, is a physical property of the elastomeric members 28p and elastomers of appropriate stiffness could be selected depending on the particular application. Viscous damping, C, as presented in FIG. 7, is also observed in such systems in both the action of the elastomeric members 28p and in the friction that must be overcome to make the storage rack system move. Some of the energy imparted to the storage rack system during seismic events is required to move the columns 14 of the storage rack system to overcome the force of friction at the interface of the sliding base pads 30p with the fixed base pad 32p.

The elastomeric components 22p are housed within a restriction element 60p. During seismic events, the restriction element 60p serves to restrict the horizontal movement of the storage rack vibration isolator 20p to essentially make the damping effect unidirectional and parallel to the fixed base pad 32p, as well as to restrict vertical movement of the storage rack vibration isolator 20p. The elastomeric components 22p stretch and compress in response to the movement of the storage rack system. The elastomeric components 22p on opposing sides of the storage rack positioning member 120p serve to limit the extent of the stretching and compression. The mechanical restriction 60p also protects the seismic vibration absorption and dissipation structures from side impacts. While the mechanical restriction 60p substantially restricts movement perpendicular to the directional arrow 10 as well as vertical movement, there is room for some movement in those directions, which imparts some additional damping in those directions.

Figure 31:
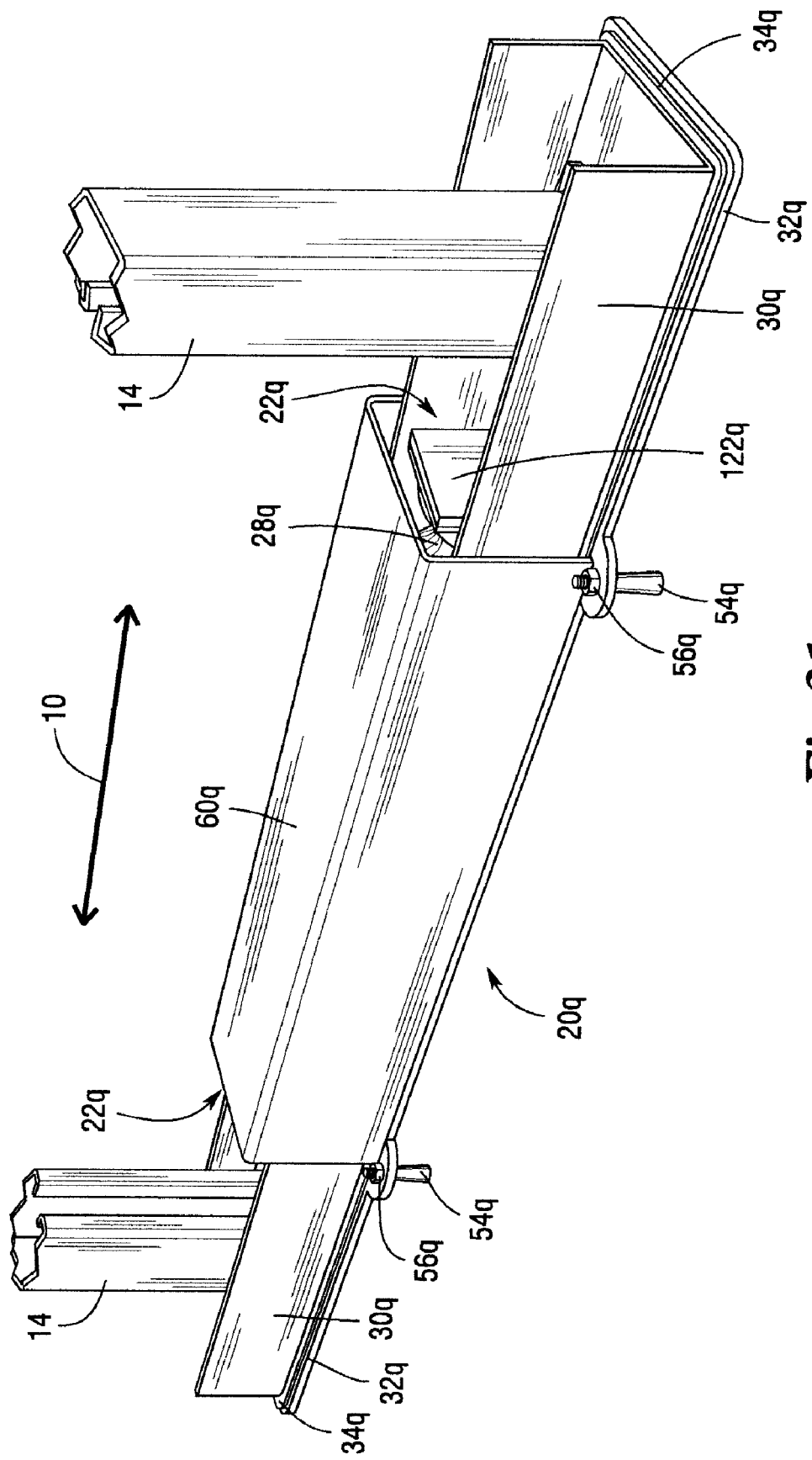
FIG. 31 is a perspective view of one embodiment of a storage rack vibration isolator located primarily between columns of a storage rack system in the less flexible second horizontal dimension.
Figure 32:
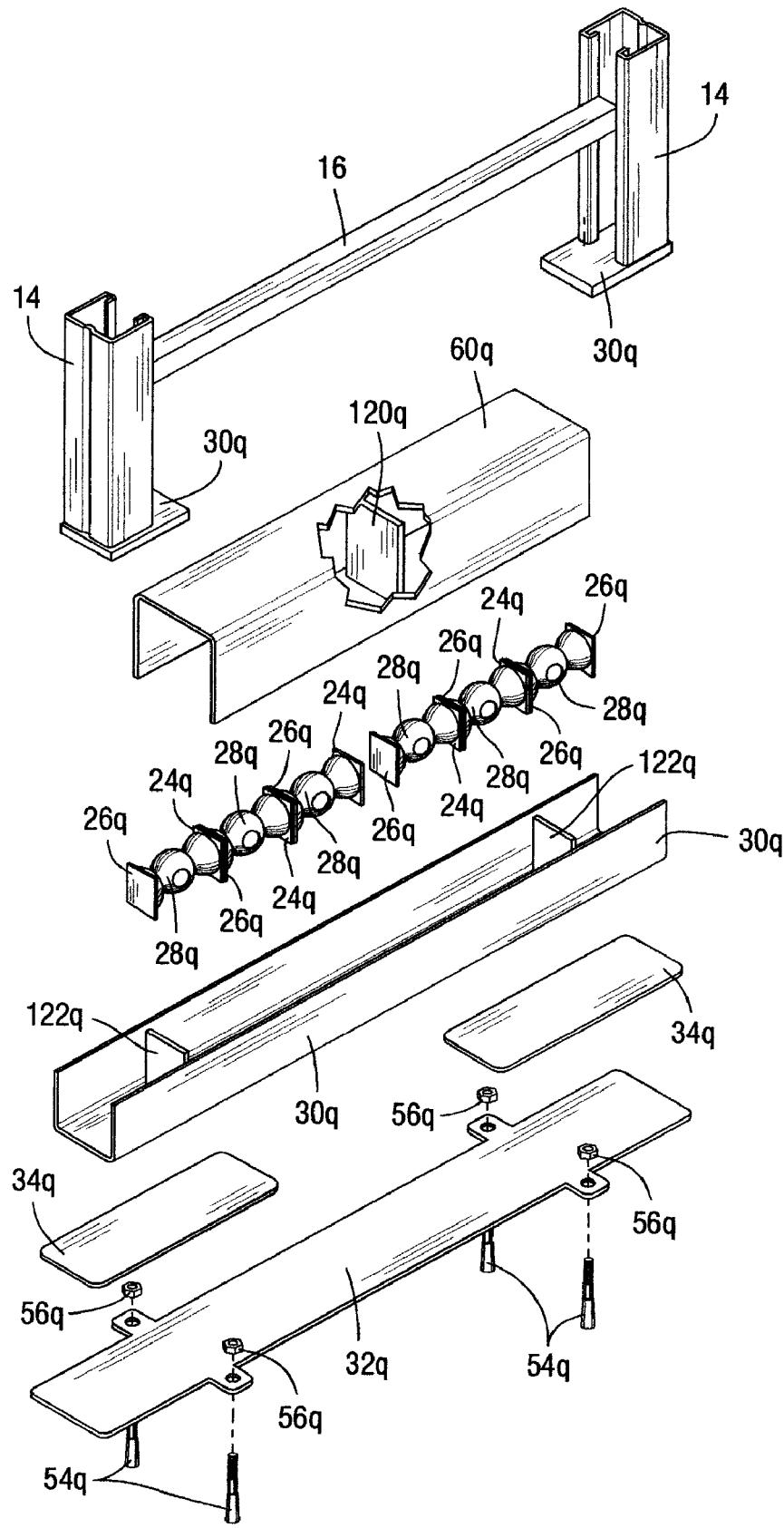
FIG. 32 is an exploded view of the storage rack vibration isolator of FIG. 31.

FIG. 31 shows a variation of the storage rack vibration isolators of FIG. 28. As can be best understood by comparing FIGS. 31 and 32, the orientation of the sliding base pad 30q and the restriction element 60q means that a single floor positioning member 122q is mounted to the underside of the restriction element 60q with a pair of opposing storage rack positioning members 120q are positioned on either side. A series of elastomeric components 22q are mounted between the floor positioning member 122q and each storage rack positioning member 120q. During a seismic event this embodiment functions similarly to the embodiments depicted in FIGS. 8 through 10 except that in this case the elastomeric components 22q function primarily in tension and compression rather than in shear.

Figure 33:
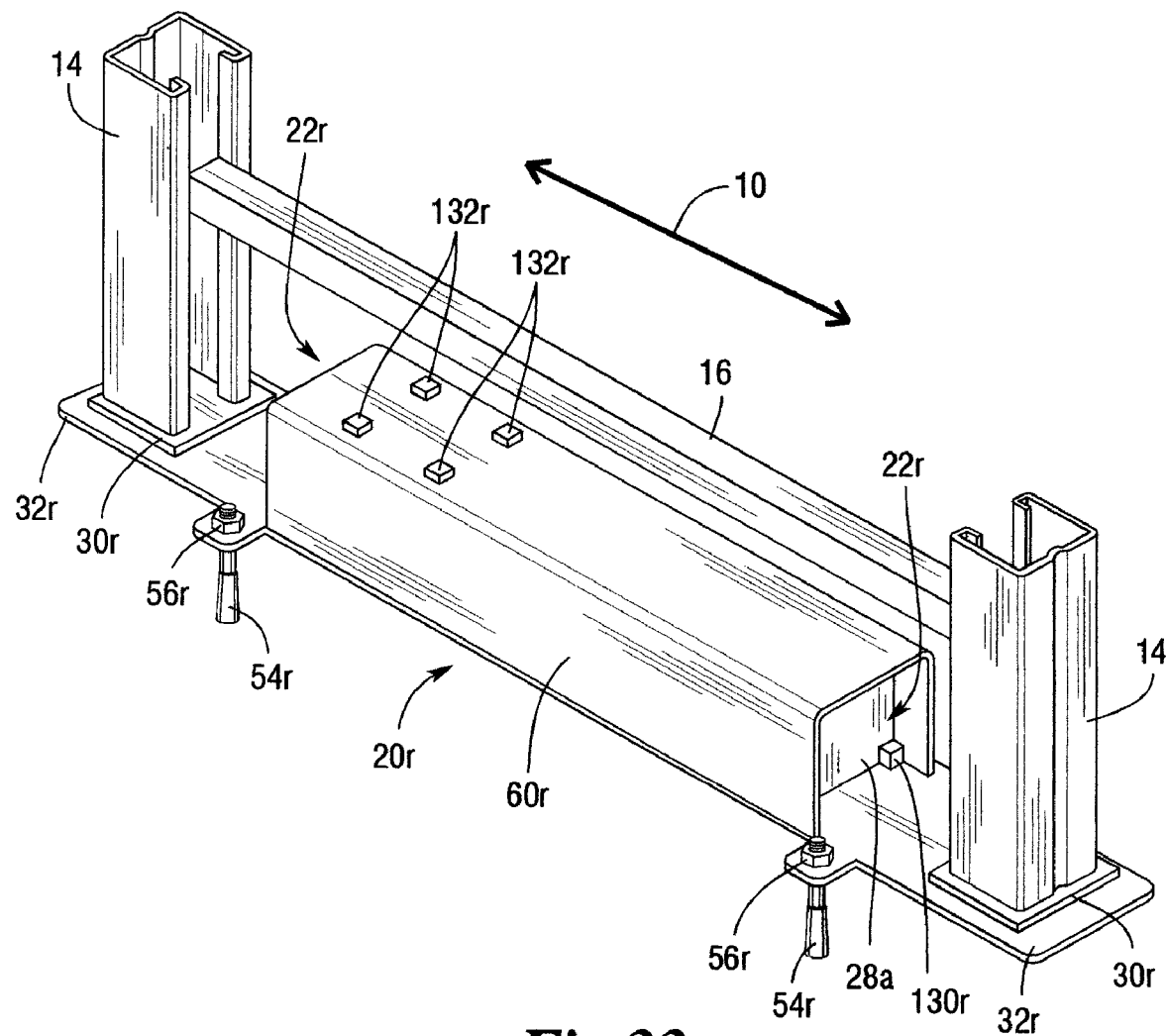
FIG. 33 is a perspective view of one embodiment of a storage rack vibration isolator located primarily between columns of a storage rack system in the less flexible second horizontal dimension.
Figure 34:
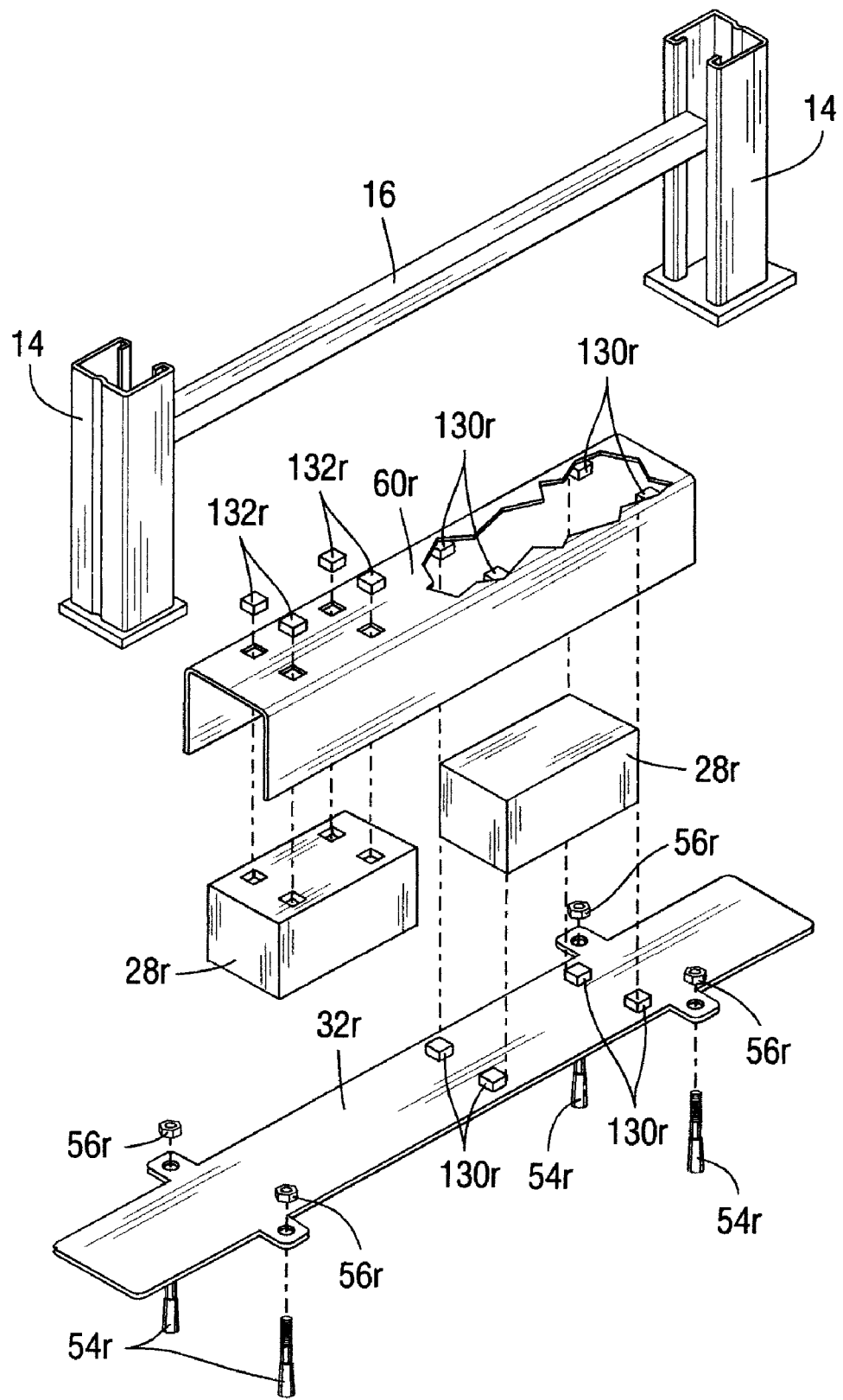
FIG. 34 is an exploded view of the storage rack vibration isolator of FIG. 33.

FIG. 33 shows a variation of vibration adsorption and dissipation structures of storage rack vibration isolators that comprise elastomeric components held in compression and placed in shear between a sliding base pad 30r and a restriction element 60r. This embodiment is similar to the embodiments depicted in FIGS. 8 through 10 except for the design of the elastomeric components 22r. As can be best understood by comparing FIGS. 33 and 34, the elastomeric components 22r comprise single blocks of elastomeric members 28r that are slightly larger than the space between the sliding base pad 30r and the restriction element 60r. The elastomeric members 28r are compressed into the space defined by the sliding base pad 30r and the restriction element 60r to form a tight fit against the sliding base pad 30r and the restriction element 60r. Stoppers 130r could be included to site the elastomeric members 28r in position (as shown in the cut out view on the right-hand side of the restriction element 60r). Alternatively, shallow holes 134 could be drilled through the restriction element 60r and into the elastomeric members 28r into which a key 132r or other device could be inserted to hold the elastomeric members 28r in place.

In this embodiment, the sliding base pad 30r acts as the first mounting plate and the restriction element 62r acts as the second mounting plate. The elastomeric member 28r is operatively attached to the sliding base pad 30r and the restriction element 60r through the force of friction. During seismic events, this embodiment functions similarly to those depicted in FIGS. 8 through 10.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

What is claimed is:

1. A storage rack vibration isolator for use with a storage rack system installed on a floor, the storage rack system having a plurality of columns, the storage rack system being more flexible in a first horizontal dimension and less flexible in a second horizontal dimension, the storage rack system having at least a first column and a second column adjacent one another located in the second horizontal dimension, said storage rack vibration isolator comprising:

at least one seismic vibration absorption and dissipation structure constructed to be located primarily between the first and second columns in the second horizontal dimension to reduce the natural frequency of the storage rack system in at least the second horizontal dimension, said at least one seismic vibration absorption and dissipation structure including a first member connectable to the storage rack system and a second member connectable to the floor;

at least one column support assembly mountable to at least the first and second columns to enable the first and second columns to move with respect to the floor; and a structure to limit the movement of the first and second columns during seismic events to substantially the second horizontal dimension.

2. The storage rack vibration isolator of claim 1 in which said column support assembly comprises:

a sliding base pad attachable to the lower end of at least one of said first and second columns; and a fixed base pad attachable to the floor, said fixed base pad having said sliding base pad positioned such that said sliding base pad slides over said fixed base pad when one of said first and second columns move during seismic events.

3. The storage rack vibration isolator of claim 1 in which said column support assembly comprises:
- a sliding base pad attachable to the lower end of one of at least said first and second columns;
- a fixed base pad attachable to the floor, said fixed base having said sliding base pad positioned such that said sliding base pad slides over said fixed base pad when one of said first and second columns move during seismic events; and
- at least one layer of low friction bearing material interposed between said sliding base pad and said fixed base pad.

4. The storage rack vibration isolator of claim 1 in which said column support assembly comprises:
- two sliding base pads each attachable to the lower end of one of said first and second columns; and
- a fixed base pad attachable to the floor and having a length which enables it to extend between and under at least said first and second columns, said sliding base pads positioned on said fixed base pad when the lower ends the pair of columns are attached to said sliding base pads such that said sliding base pads slide over said fixed base pad when the pair of columns moves during seismic events.

5. The storage rack vibration isolator of claim 1 in which said column support assembly comprises:
- two sliding base pads each attachable to the lower end of one of said first and second of columns; and
- a fixed base pad attachable to the floor and having a length which enables it to extend between and under at least said first and second columns, said sliding base pads positioned on said fixed base pad when the lower ends the pair of columns are attached to said sliding base pads such that said sliding base pads slide over said fixed base pad when the pair of columns moves during seismic events; and
- at least one layer of low friction bearing material interposed between each said sliding base pad and said fixed base pad.

6. The storage rack vibration isolator of claim 1 further comprising said at least one storage rack vibration isolator coupled to the storage rack system at a cross brace connected across said first and second columns of said storage rack system.

7. The storage rack vibration isolator of claim 1 in which said column support assembly comprises:
- a sliding base pad attached to the lower end first and second columns, said sliding base pad having a length which enables it to extend between and under the first and second columns; and
- a fixed base pad attached to the floor, said fixed base pad having a length which enables it to extend between and under at least the first and second columns, said sliding base pad positioned on said fixed base pad such that said sliding base pad slides over said fixed base pad when the first and second columns moves during seismic events.

8. The storage rack vibration isolator of claim 1 in which said column support assembly comprises:
- a sliding base pad attached to the lower end first and second columns, said sliding base pad having a length that enables it to extend between and under first and second columns;
- a fixed base pad attachable to the floor, said fixed base pad having a length which enables it to extend between and under at least the first and second columns, said sliding base pad positioned on said fixed base pad such that said sliding base pad slides over said fixed base pad when the first and second columns moves during seismic events; and
- the lengths of said sliding base pad and said fixed base pad causing a portion of said sliding base pad to project over an end of said fixed base pad as said sliding base pad slides on said fixed base pad during a seismic event.

9. The storage rack vibration isolator of claim 1 in which said column support assembly comprises:
- a sliding base pad attachable to the lower end of the first and second columns, said sliding base pad having a length which enables it to extend between and under the first and second columns;
- a fixed base pad attachable to the floor, said fixed base pad having a length which enables it to extend between and under at least the first and second columns, said sliding base pad positioned on said fixed base pad when the lower ends the first and second columns are attached to said sliding base pad such that said sliding base pad slides over said fixed base pad when the first and second columns moves during seismic events; and
- at least one layer of low friction bearing material interposed between said sliding base pad and said fixed base pad.

10. The storage rack vibration isolator of claim 1 in which said column support assembly comprises:
- a sliding base pad attachable to the lower end of the first and second columns, said sliding base pad having a length which enables it to extend between and under first and second columns;
- a fixed base pad attachable to the floor, said fixed base pad having a length which enables it to extend between and under at least the first and second columns, said sliding base pad positioned on said fixed base pad such that said sliding base pad slides over said fixed base pad when the first and second columns moves during seismic events;
- the lengths of said sliding base pad and said fixed base pad causing a portion of said sliding base pad to project over an end of said fixed base pad as said sliding base pad slides on said fixed base pad during a seismic event; and
- at least one layer of low friction bearing material interposed between said sliding base pad and said fixed base pad.

11. The storage rack vibration isolator of claim 1 further comprising:
- said column support assembly comprises a sliding base pad attachable to the lower end of at least said first column, a fixed base pad attachable to the floor, said sliding base pad positioned on said fixed base pad such that said sliding base pad slides over said fixed base pad when at least said first column moves during seismic events;
- said first member of said at least one storage rack vibration isolator mountable on said sliding base pad to connect said first member to said storage rack system; and
- at least one fastening member attachable to said second member of said at least one storage rack vibration isolator and to said fixed base pad to connect said second member to the floor.

12. The storage rack vibration isolator of claim 1 further comprising:
- said column support assembly comprises a sliding base pad attachable to the lower end of at least said first column, a fixed base pad attachable to the floor, said sliding base pad positioned on said fixed base pad such that said sliding base pad slides over said fixed base pad when at least said first column moves during seismic events; and said first member of said at least one storage rack vibration isolator mountable on said sliding base pad to connect said first member to said storage rack system;

at least one fastening member attachable to said second member of said at least one storage rack vibration isolator and to said fixed base pad to connect said second member to the floor; and at least one layer of low friction bearing material interposed between said sliding base pad and said fixed base pad.

13. The storage rack vibration isolator of claim 1 further comprising:

said column support assembly comprises a sliding base pad attachable to the lower end of said first and second columns, said sliding base pad having a length which enables it to extend between and under said first and second columns, a fixed base pad attachable to the floor, said fixed base pad having a length which enables it to extend between and under at least said first and second columns, said sliding base pad positioned on said fixed base pad such that said sliding base pad slides over said fixed base pad when said first and second columns move during seismic events;

said first member of said at least one storage rack vibration isolator mountable on said sliding base pad to connect said first member to the storage rack system; and at least one fastening member comprising a box fabrication that encloses said at least one storage rack vibration isolator, said fastening member attached to said second member of said at least one storage rack vibration isolator and to said fixed base pad to connect said second member to the floor.

14. The storage rack vibration isolator of claim 1 further comprising:

said column support assembly comprises a sliding base pad attachable to the lower end of said first and second columns, said sliding base pad having a length which enables it to extend between and under said first and second columns, a fixed base pad attachable to the floor, said fixed base pad having a length which enables it to extend between and under at least said first and second columns, said sliding base pad positioned on said fixed base pad such that said sliding base pad slides over said fixed base pad when said first and second columns move during seismic events;

said first member of said at least one storage rack vibration isolator mountable on said sliding base pad to connect said first member to the storage rack system;

at least one fastening member comprising a box fabrication that encloses said at least one storage rack vibration isolator, said fastening member attachable to said second member of said at least one storage rack vibration isolator and to said fixed base pad to connect said second member to the floor; and at least one layer of low friction bearing material interposed between said sliding base pad and said fixed base pad.

15. The storage rack vibration isolator of claim 1 further comprising:

said column support assembly comprises a sliding base pad attachable to the lower end of at least said first column, a fixed base pad attached to the floor, said sliding base pad positioned on said fixed base pad such that said sliding base pad slides over said fixed base pad when at least said first column moves during seismic events;

said first member of said at least one storage rack vibration isolator mountable on said sliding base pad to connect said first member to the storage rack system; and at least one fastening member comprising a box fabrication that encloses said at least one storage rack vibration isolator, said fastening member attachable to said second member of said at least one storage rack vibration isolator and to said fixed base pad to connect said second member to the floor.

16. The storage rack vibration isolator of claim 1 further comprising:

said column support assembly comprises a sliding base pad attachable to the lower end of at least said first column, a fixed base pad attached to the floor, said sliding base pad positioned on said fixed base pad such that said sliding base pad slides over said fixed base pad when at least said first columns moves during seismic events;

said first member of said at least one storage rack vibration isolator mountable on said sliding base pad to connect said first member to the storage rack system;

at least one fastening member comprising a box fabrication that encloses said at least one storage rack vibration isolator, said fastening member attachable to said second member of said at least one storage rack vibration isolator and to said fixed base pad to connect said second member to the floor; and at least one layer of low friction bearing material interposed between said sliding base pad and said fixed base pad.

17. The storage rack vibration isolator of claim 1 which includes a structure that restricts the movement of said at least one storage rack vibration isolator to substantially one horizontal direction.

18. The storage rack vibration isolator of claim 1 which includes a structure that restricts the movement of said at least one storage rack vibration isolator to substantially one horizontal direction and allows a limited amount of movement in another horizontal direction.

19. The storage rack vibration isolator of claim 1 which includes a structure that substantially restricts the movement of said at least one storage rack vibration isolator in a vertical direction.

20. The storage rack vibration isolator of claim 1 which includes a structure that substantially restricts the movement of said at least one storage rack vibration isolator in a vertical direction so as to allow a limited amount of movement in the vertical direction.

21. The storage rack vibration isolator of claim 1 further comprising:

a structure that restricts the movement of said at least one storage rack vibration isolator to substantially one horizontal direction; and a structure that substantially restricts the movement of said elastomeric component in a vertical direction.

22. The storage rack vibration isolator of claim 1 in which said at least one seismic vibration absorption and dissipation structure further comprises:

said first member comprises a first mounting plate connectable to said storage rack system;

said second member comprises a second mounting plate connectable to the floor; and at least one elastomeric member extending between said first and second mounting plates and operatively attached to said first and second mounting plates such that during seismic events said first and second mounting plates remain attached to said at least one elastomeric member as said at least one elastomeric member is placed in shear while said first and second mounting plates are able to move in planes substantially parallel to each other, said at least one elastomeric member made of material that is capable of absorbing and dissipating the energy of ground movement imparted to the storage rack system during seismic events while said material enables the storage rack system to move a sufficient distance relative to the floor to lower the natural frequency of the storage rack system in at least one horizontal direction.

23. The storage rack vibration isolator of claim 1 in which said at least one seismic vibration absorption and dissipation structure further comprises:

said first member comprises a first mounting plate connectable to said storage rack system;

said second member comprises a second mounting plate connectable to the floor; and at least two elastomeric members extending between said first and second mounting plates and operatively attached to said first and second mounting plates such that during seismic events said first and second mounting plates remain attached to said at least two elastomeric members as said at least two elastomeric members are placed in shear while said first and second mounting plates are able to move in planes substantially parallel to each other, at least one intermediate plate positioned between every two said at least two elastomeric members, and said at least two elastomeric members made of material that is capable of absorbing and dissipating the energy of ground movement imparted to the storage rack system during seismic events while said material enables the storage rack system to move a sufficient distance relative to the floor to lower the natural frequency of the storage rack system in at least one horizontal direction.

24. The storage rack vibration isolator of claim 1 in which said at least one seismic vibration absorption and dissipation structure is biased to return to its starting position after seismic events.

25. The storage rack vibration isolator of claim 1 further comprising:

said at least one column support assembly comprises a sliding base pad attachable to the lower end of each of said first and second columns;

said first member comprises at least one sliding element attachable to the storage rack system;

said second member comprises a fixed base pad attachable to the floor having a length which enables it to extend between and under at least said first and second columns, said fixed base pad having at least one concave surface on which said first and second columns and said sliding element are positioned; and said structure further limiting the movement of said first and second columns during seismic events to the dimensions of the fixed base pad.

26. The storage rack vibration isolator of claim 1 further comprising:

said at least one column support assembly comprises a sliding base pad attachable to the lower end of each of said first and second columns;

said first member comprises at least one sliding element attachable to the storage rack system;

said second member comprises a fixed base pad attachable to the floor having a length which enables it to extend between and under at least said first and second columns, said fixed base pad having a concave surface for each said sliding element on which each said sliding element is positioned; and said structure further limiting the movement of said first and second columns during seismic events to the dimensions of the fixed base pad.

27. The storage rack vibration isolator of claim 1 in which said seismic vibration absorption and dissipation structure comprises at least one from the group consisting of extension helical springs, compression helical springs, and linear bearings.

28. The storage rack vibration isolator of claim 1 in which said seismic vibration absorption and dissipation structure includes at least one elastomeric component.

29. The storage rack vibration isolator of claim 1 in which the natural frequency of storage racks in the second horizontal dimension is reduced to about 0.9 Hz or less.

30. The storage rack vibration isolator of claim 1 in which the natural frequency of storage racks in the second horizontal dimension is reduced to about 0.5 Hz or less.

31. The storage rack vibration isolator of claim 1 in which said at least one seismic vibration absorption and dissipation structure further comprises:

said first member comprises a first mounting plate connectable to said storage rack system;

said second member comprises a second mounting plate connectable to the floor; and at least one elastomeric member extending between said first and second mounting plates and operatively attached to said first and second mounting plates such that during seismic events said first and second mounting plates remain attached to said at least one elastomeric member as said at least one elastomeric member is placed in compression while said first and second mounting plates are able to move in planes substantially perpendicular to each other, said at least one elastomeric member made of material that is capable of absorbing and dissipating the energy of ground movement imparted to the storage rack system during seismic events.

32. The storage rack vibration isolator of claim 1 in which said at least one seismic vibration absorption and dissipation structure further comprises:

said first member comprises a first mounting plate connected to said storage rack system;

said second member comprises a second mounting plate connected to the floor; and at least one elastomeric member extending between said first and second mounting plates and operatively attached to said first and second mounting plates such that during seismic events said first and second mounting plates remain attached to said at least one elastomeric member as said at least one elastomeric members is placed in tension while said first and second mounting plates are able to move in relation to each other, said at least one elastomeric member made of material that is capable of absorbing and dissipating the energy of ground movement imparted to the storage rack system during seismic events.

33. A storage rack vibration isolator for use with a storage rack system installed on a floor, the storage rack system having a plurality of columns, the storage rack system being more flexible in a first horizontal dimension and a less flexible in a second horizontal dimension, the storage rack system having at least a first column and a second columns located adjacent one another in the second horizontal dimension, said storage rack vibration isolator comprising:

at least one elastomeric component installable primarily between the first and second adjacent columns in the second horizontal dimension to reduce the natural frequency of the storage rack system in at least the second horizontal dimension, said elastomeric component having a first member mountable to the storage rack system and a second member mountable to the floor;

a sliding base pad attachable to the lower end of the first and second columns, said sliding base pad having a length which enables it to extend between and under at least the first and second columns;

a fixed base pad attachable to the floor, said fixed base pad having a length which enables it to extend between and under at least the first and second columns, said sliding base pad positioned on said fixed base pad when the lower ends the first and second columns are attached to said sliding base pad such that said sliding base pad slides over said fixed base pad when the first and second columns moves during seismic events; and at least one fastening member attached to said second member and to said fixed base pad to mount said second member to the floor, said at least one fastening member enables said first member to move with the first and second columns during seismic events, said at least one fastening member mechanically restricting movement of said first and second columns to substantially the second horizontal dimension.

34. The storage rack vibration isolator of claim 33 in which the lengths of said sliding base pad and said fixed base pad cause a portion of said sliding base pad to project over an end of said fixed base pad as said sliding base pad slides on said fixed base pad during a seismic event.

35. The storage rack vibration isolator of claim 33 in which said at least one fastening member comprises a box fabrication enclosing said at least one elastomeric component.

36. The storage rack vibration isolator of claim 33 which includes at least one layer of low friction bearing material interposed between said sliding base pad and said fixed base pad.

37. The storage rack vibration isolator of claim 33 in which said elastomeric component further comprises:

said first member comprises a first mounting plate connectable to the storage rack system;

said second member comprises a second mounting plate connectable to the fastening element; and at least one elastomeric member extending between said first and second mounting plates and operatively attached to said first and second mounting plates such that during seismic events said first and second mounting plates remain attached to said at least one elastomeric member as said at least one elastomeric member is placed in shear while said first and second mounting plates are able to move in planes substantially parallel to each other, said at last one elastomeric member made of material that is capable of absorbing and dissipating the energy of ground movement imparted to the storage rack system during seismic events while said material enables the storage rack system to move a sufficient distance relative to the floor to lower the natural frequency of the storage rack system in at least one horizontal direction.

38. The storage rack vibration isolator of claim 33 in which said elastomeric component further comprises:

said first member comprises a first mounting plate connectable to the storage rack system;

said second member comprises a second mounting plate connectable to the fastening element; and at least two elastomeric members extending between said first and second mounting plates and operatively attached to said first and second mounting plates such that during seismic events said first and second mounting plates remain attached to said at least two elastomeric members as said at least two elastomeric member is placed in shear while said first and second mounting plates are able to move in planes substantially parallel to each other, at least one intermediate plate positioned between every two said at least two elastomeric members, said at least two elastomeric members made of material that is capable of absorbing and dissipating the energy of ground movement imparted to the storage rack system during seismic events while said material enables the storage rack system to move a sufficient distance relative to the floor to lower the natural frequency of the storage rack system in at least one horizontal direction.

39. The storage rack vibration isolator of claim 33 in which said at least one elastomeric component is biased to return to its starting position after seismic events.

40. The storage rack vibration isolator of claim 33 in which the natural frequency of storage rack system in the second horizontal dimension is reduced to about 0.9 Hz or less.

41. The storage rack vibration isolator of claim 33 in which the natural frequency of storage rack system in the second horizontal dimension is reduced to about 0.5 Hz or less.

42. The storage rack vibration isolator of claim 33 which includes a structure that restricts the movement of said at least one storage rack vibration isolator to substantially one horizontal direction.

43. The storage rack vibration isolator of claim 33 which includes a structure that restricts the movement of said at least one storage rack vibration isolator to substantially one horizontal direction and allows a limited amount of movement in another horizontal direction.

44. The storage rack vibration isolator of claim 33 which includes a structure that substantially restricts the movement of said at least one storage rack vibration isolator in a vertical direction.

45. The storage rack vibration isolator of claim 33 which includes a structure that substantially restricts the movement of said at least one storage rack vibration isolator in a vertical direction so as to allow a limited amount of movement in the vertical direction.

46. The storage rack vibration isolator of claim 33 further comprising:

a structure that restricts the movement of said at least one storage rack vibration isolator to substantially one horizontal direction; and a structure that substantially restricts the movement of said elastomeric component in a vertical direction.

47. The storage rack vibration isolator of claim 33 in which said at least one seismic vibration absorption and dissipation structure is biased to return to its starting position after seismic events.

48. The storage rack vibration isolator of claim 33 in which said at least one seismic vibration absorption and dissipation structure further comprises:
   said first member comprises a first mounting plate connectable to said storage rack system;
   said second member comprises a second mounting plate connectable to the floor; and
   at least one elastomeric member extending between said first and second mounting plates and operatively attached to said first and second mounting plates such that during seismic events said first and second mounting plates remain attached to said at least one elastomeric member as said at least one elastomeric member is placed in compression while said first and second mounting plates are able to move in planes substantially perpendicular to each other, said at least one elastomeric member made of material that is capable of absorbing and dissipating the energy of ground movement imparted to the storage rack system during seismic events.

49. The storage rack vibration isolator of claim 33 in which said at least one seismic vibration absorption and dissipation structure further comprises:
   said first member comprises a first mounting plate connected to said storage rack system;
   said second member comprises a second mounting plate connected to the floor; and
   at least one elastomeric member extending between said first and second mounting plates and operatively attached to said first and second mounting plates such that during seismic events said first and second mounting plates remain attached to said at least one elastomeric member as said at least one elastomeric members is placed in tension while said first and second mounting plates are able to move in relation to each other, said at least one elastomeric member made of material that is capable of absorbing and dissipating the energy of ground movement imparted to the storage rack system during seismic events.

50. A storage rack system installed on a floor comprising:
   a plurality of columns mounted on at least two column support assemblies for movement with respect to the floor;
   said storage rack system having a structure that is more flexible in a first horizontal dimension and a less flexible in a second horizontal dimension;
   a first column and a second column located adjacent one another in the second horizontal dimension;
   at least one storage rack vibration isolator installed primarily between said first and second columns in the second horizontal dimension, said at least one storage rack vibration isolator comprising at least one seismic vibration absorption and dissipation structure to reduce the natural frequency of said storage rack system in at least the second horizontal dimension, said storage rack vibration isolator including a first member connected to the storage rack system and a second member connected to the floor; and
   at least one structure to limit the movement of said storage rack system during seismic events to substantially the second horizontal dimension.

51. The storage rack system of claim 50 comprising:
   a plurality of columns forming at least two storage bays, each storage bay having at least two columns adjacent one another in a cross-aisle dimension on each side of said storage bay, one of said at least two columns being a rear column of a storage bay, said storage rack system being less flexible in the cross-aisle dimension;
   one or more pair of said at least two storage rack bays being located back-to-back to one another with a flue between the backs of each two back-to-back storage bays, said at least one storage rack vibration isolator installed primarily in the flue between adjacent columns of both back-to-back storage bays.

52. The storage rack system of claim 50 comprising
   said plurality of columns forming at least one storage bay having at least two columns adjacent one another in a cross-aisle dimension on each side of said storage bay, said storage rack system being less flexible in the cross-aisle dimension;
   said at least one storage rack vibration isolator installed primarily between every two columns of each storage bay in the cross-aisle dimension.

53. The storage rack system of claim 50 comprising
   plurality columns located adjacent one another in the second horizontal dimension;
   said at least one storage rack vibration isolator installed primarily between at least two columns in the second horizontal dimension.

54. The storage rack system of claim 50 comprising
   a plurality of columns located adjacent one another in the second horizontal dimension;
   said at least one storage rack vibration isolator installed primarily between every two columns in the second horizontal dimension.

55. The storage rack system of claim 50 in which said column support assembly comprises:
   a sliding base pad attached to the lower end of one of said first and second columns; and
   a fixed base pad attached to the floor, said fixed base having said sliding base pad positioned such that said sliding base pad slides over said fixed base pad when one of said first and second columns moves during seismic events.

56. The storage rack system of claim 50 in which said column support assembly comprises:
   a sliding base pad attached to the lower end of one of said first and second columns;
   a fixed base pad attached to the floor, said fixed base having said sliding base pad positioned such that said sliding base pad slides over said fixed base pad when one of said first and second columns moves during seismic events; and
   at least one layer of low friction bearing material interposed between said sliding base pad and said fixed base pad.

57. The storage rack system of claim 50 in which said column support assembly comprises:
   two sliding base pads each attached to the lower end of one of said first and second columns; and
   a fixed base pad attached to the floor and having a length which enables it to extend between and under at least said first and second columns, said sliding base pads positioned on said fixed base pad when the lower ends of said first and second columns are attached to said sliding base pads such that said sliding base pads slide over said fixed base pad when said first and second columns moves during seismic events.

58. The storage rack system of claim 50 in which said column support assembly comprises:
- two sliding base pads each attached to the lower end of one of said first and second of columns; and
- a fixed base pad attached to the floor and having a length which enables it to extend between and under at least said first and second columns, said sliding base pads positioned on said fixed base pad when the lower ends said first and second columns are attached to said sliding base pads such that said sliding base pads slide over said fixed base pad when said first and second columns moves during seismic events; and
- at least one layer of low friction bearing material interposed between each said sliding base pad and said fixed base pad.

59. The storage rack system of claim 50 further comprising
- a second plurality of columns located adjacent one another in the second horizontal dimension; and
- said column support assembly comprises a separate sliding base pad attached to the lower end of each of said second plurality of columns, a fixed base pad attached to the floor and having a length which enables it to extend between and under each of said second plurality of columns, said sliding base pads positioned on said fixed base pad when the lower ends of said first and second columns are attached to said sliding base pads such that said sliding base pads slide over said fixed base pad when said second plurality of columns moves during seismic events.

60. The storage rack system of claim 50 further comprising:
- a second plurality of columns located adjacent one another in the second horizontal dimension; and
- said column support assembly comprises a separate sliding base pad attached to the lower end of each of said second plurality of columns, a fixed base pad attached to the floor and having a length which enables it to extend between and under each of said second plurality of columns, said sliding base pads positioned on said fixed base pad when the lower ends of said first and second columns are attached to said sliding base pads such that said sliding base pads slide over said fixed base pad when said second plurality of columns moves during seismic events; and
- at least one layer of low friction bearing material interposed between each said sliding base pad and said fixed base pad.

61. The storage rack system of claim 50 further comprising said at least one storage rack vibration isolator coupled to the storage rack system at a cross brace connected across said first and second columns of said storage rack system.

62. The storage rack system of claim 50 in which said column support assembly comprises:
- a sliding base pad attached to the lower end said first and second columns, said sliding base pad having a length which enables it to extend between and under first and second columns; and
- a fixed base pad attached to the floor, said fixed base pad having a length which enables it to extend between and under at least of said first and second columns, said sliding base pad positioned on said fixed base pad such that said sliding base pad slides over said fixed base pad when said first and second columns moves during seismic events.

63. The storage rack system of claim 50 in which said column support assembly comprises:
- a sliding base pad attached to the lower end first and second columns, said sliding base pad having a length which enables it to extend between and under first and second columns;
- a fixed base pad attached to the floor, said fixed base pad having a length which enables it to extend between and under at least said first and second columns, said sliding base pad positioned on said fixed base pad such that said sliding base pad slides over said fixed base pad when said first and second columns moves during seismic events; and
- the lengths of said sliding base pad and said fixed base pad causing a portion of said sliding base pad to project over an end of said fixed base pad as said sliding base pad slides on said fixed base pad during a seismic event.

64. The storage rack system of claim 50 in which said column support assembly comprises:
- a sliding base pad attached to the lower end of the first and second columns, said sliding base pad having a length which enables it to extend between and under the first and second columns;
- a fixed base pad attached to the floor, said fixed base pad having a length which enables it to extend between and under at least said first and second columns, said sliding base pad positioned on said fixed base pad when the lower ends said first and second columns are attached to said sliding base pad such that said sliding base pad slides over said fixed base pad when said first and second columns moves during seismic events; and
- at least one layer of low friction bearing material interposed between said sliding base pad and said fixed base pad.

65. The storage rack system of claim 50 in which said column support assembly comprises:
- a sliding base pad attached to the lower end first and second columns, said sliding base pad having a length which enables it to extend between and under first and second columns;
- a fixed base pad attached to the floor, said fixed base pad having a length which enables it to extend between and under at least said first and second columns, said sliding base pad positioned on said fixed base pad such that said sliding base pad slides over said fixed base pad when said first and second columns moves during seismic events;
- the lengths of said sliding base pad and said fixed base pad causing a portion of said sliding base pad to project over an end of said fixed base pad as said sliding base pad slides on said fixed base pad during a seismic event; and
- at least one layer of low friction bearing material interposed between said sliding base pad and said fixed base pad.

66. The storage rack system of claim 50 further comprising:
- said column support assembly comprises a sliding base pad attached to the lower end of at least said first column, a fixed base pad attached to the floor, said sliding base pad positioned on said fixed base pad such that said sliding base pad slides over said fixed base pad when at least said first column moves during seismic events;
- said first member of said at least one storage rack vibration isolator mounted on said sliding base pad to connect said first member to said storage rack system; and at least one fastening member attached to said second member of said at least one storage rack vibration isolator and to said fixed base pad to connect said second member to the floor.

67. The storage rack system of claim 50 further comprising:
said column support assembly comprises a sliding base pad attached to the lower end of at least said first column, a fixed base pad attached to the floor, said sliding base pad positioned on said fixed base pad such that said sliding base pad slides over said fixed base pad when at least said first column moves during seismic events; and
said first member mounted of said at least one storage rack vibration isolator on said sliding base pad to connect said first member to said storage rack system;
at least one fastening member attached to said second member of said at least one storage rack vibration isolator and to said fixed base pad to connect said second member to the floor; and
at least one layer of low friction bearing material interposed between said sliding base pad and said fixed base pad.

68. The storage rack system of claim 50 further comprising:
said column support assembly comprises a sliding base pad attached to the lower end of said first and second columns, said sliding base pad having a length which enables it to extend between and under said first and second columns, a fixed base pad attached to the floor, said fixed base pad having a length which enables it to extend between and under at least said first and second columns, said sliding base pad positioned on said fixed base pad such that said sliding base pad slides over said fixed base pad when said first and second columns move during seismic events;
said first member of said at least one storage rack vibration isolator mounted on said sliding base pad to connect said first member to the storage rack system; and
at least one fastening member comprising a box fabrication that encloses said at least one storage rack vibration isolator, said fastening member attached to said second member of said at least one storage rack vibration isolator and to said fixed base pad to connect said second member to the floor.

69. The storage rack system of claim 50 further comprising:
said column support assembly comprises a sliding base pad attached to the lower end of said first and second columns, said sliding base pad having a length which enables it to extend between and under said first and second columns, a fixed base pad attached to the floor, said fixed base pad having a length which enables it to extend between and under at least said first and second columns, said sliding base pad positioned on said fixed base pad such that said sliding base pad slides over said fixed base pad when said first and second columns move during seismic events; and
said first member of said at least one storage rack vibration isolator mounted on said sliding base pad to connect said first member to the storage rack system;
at least one fastening member comprising a box fabrication that encloses said at least one storage rack vibration isolator, said fastening member attached to said second member of said at least one storage rack vibration isolator and to said fixed base pad to connect said second member to the floor; and
at least one layer of low friction bearing material interposed between said sliding base pad and said fixed base pad.

70. The storage rack system of claim 50 further comprising:
said column support assembly comprises a sliding base pad attached to the lower end of at least said first column, a fixed base pad attached to the floor, said sliding base pad positioned on said fixed base pad such that said sliding base pad slides over said fixed base pad when at least said first column moves during seismic events;
said first member of said at least one storage rack vibration isolator mounted on said sliding base pad to connect said first member to the storage rack system; and
at least one fastening member comprising a box fabrication that encloses said at least one storage rack vibration isolator, said fastening member attached to said second member of said at least one storage rack vibration isolator and to said fixed base pad to connect said second member to the floor.

71. The storage rack system of claim 50 further comprising:
said column support assembly comprises a sliding base pad attached to the lower end of at least said first column, a fixed base pad attached to the floor, said sliding base pad positioned on said fixed base pad such that said sliding base pad slides over said fixed base pad when at least said first columns moves during seismic events;
said first member of said at least one storage rack vibration isolator mounted on said sliding base pad to connect said first member to the storage rack system;
at least one fastening member comprising a box fabrication that encloses said at least one storage rack vibration isolator, said fastening member attached to said second member of said at least one storage rack vibration isolator and to said fixed base pad to connect said second member to the floor; and
at least one layer of low friction bearing material interposed between said sliding base pad and said fixed base pad.

72. The storage rack system of claim 50 which includes a structure that restricts the movement of said at least one storage rack vibration isolator to substantially one horizontal direction.

73. The storage rack system of claim 50 which includes a structure that restricts the movement of said at least one storage rack vibration isolator to substantially one horizontal direction and allows a limited amount of movement in another horizontal direction.

74. The storage rack system of claim 50 which includes a structure that substantially restricts the movement of said at least one storage rack vibration isolator in a vertical direction.

75. The storage rack system of claim 50 which includes a structure that substantially restricts the movement of said at least one storage rack vibration isolator in a vertical direction so as to allow a limited amount of movement in the vertical direction.

76. The storage rack system of claim 50 further comprising:

a structure that restricts the movement of said at least one storage rack vibration isolator to substantially one horizontal direction; and a structure that substantially restricts the movement of said elastomeric component in a vertical direction.

77. The storage rack system of claim 50 in which said at least one seismic vibration absorption and dissipation structure further comprises:

said first member comprises a first mounting plate connected to said storage rack system;

said second member comprises a second mounting plate connected to the floor; and at least one elastomeric member extending between said first and second mounting plates and operatively attached to said first and second mounting plates such that during seismic events said first and second mounting plates remain attached to said at least one elastomeric member as said at least one elastomeric member is placed in shear while said first and second mounting plates are able to move in planes substantially parallel to each other, said at least one elastomeric member made of material that is capable of absorbing and dissipating the energy of ground movement imparted to the storage rack system during seismic events while said material enables the storage rack system to move a sufficient distance relative to the floor to lower the natural frequency of the storage rack system in at least one horizontal direction.

78. The storage rack system of claim 50 in which said at least one seismic vibration absorption and dissipation structure further comprises:

said first member comprises a first mounting plate connected to said storage rack system;

said second member comprises a second mounting plate connected to the floor; and at least two elastomeric members extending between said first and second mounting plates and operatively attached to said first and second mounting plates such that during seismic events said first and second mounting plates remain attached to said at least two elastomeric members as said at least two elastomeric members are placed in shear while said first and second mounting plates are able to move in planes substantially parallel to each other, at least one intermediate plate positioned between every two said at least two elastomeric members, and said at least two elastomeric members made of material that is capable of absorbing and dissipating the energy of ground movement imparted to the storage rack system during seismic events while said material enables the storage rack system to move a sufficient distance relative to the floor to lower the natural frequency of the storage rack system in at least one horizontal direction.

79. The storage rack system of claim 50 in which said at least one seismic vibration absorption and dissipation structure is biased to return to its starting position after seismic events.

80. The storage rack system of claim 50 in which said at least one seismic vibration absorption and dissipation structure is biased to return to its starting position after seismic events.

81. The storage rack system of claim 50 further comprising:

said at least one column support assembly comprises a sliding base pad attached to the lower end of each of said first and second columns;

said first member comprises at least one sliding element attached to the storage rack system;

said second member comprises a fixed base pad attached to the floor having a length which enables it to extend between and under at least said first and second columns, said fixed base pad having at least one concave surface on which said first and second columns and said sliding element are positioned; and said structure further limiting the movement of said first and second columns during seismic events to the dimensions of the fixed base pad.

82. The storage rack system of claim 50 further comprising:

said at least one column support assembly comprises a sliding base pad attached to the lower end of each of said first and second columns;

said first member comprises at least one sliding element attached to the storage rack system;

said second member comprises a fixed base pad attached to the floor having a length which enables it to extend between and under at least said first and second columns, said fixed base pad having a concave surface for each said sliding element on which each said sliding element is positioned; and said structure further limiting the movement of said first and second columns during seismic events to the dimensions of the fixed base pad.

83. The storage rack system of claim 50 in which said seismic vibration absorption and dissipation structure comprises at least one from the group consisting of extension helical springs, compression helical springs, and linear bearings.

84. The storage rack system of claim 50 in which said seismic vibration absorption and dissipation structure includes at least one elastomeric component.

85. The storage rack system of claim 50 in which the natural frequency of storage racks in the second horizontal dimension is reduced to about 0.9 Hz or less.

86. The storage rack system of claim 50 in which the natural frequency of storage racks in the second horizontal dimension is reduced to about 0.5 Hz or less.

87. The storage rack system of claim 50 in which said at least one seismic vibration absorption and dissipation structure further comprises:

said first member comprises a first mounting plate connected to said storage rack system;

said second member comprises a second mounting plate connected to the floor; and at least one elastomeric member extending between said first and second mounting plates and operatively attached to said first and second mounting plates such that during seismic events said first and second mounting plates remain attached to said at least one elastomeric member as said at least one elastomeric member is placed in compression while said first and second mounting plates are able to move in planes substantially perpendicular to each other, said at least one elastomeric member made of material that is capable of absorbing and dissipating the energy of ground movement imparted to the storage rack system during seismic events.

88. The storage rack system of claim 50 in which said at least one seismic vibration absorption and dissipation structure further comprises:

said first member comprises a first mounting plate connected to said storage rack system;

said second member comprises a second mounting plate connected to the floor; and at least one elastomeric member extending between said first and second mounting plates and operatively attached to said first and second mounting plates such that during seismic events said first and second mounting plates remain attached to said at least one elastomeric member as said at least one elastomeric member is placed in tension while said first and second mounting plates are able to move in relation to each other, said at least one elastomeric member made of material that is capable of absorbing and dissipating the energy of ground movement imparted to the storage rack system during seismic events.

* * * * *